United States Patent
Johnson et al.

(10) Patent No.: US 10,828,848 B2
(45) Date of Patent: Nov. 10, 2020

(54) AUTOMATED FIBER-PLACEMENT SYSTEMS AND METHODS

(71) Applicant: The Boeing Company, Chicago, IL (US)

(72) Inventors: Brice A. Johnson, Federal Way, WA (US); Sayata Ghose, Sammamish, WA (US); Kevin F. Malik, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/363,772

(22) Filed: Mar. 25, 2019

(65) Prior Publication Data

US 2020/0307124 A1    Oct. 1, 2020

(51) Int. Cl.
*B29C 70/38*    (2006.01)
*B23K 26/0622*    (2014.01)
(Continued)

(52) U.S. Cl.
CPC ........ *B29C 70/382* (2013.01); *B23K 26/0622* (2015.10); *B29B 11/16* (2013.01);
(Continued)

(58) Field of Classification Search
None
See application file for complete search history.

(56) References Cited

U.S. PATENT DOCUMENTS

| | | | | |
|---|---|---|---|---|
| 4,267,147 A | * | 5/1981 | Pogoda | B29C 33/02 264/571 |
| 6,451,152 B1 | * | 9/2002 | Holmes | B23K 26/034 156/173 |

(Continued)

FOREIGN PATENT DOCUMENTS

| | | |
|---|---|---|
| EP | 3153292 | 4/2017 |
| FR | 3022177 | 12/2015 |

OTHER PUBLICATIONS

Beakou, A, et al, "Modeling slit tape buckling during automated prepreg manufacturing: A local approach", Composite Structures 93 (2011) 2628-2635.*

(Continued)

*Primary Examiner* — Jeffry H Aftergut
(74) *Attorney, Agent, or Firm* — Dascenzo Gates Intellectual Property Law, P.C.

(57) ABSTRACT

An automated fiber-placement method comprises delivering a first quantity of pulsed energy to first portions of at least one fiber-reinforced tape strip, and delivering a second quantity of pulsed energy to second portions of at least the one fiber-reinforced tape strip, alternating with the first portions. Each one of the second portions at least partially overlaps two adjacent ones of the first portions such that overlapping regions of the first portions and the second portions have a higher temperature than non-overlapping regions of the first portions and the second portions. The automated fiber-placement method further comprises laying down at least the one fiber-reinforced tape strip against a (Continued)

substrate along a virtual curvilinear path, such that (i) at least the one fiber-reinforced tape strip is centered on the virtual curvilinear path, and (ii) the overlapping regions are transformed into discrete tape-regions, geometrically different from the overlapping regions.

59 Claims, 16 Drawing Sheets

(51) Int. Cl.
    *B29B 11/16* (2006.01)
    *B29C 65/00* (2006.01)
    *B29C 65/16* (2006.01)

(52) U.S. Cl.
    CPC ...... *B29C 65/1632* (2013.01); *B29C 66/1122* (2013.01); *B29C 66/7392* (2013.01)

(56) References Cited

U.S. PATENT DOCUMENTS

| | | | |
|---|---|---|---|
| 6,799,081 B1 * | 9/2004 | Hale | B29C 70/382 700/98 |
| 2006/0048881 A1 | 3/2006 | Evans et al. | |
| 2009/0208745 A1 | 8/2009 | Blonigen | |

OTHER PUBLICATIONS

Bakhshi et al., Time-dependent wrinkle formation during tow steering in automated fiber placement, Composites Part B: Engineering, Feb. 12, 2019.

Clancy et al., Steering of Carbon Fiber/Thermoplastic Pre-preg Tapes using Laser-Assisted Tape Placement, AIAA SciTech Forum, Kissimmee, Florida, Jan. 8-12, 2018.

Automated Fiber Placement, Automated Dynamics—Composite Structures, Automation Equipment, and Engineering Services, downloaded from AutomatedDynamics.com website on Mar. 18, 2019.

Laser Processing of Thermoplastic Composites, Automated Dynamics—Composite Structures, Automation Equipment, and Engineering Services, downloaded from AutomatedDynamics.com website on Mar. 18, 2019.

Automation and fiber placement continue to evolve, CompositesWorld, JEC Europe 2015, Mar. 16, 2015.

Humm3—Intelligent heat for Automated Fibre Placement (AFP), downloaded from Heraeus.com website on Mar. 18, 2019.

A Flash of Inspiration, Aerospace Manufacturing Magazine, Jun. 20, 2018.

Machine-generated English language translation of the abstract of FR 3022177, downloaded from Esapcenet.com dated Sep. 3, 2020.

Machine-generated English language translation of the abstract of EP 3153292, downloaded from Esapcenet.com dated Sep. 3, 2020.

\* cited by examiner

AUTOMATED FIBER-PLACEMENT SYSTEMS AND METHODS

FIELD

The present disclosure relates to automated fiber placement.

BACKGROUND

Automated fiber placement (AFP), also referred to as advanced fiber placement, is an automated process by which fiber tows that are pre-impregnated with resin (prepreg tows) are placed and compacted against a tool by an AFP machine. The prepreg tows typically are in the form of elongate ribbons. The reinforcement fibers (e.g., carbon fibers) of the prepreg tows have a high stiffness and high tensile strength and therefore do not stretch or compress. As a result, the prepreg tows cannot be curved in-plane below a large threshold radius without the prepreg tows peeling away from the tool or other surface against which the prepreg tows are placed and compacted. For example, it is known in the art that 0.5 inch (13 millimeters) prepreg tows cannot be curved in-plane with a radius less than about 300 inches (7.6 meters) when utilizing existing AFP technology. Typically, prepreg tows are gently curved or are placed in straight parallel lengths to construct a ply and then layered with additional plies at angles of +45°, −45°, and 90° relative to the first ply.

SUMMARY

Accordingly, apparatuses and methods, intended to address at least the above-identified concerns, would find utility.

The following is a non-exhaustive list of examples, which may or may not be claimed, of the subject matter, disclosed herein.

One example of the subject matter, disclosed herein, relates to an automated fiber-placement system. The automated fiber-placement system comprises a dispenser, a compactor, a steering mechanism, an energy source, and a controller. The dispenser is configured to dispense at least one fiber-reinforced tape strip. At least the one fiber-reinforced tape strip comprises a first longitudinal tape-edge and a second longitudinal tape-edge, parallel to the first longitudinal tape-edge and spaced from the first longitudinal tape-edge by a tape-strip width. At least the one fiber-reinforced tape strip comprises a resin tape-matrix and unidirectional reinforcement fibers, imbedded in the resin tape-matrix. The compactor is configured to receive at least the one fiber-reinforced tape strip from a leading side of the compactor and to compact at least the one fiber-reinforced tape strip against a substrate. The steering mechanism is configured to manipulate the dispenser and the compactor in at least one of two- or three-dimensional space relative to the substrate. The energy source is configured to deliver a first quantity of pulsed energy and a second quantity of pulsed energy to the leading side of the compactor for respectively heating, to a first temperature, first discrete portions of at least the one fiber-reinforced tape strip and, to a second temperature, second discrete portions of at least the one fiber-reinforced tape strip, alternating with the first discrete portions along at least the one fiber-reinforced tape strip. The controller is programmed to control at least one of feed rate of the at least the one fiber-reinforced tape strip from the dispenser or pulse frequency, pulse power, or pulse duration of at least one of the first quantity of pulsed energy or the second quantity of pulsed energy. The controller is also programmed to selectively cause the steering mechanism to place at least the one fiber-reinforced tape strip against the substrate at least along a virtual curvilinear path, such that (i) at least the one fiber-reinforced tape strip is centered on the virtual curvilinear path, and (ii) the first discrete portions of at least the one fiber-reinforced tape strip are transformed into discrete tape-regions, geometrically different from the first discrete portions.

The delivery of the first quantity of pulsed energy and the second quantity of pulsed energy to alternating discrete portions of the fiber-reinforced tape strip results in the creation of spaced-apart discrete tape-regions, corresponding to the first discrete portions. Accordingly, when the controller causes the steering mechanism to place the fiber-reinforced tape strip along the virtual curvilinear path, the first discrete portions, which are spaced-apart from each other, are geometrically transformed into the discrete tape-regions. Importantly, as discussed herein, the first quantity of pulsed energy may be controlled by the controller so that the compacted fiber-reinforced tape strip does not peel away from the substrate even when the virtual curvilinear path has a tight radius. Accordingly, the automated fiber-placement system may be used to construct fiber-reinforced composite structures having more complex surface contours than previously possible. Moreover, the automated fiber-placement system may be used to manufacture composite parts with unidirectional reinforcement fibers being oriented in desired and/or predetermined orientations throughout the composite part, such as to define desired properties of the composite part that are not possible with standard 0°, +45°, −45°, and 90° layup techniques.

Another example of the subject matter, disclosed herein, relates to an automated fiber-placement system. The automated fiber-placement system comprises a dispenser, a compactor, a steering mechanism, an energy source, and a controller. The dispenser is configured to dispense at least one fiber-reinforced tape strip. At least the one fiber-reinforced tape strip comprises a first longitudinal tape-edge and a second longitudinal tape-edge, parallel to the first longitudinal tape-edge and spaced from the first longitudinal tape-edge by a tape-strip width. At least the one fiber-reinforced tape strip comprises a resin tape-matrix and unidirectional reinforcement fibers, imbedded in the resin tape-matrix. The compactor is configured to receive at least the one fiber-reinforced tape strip from a leading side of the compactor and to compact at least the one fiber-reinforced tape strip against a substrate. The steering mechanism is configured to manipulate the dispenser and the compactor in at least one of two- or three-dimensional space relative to the substrate. The energy source is configured to deliver a first quantity of pulsed energy and a second quantity of pulsed energy to the leading side of the compactor for respectively heating first portions of at least the one fiber-reinforced tape strip and second portions of at least the one fiber-reinforced tape strip, alternating with the first portions along at least the one fiber-reinforced tape strip. Each one of the second portions of at least the one fiber-reinforced tape strip at least partially overlaps two adjacent ones of the first portions of at least the one fiber-reinforced tape strip such that overlapping regions of the first portions and the second portions have a higher temperature than non-overlapping regions of the first portions and the second portions. The controller is programmed to control at least one of feed rate of the at least the one fiber-reinforced tape strip from the dispenser or pulse frequency, pulse power, or pulse duration of at least one of the first quantity of pulsed energy or the second quantity of pulsed energy. The controller is also programmed to selectively cause the steering mechanism to place at least the one fiber-reinforced tape strip against the substrate at least along a virtual curvilinear path, such that (i) at least the one fiber-reinforced tape strip is centered on the virtual curvilinear path, and (ii) the overlapping regions of at least the one fiber-reinforced tape strip are transformed into discrete tape-regions, geometrically different from the overlapping regions.

By creating overlapping regions with the first portions and the second portions, the first quantity of pulsed energy and the second quantity of pulsed energy are cumulative for the overlapping regions, resulting in a higher temperature for the overlapping regions than for non-overlapping regions. Accordingly, when the controller causes the steering mechanism to place the fiber-reinforced tape strip along the virtual curvilinear path, the overlapping regions, which are spaced-apart from each other, are geometrically transformed into the discrete tape-regions. Moreover, because the pulse duration of the first quantity of pulsed energy and the second quantity of pulsed energy may be controlled by the controller, the spacing and width of the overlapping regions may be precisely controlled, such as to change depending on the radius of the virtual curvilinear path. In fact, in one or more examples, the overlapping regions may be eliminated when the steering mechanism is controlled to place the fiber-reinforced tape strip along a virtual straight path. Importantly, the first and second quantities of pulsed energy may be controlled by the controller so that the compacted fiber-reinforced tape strip does not peel away from the substrate even when the virtual curvilinear path has a tight radius. Accordingly, the automated fiber-placement system may be used to construct fiber-reinforced composite structures having more complex surface contours than previously possible. Moreover, the automated fiber-placement system may be used to manufacture composite parts with unidirectional reinforcement fibers being oriented in desired and/or predetermined orientations throughout the composite part, such as to define desired properties of the composite part that are not possible with standard 0°, +45°, −45°, and 90° layup techniques.

Another example of the subject matter, disclosed herein, relates to an article of manufacture. The article of manufacture comprises a strip. The strip comprises a first longitudinal strip-edge and a second longitudinal strip-edge, parallel to the first longitudinal strip-edge and spaced from the first longitudinal strip-edge by a strip-width. The strip extends along and is centered on a virtual curvilinear path, comprising an arc, having an arc length and a radius. The radius is measured from a virtual point on a virtual line that is perpendicular to the virtual curvilinear path and intersects the first longitudinal strip-edge and the second longitudinal strip-edge. A ratio of the strip-width to the radius is greater than or equal to 0.003. The arc length is equal to or greater than a product of the radius and $\pi/64$. The strip comprises a resin strip-matrix and unidirectional reinforcement fibers, imbedded in the resin strip-matrix and extending along the virtual curvilinear path. The first longitudinal strip-edge is closer to the virtual point than the second longitudinal strip-edge. The strip further comprises discrete strip-regions, spaced along the virtual curvilinear path. Within each of the discrete strip-regions, one of the unidirectional reinforcement fibers that is closest to the first longitudinal strip-edge is more buckled than another one of the unidirectional reinforcement fibers that is closest to the second longitudinal strip-edge. Ones of the unidirectional reinforcement fibers that are buckled are parallel to a smallest one of virtual surfaces, joining the first longitudinal strip-edge and the second longitudinal strip-edge.

The article of manufacture, which may be constructed by an automated fiber-placement system according to the present disclosure or according to an automated fiber-placement method according to the present disclosure, was not previously capable of being manufactured with an AFP machine. Specifically, a ratio of the strip-width to the radius being equal to or greater than 0.003 is tighter than possible utilizing traditional AFP machines without the prepreg tows peeling away from its substrate. By the unidirectional reinforcement fibers being more buckled closer to the first longitudinal strip-edge than the second longitudinal strip-edge, the first longitudinal strip-edge may have a tighter curve than the second longitudinal strip-edge, which is necessary for a fiber-reinforced tape strip (e.g., prepreg tow), that ultimately becomes the strip, to follow the virtual curvilinear path below a threshold curvature without peeling away from the substrate against which it is placed and compacted. By being buckled parallel to a smallest one of virtual surfaces, joining the first longitudinal strip-edge and the second longitudinal strip-edge, the unidirectional reinforcement fibers do not create internal stresses that would otherwise cause the fiber-reinforced tape strip that became the strip to peel away from the substrate against which it was placed and compacted.

Another example of the subject matter, disclosed herein, relates to an automated fiber-placement method. The automated fiber-placement method comprises delivering a first quantity of pulsed energy to first discrete portions of at least one fiber-reinforced tape strip. The automated fiber-placement method also comprises delivering a second quantity of pulsed energy to second discrete portions of at least the one fiber-reinforced tape strip, alternating with the first discrete portions. Any two adjacent ones of the first discrete portions are separated from each other by one of the second discrete portions. The first quantity of pulsed energy heats the first discrete portions of at least the one fiber-reinforced tape strip to a first temperature. The second quantity of pulsed energy heats the second discrete portions of at least the one fiber-reinforced tape strip to a second temperature. At least the one fiber-reinforced tape comprises a first longitudinal tape-edge and a second longitudinal tape-edge, parallel to the first longitudinal tape-edge and spaced from the first longitudinal tape-edge by a tape-strip width. At least the one fiber-reinforced tape strip comprises a resin tape-matrix and unidirectional reinforcement fibers, imbedded in the resin tape-matrix. The automated fiber-placement method additionally comprises laying down at least the one fiber-reinforced tape strip against a substrate along a virtual curvilinear path, such that (i) at least the one fiber-reinforced tape strip is centered on the virtual curvilinear path, and (ii) the first discrete portions of at least the one fiber-reinforced tape strip are transformed into discrete tape-regions, geometrically different from the first discrete portions.

The delivery of the first quantity of pulsed energy and the second quantity of pulsed energy to alternating discrete portions of the fiber-reinforced tape strip results in the creation of the spaced-apart discrete tape-regions, corresponding to the first discrete portions. Accordingly, when the fiber-reinforced tape strip is laid-down against the substrate along the virtual curvilinear path, the first discrete portions, which are spaced-apart from each other, are geometrically transformed into the discrete tape-regions. Importantly, the first quantity of pulsed energy may be controlled so that the placed fiber-reinforced tape strip does not peel away from the substrate even when the virtual curvilinear path has a tight radius. Accordingly, the automated fiber-placement method may be implemented to construct fiber-reinforced composite structures having more complex surface contours than previously possible. Moreover, the automated fiber-placement method may be implemented to manufacture composite parts with the unidirectional reinforcement fibers being oriented in desired and/or predetermined orientations throughout the composite part, such as to define desired properties of the composite part that are not possible with standard 0°, +45°, −45°, and 90° layup techniques.

Another example of the subject matter, disclosed herein, relates to an automated fiber-placement method. The automated fiber-placement method comprises delivering a first quantity of pulsed energy to first portions of at least one fiber-reinforced tape strip. The automated fiber-placement method also comprises delivering a second quantity of pulsed energy to second portions of at least the one fiber-reinforced tape strip, alternating with the first portions. Each one of the second portions of at least the one fiber-reinforced tape strip at least partially overlaps two adjacent ones of the first portions of at least the one fiber-reinforced tape strip such that overlapping regions of the first portions and the second portions have a higher temperature than non-overlapping regions of the first portions and the second portions. At least the one fiber-reinforced tape comprises a first longitudinal tape-edge and a second longitudinal tape-edge, parallel to the first longitudinal tape-edge and spaced from the first longitudinal tape-edge by a tape-strip width. At least the one fiber-reinforced tape strip comprises a resin tape-matrix and unidirectional reinforcement fibers, imbedded in the resin tape-matrix. The automated fiber-placement method additionally comprises laying down at least the one fiber-reinforced tape strip against a substrate along a virtual curvilinear path, such that (i) at least the one fiber-reinforced tape strip is centered on the virtual curvilinear path, and (ii) the overlapping regions of at least the one fiber-reinforced tape strip are transformed into discrete tape-regions, geometrically different from the overlapping regions.

By creating the overlapping regions with the first portions and the second portions, the first quantity of pulsed energy and the second quantity of pulsed energy are cumulative for the overlapping regions, resulting in a higher temperature for the overlapping regions than for the non-overlapping regions. Accordingly, when the fiber-reinforced tape strip is laid-down along the virtual curvilinear path, the overlapping regions, which are spaced-apart from each other, are geometrically transformed into the discrete tape-regions. Importantly, the first and second quantities of pulsed energy may be controlled so that the placed fiber-reinforced tape strip does not peel away from the substrate even when the virtual curvilinear path has a tight radius. Accordingly, the automated fiber-placement method may be implemented to construct fiber-reinforced composite structures having more complex surface contours than previously possible. Moreover, the automated fiber-placement method may be implemented to manufacture composite parts with the unidirectional reinforcement fibers being oriented in desired and/or predetermined orientations throughout the composite part, such as to define desired properties of the composite part that are not possible with standard 0°, +45°, −45°, and 90° layup techniques.

BRIEF DESCRIPTION OF THE DRAWINGS

Figure 1:
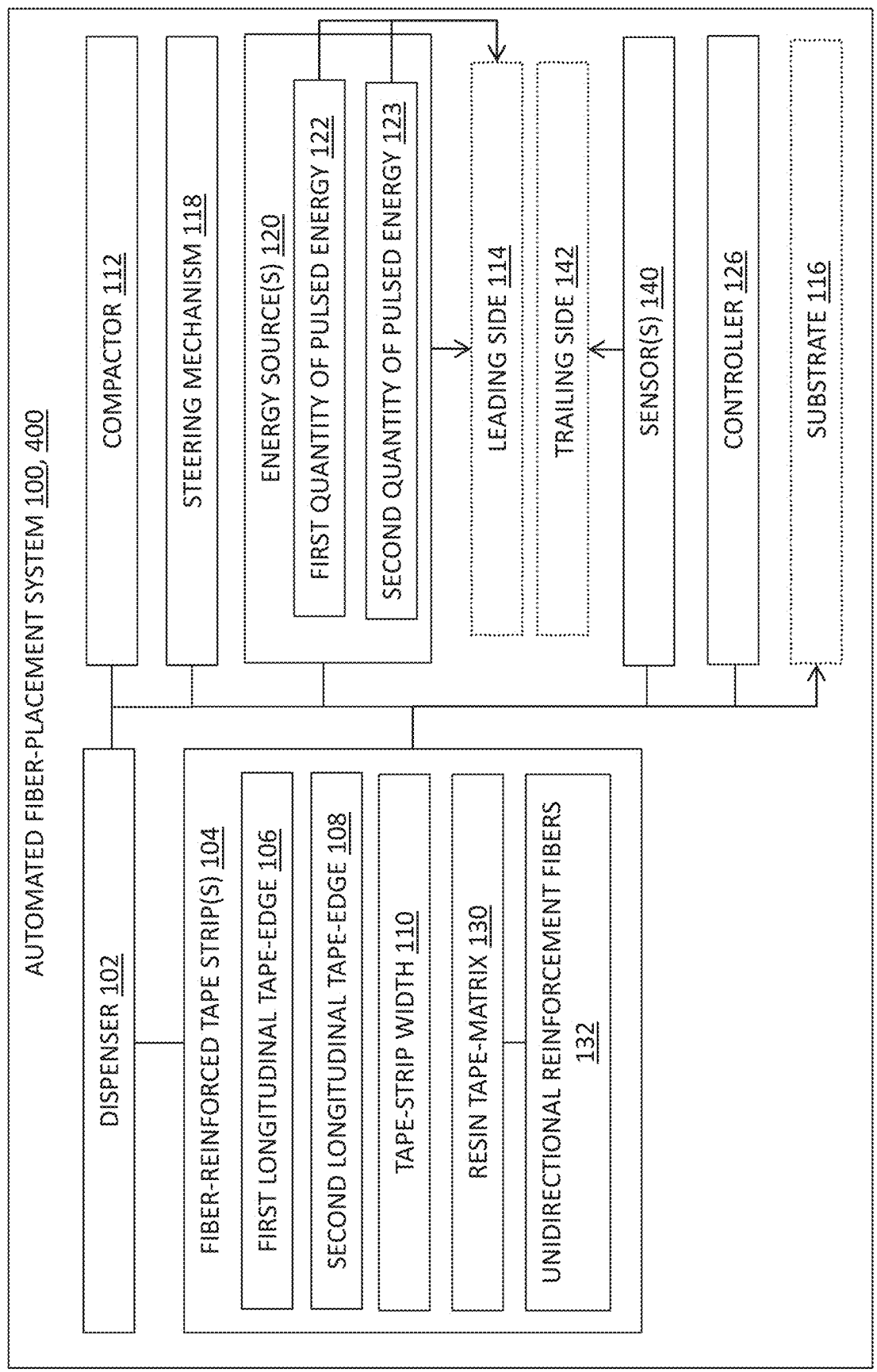
Figure 2:
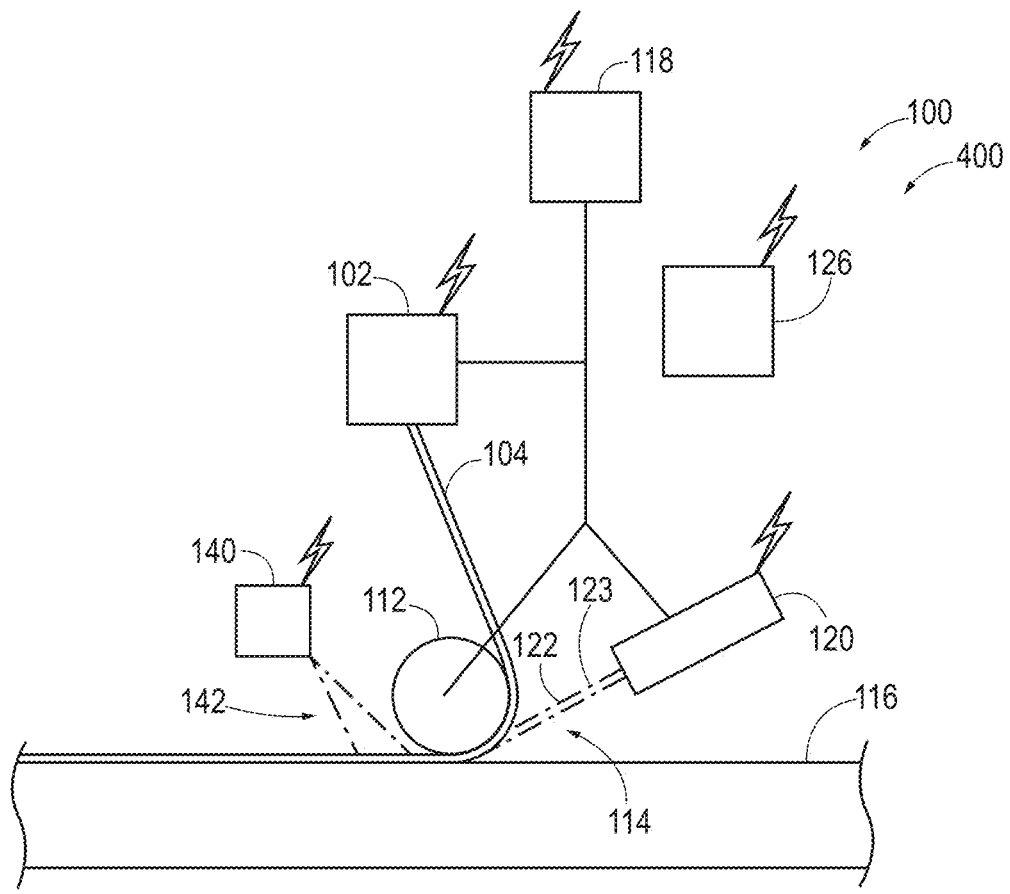
Figure 3:
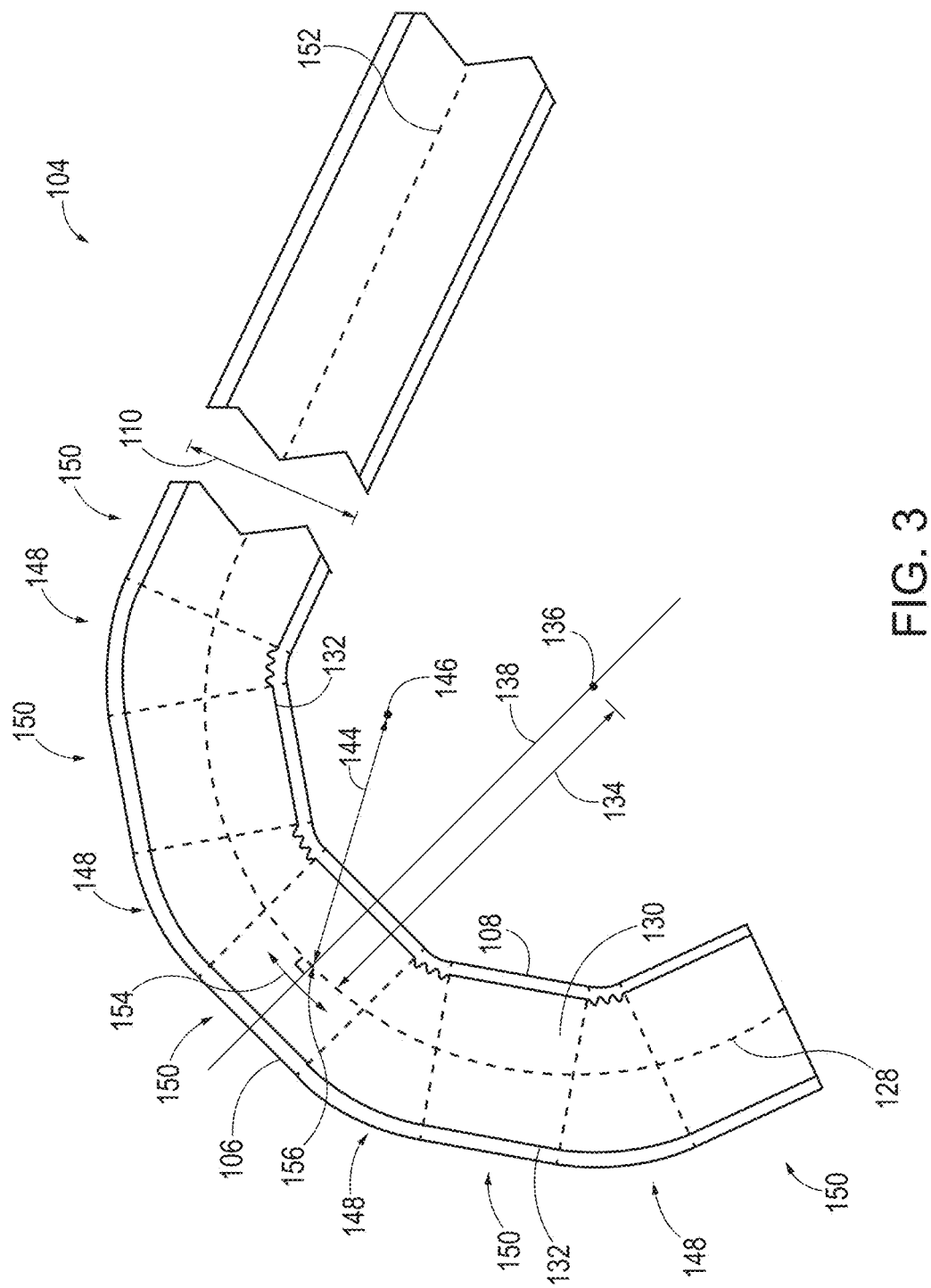
Figure 4:
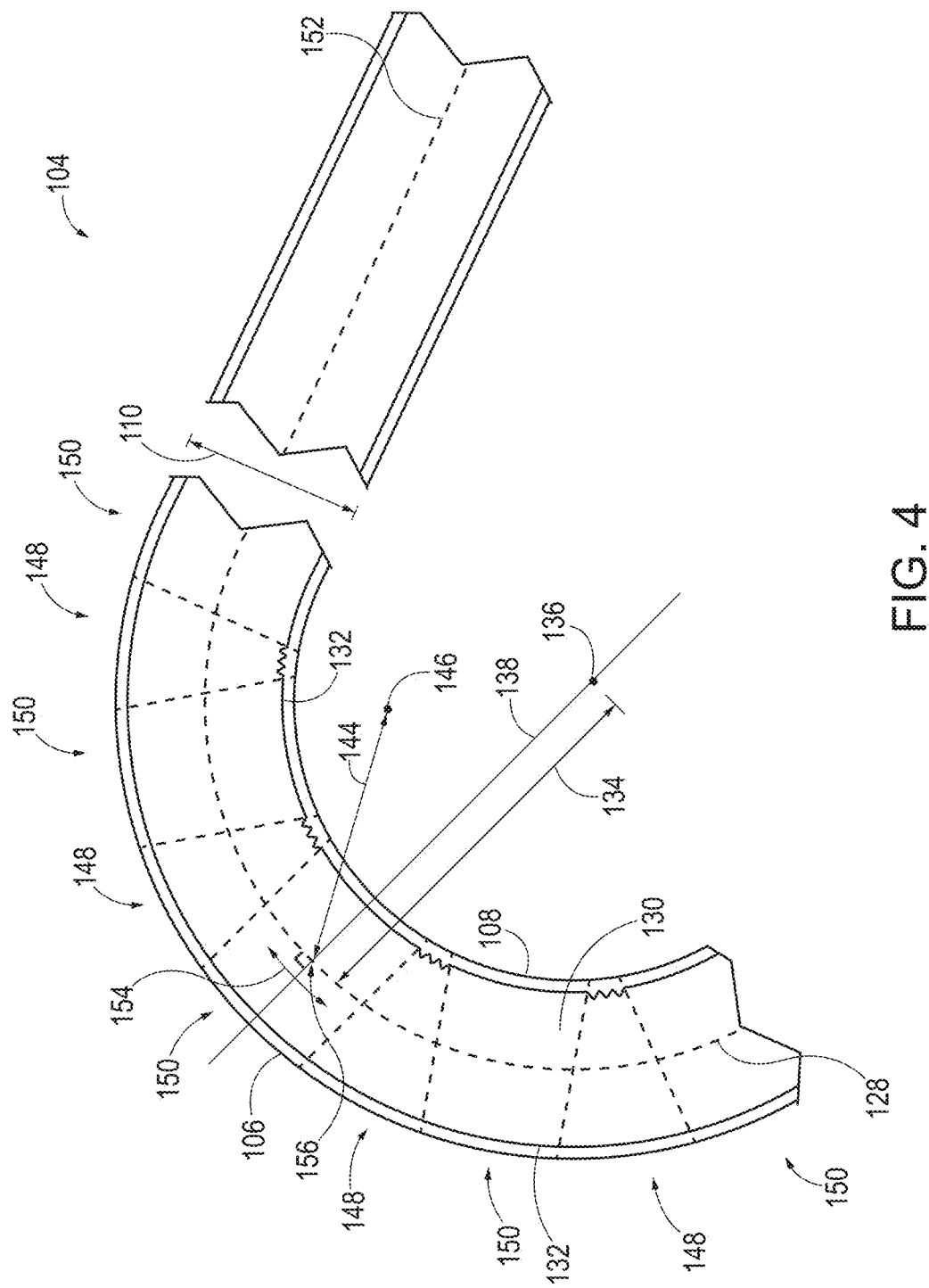
Figure 5:
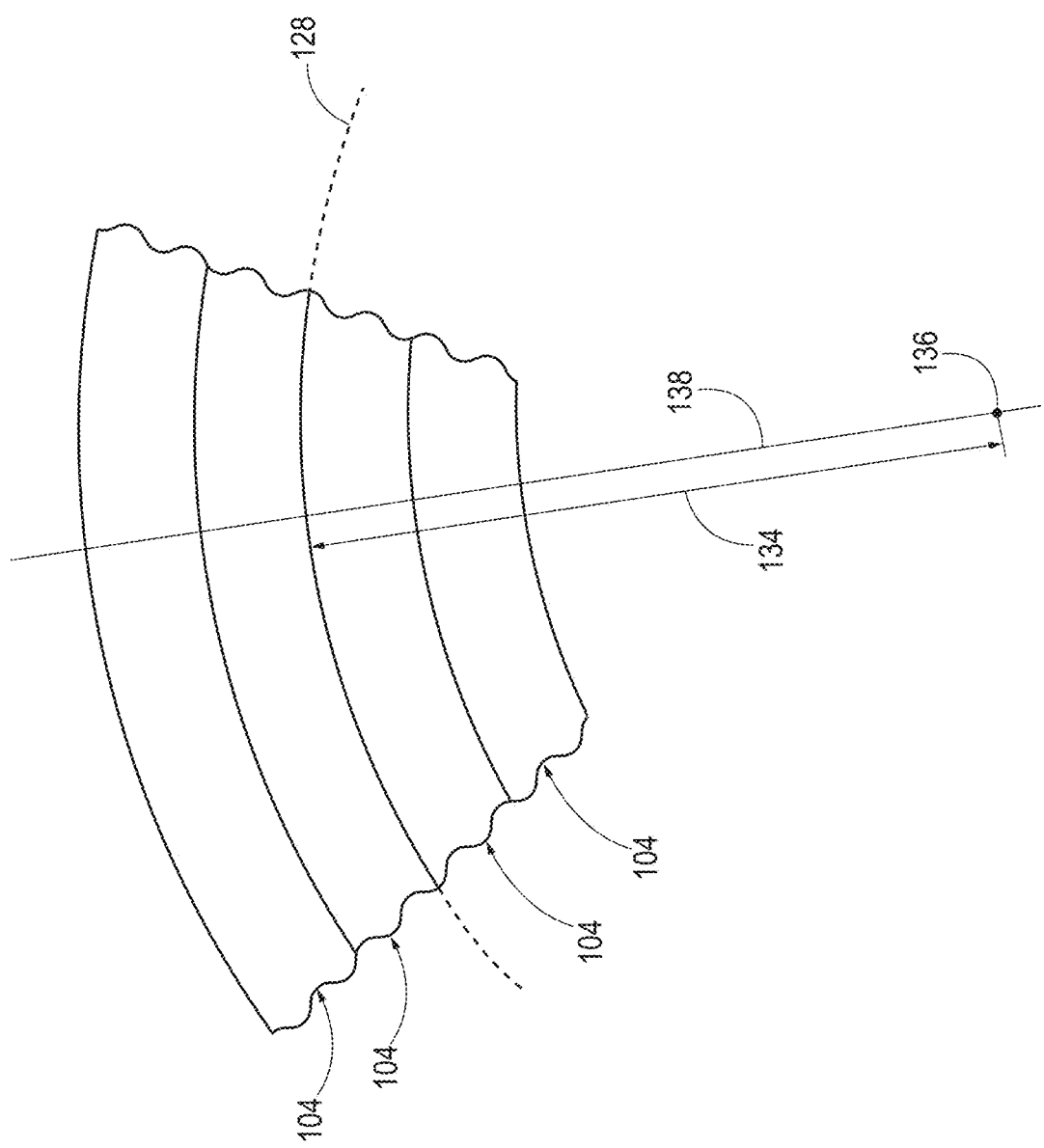
Figure 6:
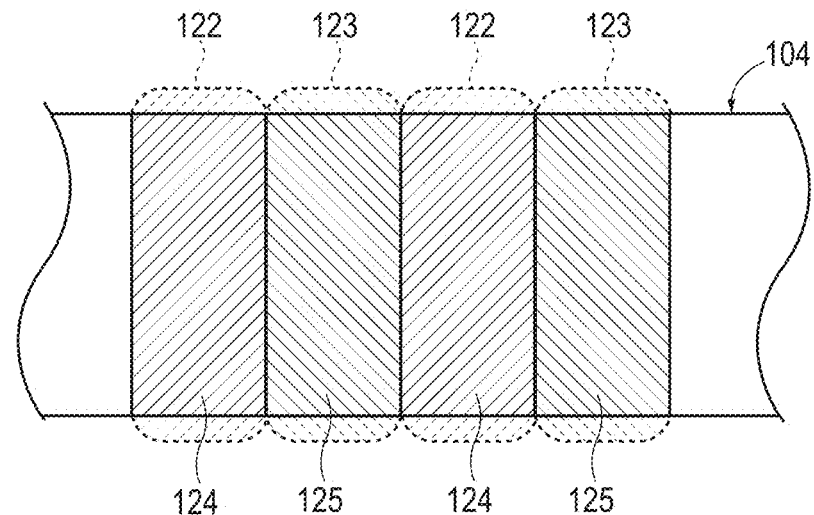
Figure 7:
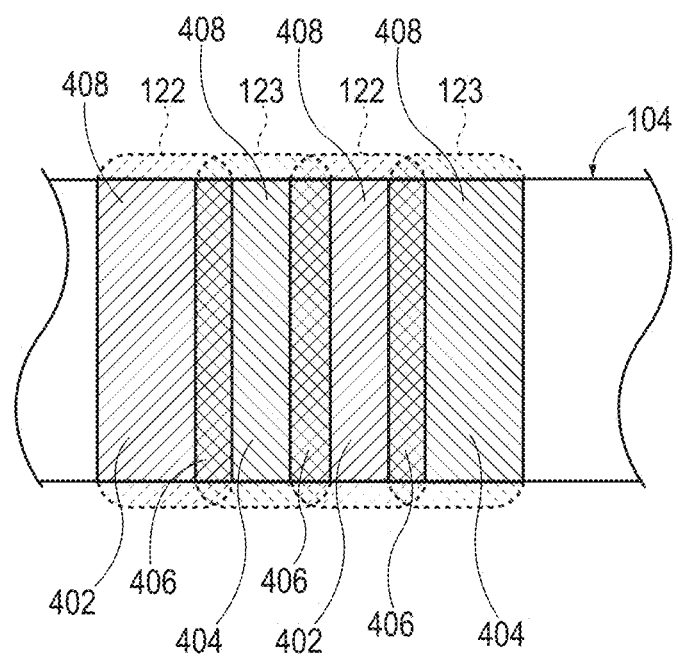
Figure 8:
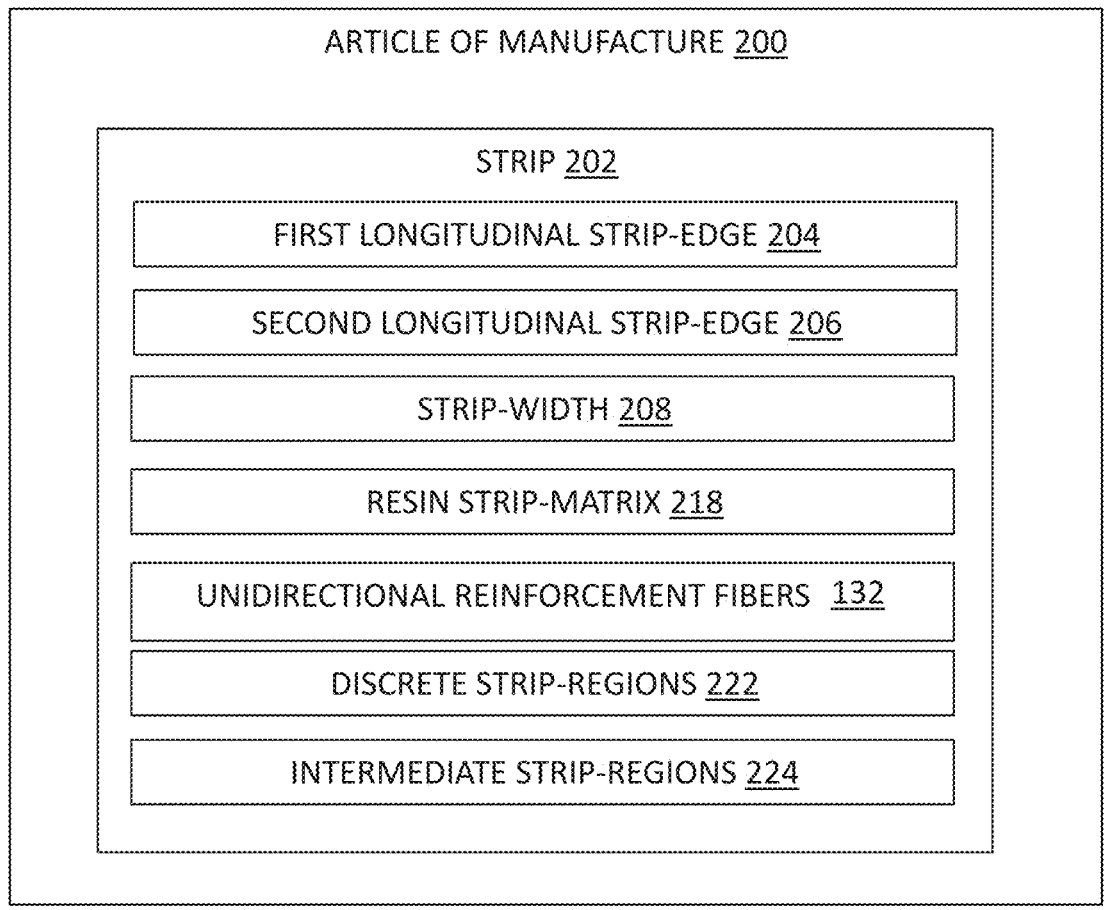
Figure 9:
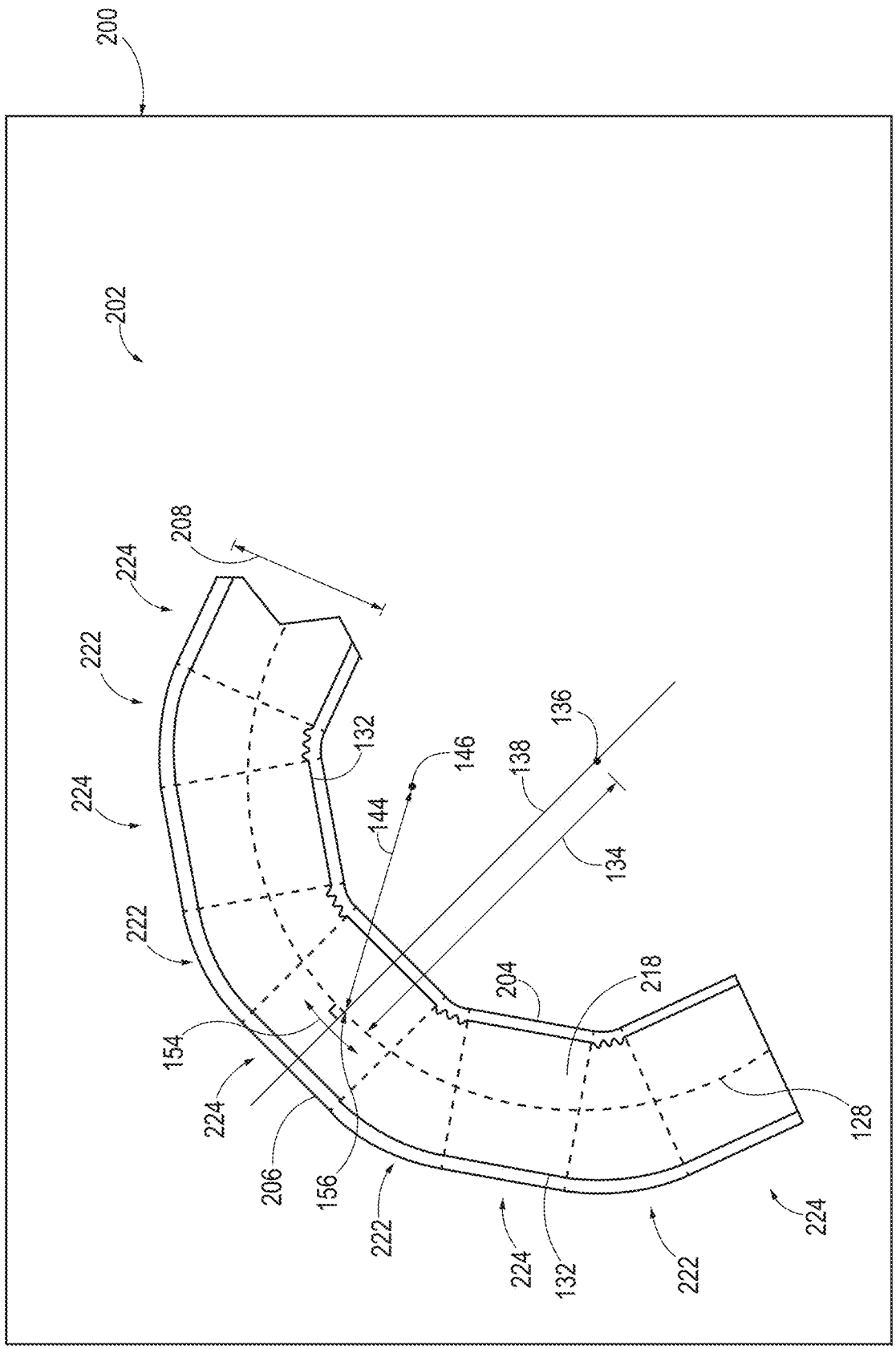
Figure 10:
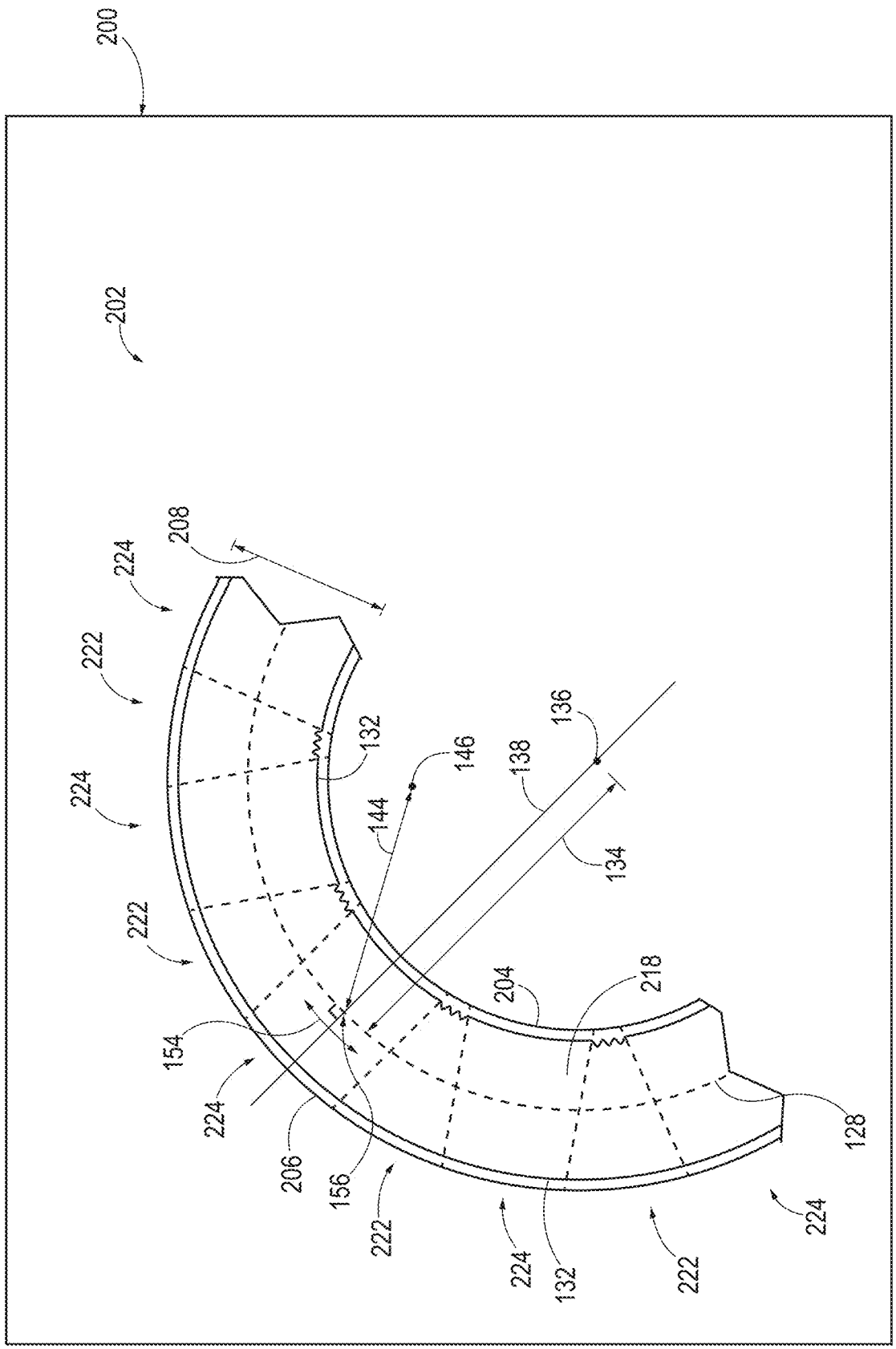
Figure 11:
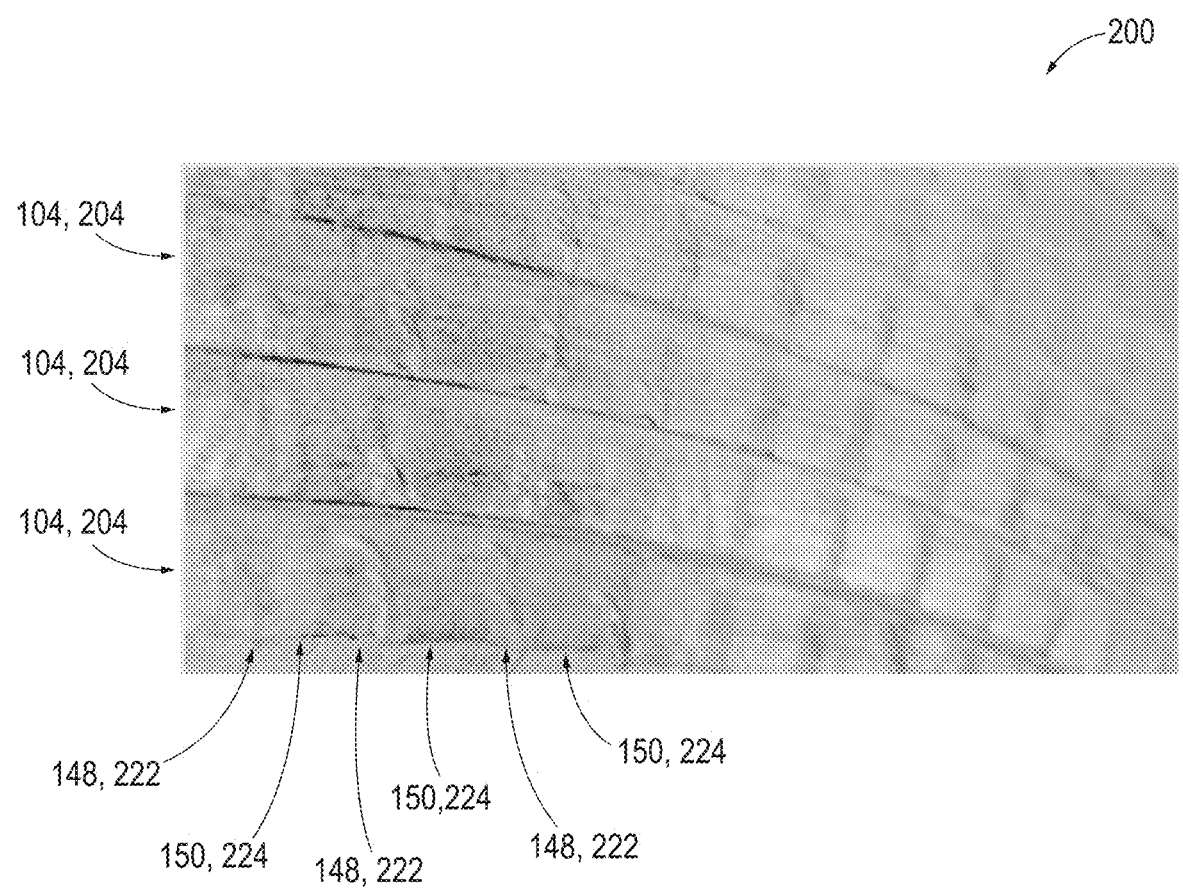
Figure 12:
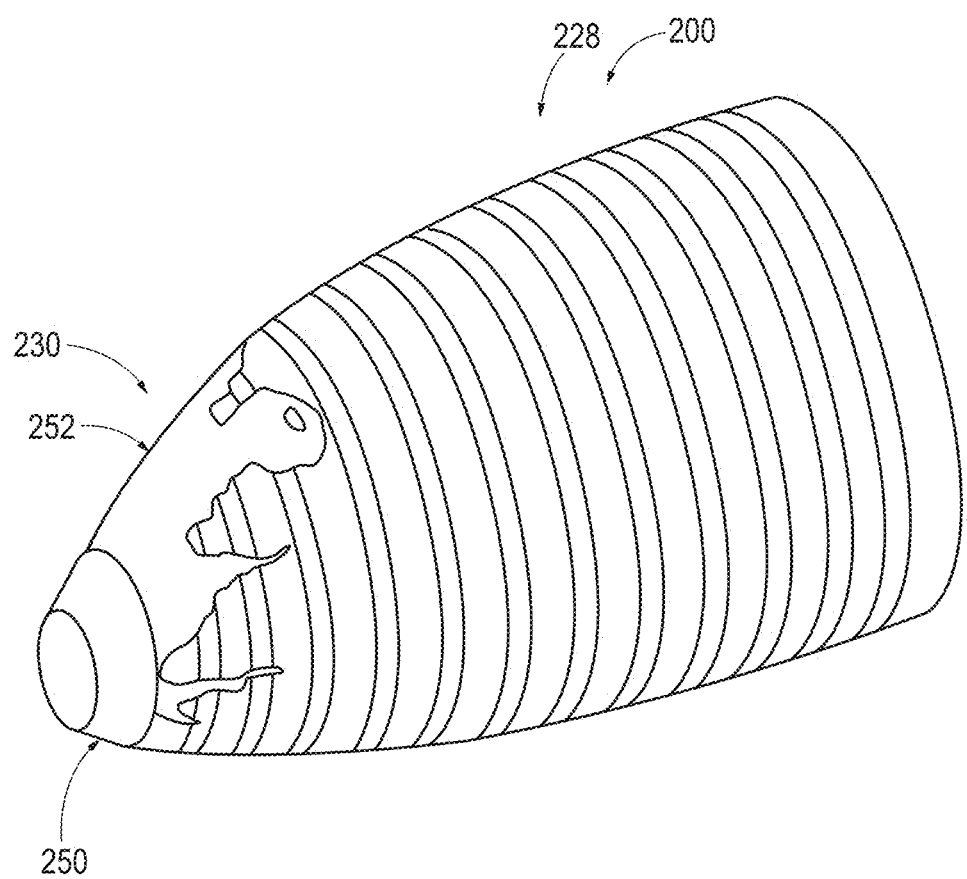
Figure 13:
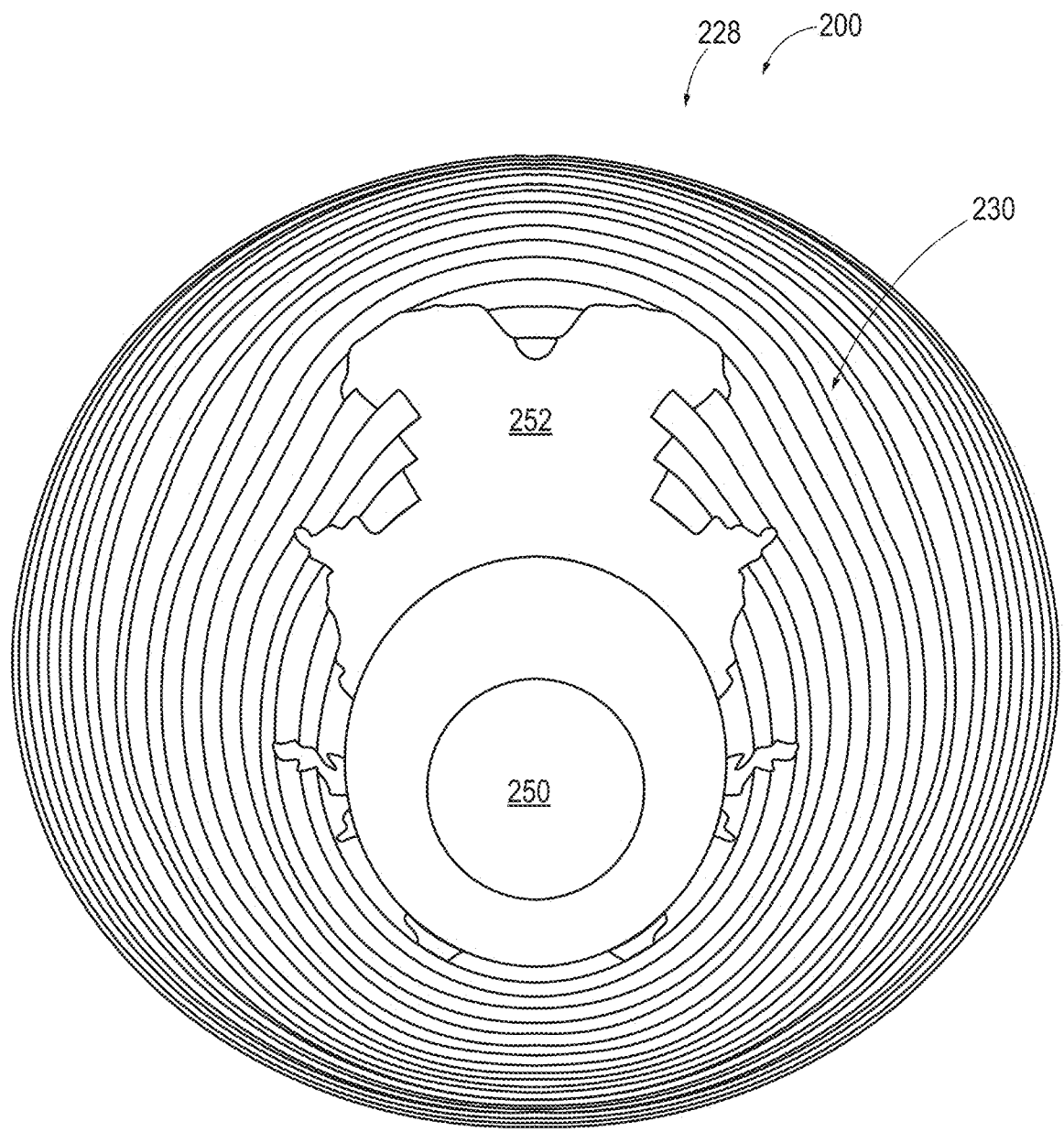
Figure 14:
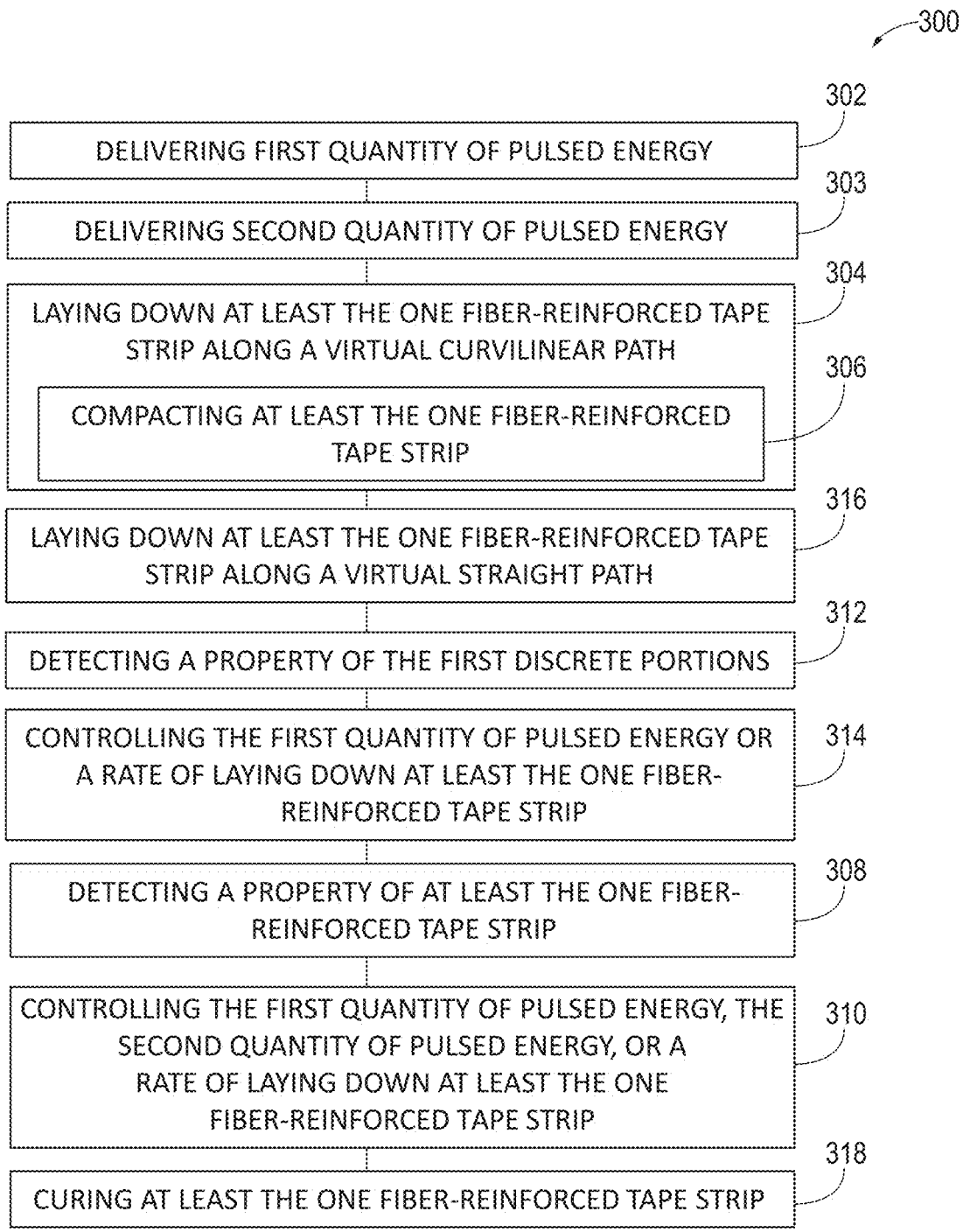
Figure 15:
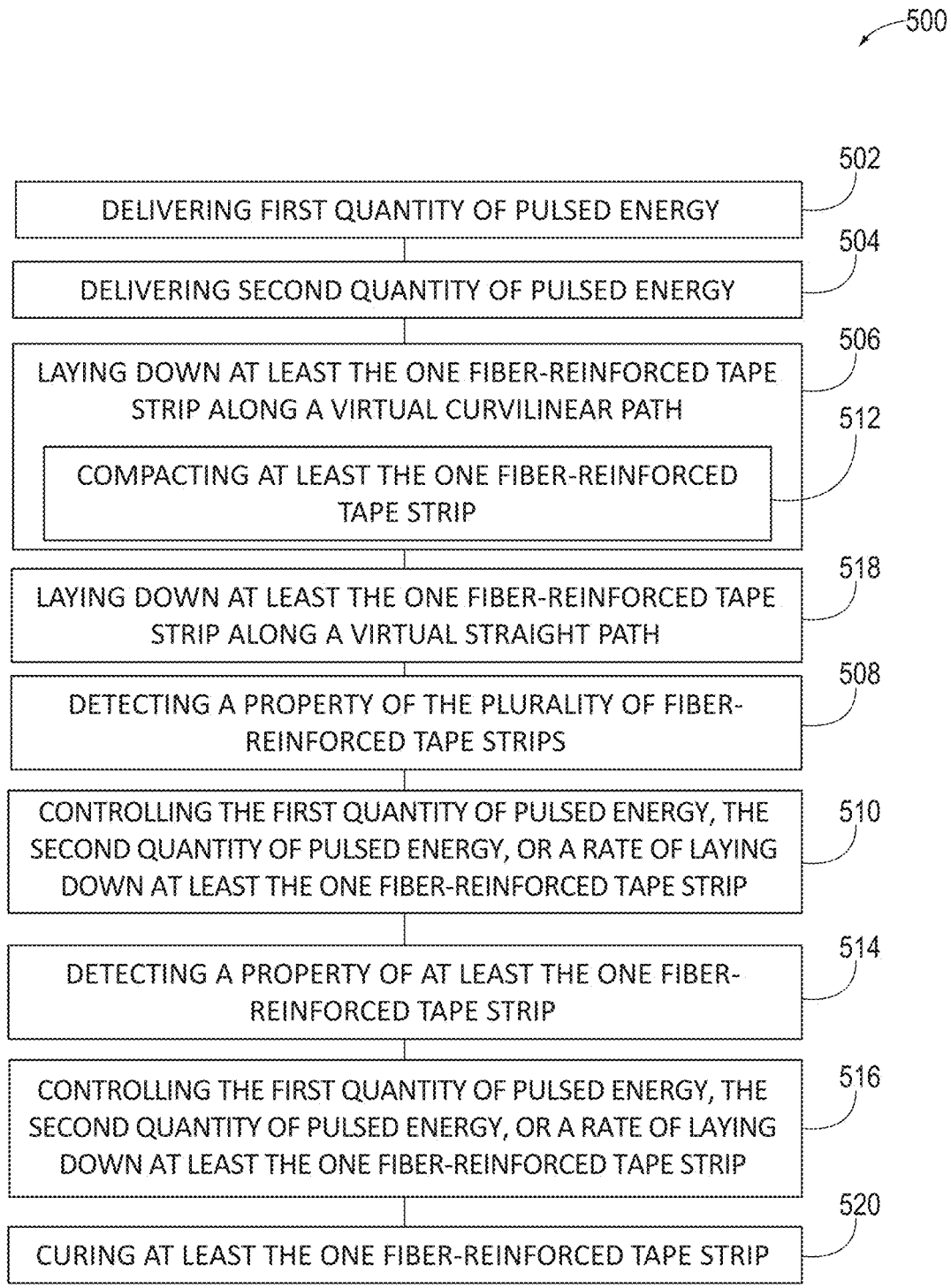
Figure 16:
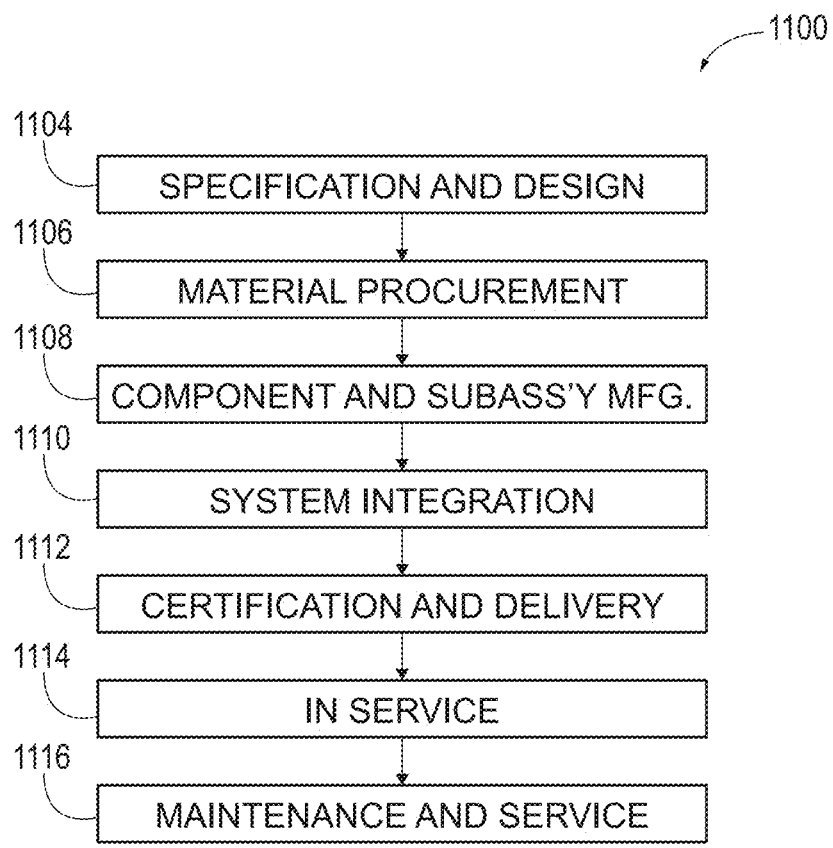
Figure 17:
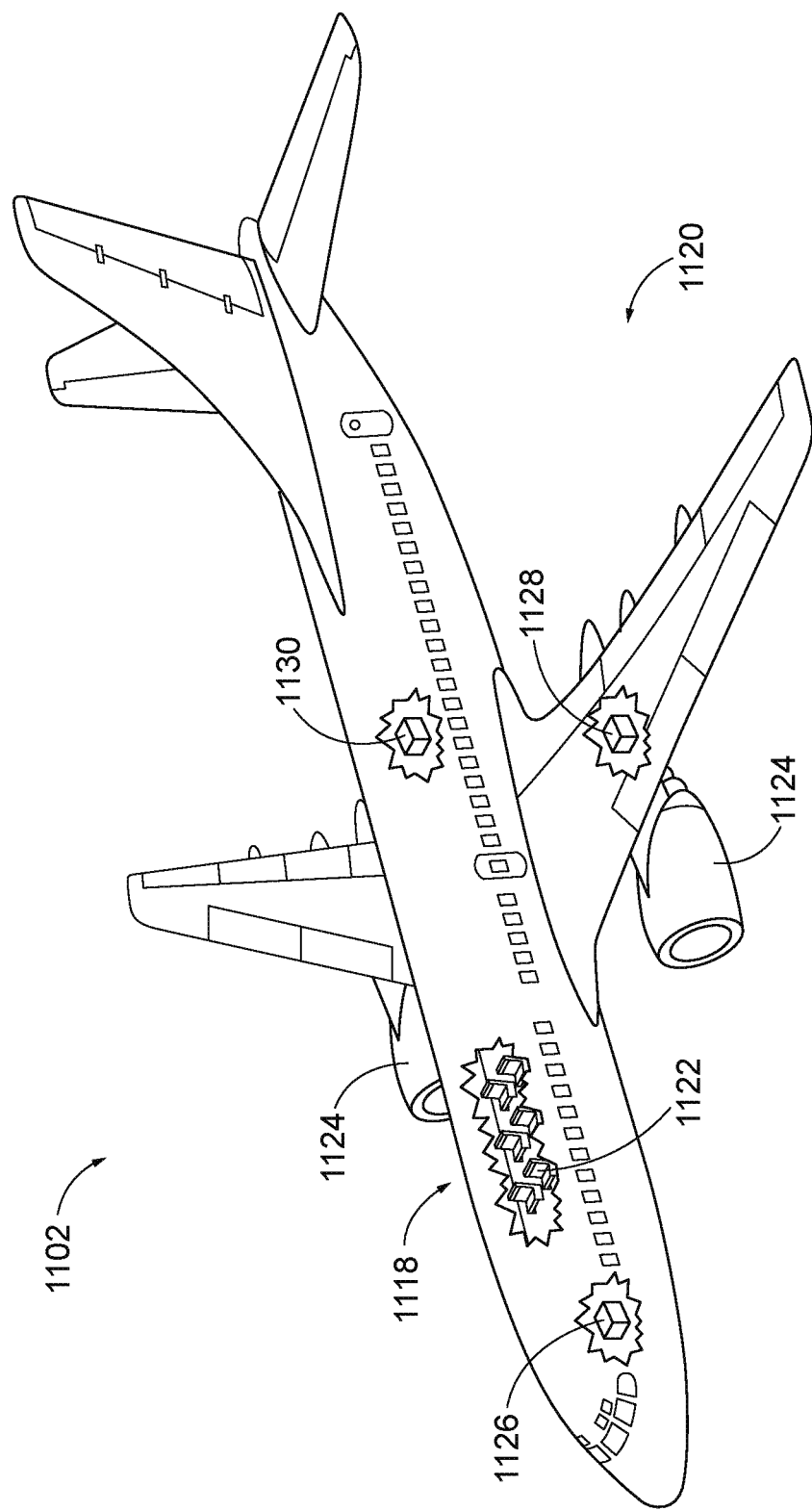

Having thus described one or more examples of the present disclosure in general terms, reference will now be made to the accompanying drawings, which are not necessarily drawn to scale, and wherein like reference characters designate the same or similar parts throughout the several views, and wherein:

FIG. 1 is a block diagram of an automated fiber-placement system, according to one or more examples of the present disclosure;

FIG. 2 is a schematic, side elevation view of the system of FIG. 1, according to one or more examples of the present disclosure;

FIG. 3 is a schematic, plan view of a fiber-reinforced tape strip, placed along a virtual curvilinear path and a virtual straight path, such as laid down by the system of FIG. 1 or according to the method of FIG. 14 or FIG. 15, according to one or more examples of the present disclosure;

FIG. 4 is another schematic, plan view of a fiber-reinforced tape strip placed along a virtual curvilinear path and a virtual straight path, such as laid down by the system of FIG. 1 or according to the method of FIG. 14 or FIG. 15, according to one or more examples of the present disclosure;

FIG. 5 is a schematic, plan view of a plurality of fiber-reinforced tape strips placed along a virtual curvilinear path in a parallel array of continuous strips, such as laid down by the system of FIG. 1 or according to the methods of FIG. 14 or FIG. 15, according to one or more examples of the present disclosure;

FIG. 6 is a schematic view showing first and second quantities of pulsed energy being delivered over a period of time to a fiber-reinforced tape strip, such as by the system of FIG. 1 or according to the method of FIG. 14 or FIG. 15, according to one or more examples of the present disclosure;

FIG. 7 is a schematic view showing first and second quantities of pulsed energy being delivered over a period of time to a fiber-reinforced tape strip in an overlapping manner, such as by the system of FIG. 1 or according to the methods of FIG. 14 or FIG. 15, according to one or more examples of the present disclosure;

FIG. 8 is a block diagram of an article of manufacture, according to one or more examples of the present disclosure;

FIG. 9 is a schematic, plan view of the article of manufacture of FIG. 8, according to one or more examples of the present disclosure;

FIG. 10 is another schematic, plan view of the article of manufacture of FIG. 8, according to one or more examples of the present disclosure;

FIG. 11 is a perspective-view photograph of a detail of the article of manufacture of FIG. 8, showing a plurality of fiber-reinforced tape strips, placed along a virtual curvilinear path in a parallel array of continuous strips, such as by the system of FIG. 1 or according to the method of FIG. 14 or FIG. 15, according to one or more examples of the present disclosure;

FIG. 12 is a schematic, perspective view of a layup mandrel and the article of manufacture of FIG. 8 being constructed on the layup mandrel, such as by the system of FIG. 1 or according to the method of FIG. 14 or FIG. 15, according to one or more examples of the present disclosure;

FIG. 13 is a schematic, front elevation view of the layup mandrel and the article of manufacture of FIG. 12 being constructed on the layup mandrel, such as by the system of FIG. 1 or according to the method of FIG. 14 or FIG. 15, according to one or more examples of the present disclosure;

FIG. 14 is a block diagram of an automated fiber-placement method, utilizing the system of FIG. 1, according to one or more examples of the present disclosure;

FIG. 15 is another block diagram of an automated fiber-placement method, utilizing the system of FIG. 1, according to one or more examples of the present disclosure;

FIG. 16 is a block diagram of aircraft production and service methodology; and FIG. 17 is a schematic illustration of an aircraft.

DESCRIPTION

In FIGS. 1 and 8, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1 and 8 may be combined in various ways without the need to include other features described in FIGS. 1 and 8, other drawing figures, and/or the accompanying disclosure, even though such combination or combinations are not explicitly illustrated herein. Similarly, additional features not limited to the examples presented, may be combined with some or all of the features shown and described herein.

In FIGS. 14-16, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 14-16 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2-6, and 11, automated fiber-placement system 100 comprises dispenser 102, compactor 112, steering mechanism 118, energy source 120, and controller 126. Dispenser 102 is configured to dispense at least one fiber-reinforced tape strip 104. At least one fiber-reinforced tape strip 104 comprises first longitudinal tape-edge 106 and second longitudinal tape-edge 108, parallel to first longitudinal tape-edge 106 and spaced from first longitudinal tape-edge 106 by tape-strip width 110. At least one fiber-reinforced tape strip 104 comprises resin tape-matrix 130 and unidirectional reinforcement fibers 132, imbedded in resin tape-matrix 130. Compactor 112 is configured to receive at least one fiber-reinforced tape strip 104 from leading side 114 of compactor 112 and to compact at least one fiber-reinforced tape strip 104 against substrate 116. Steering mechanism 118 is configured to manipulate dispenser 102 and compactor 112 in at least one of two- or three-dimensional space relative to substrate 116. Energy source 120 is configured to deliver first quantity of pulsed energy 122 and second quantity of pulsed energy 123 to leading side 114 of compactor 112 for respectively heating, to a first temperature, first discrete portions 124 of at least one fiber-reinforced tape strip 104 and, to a second temperature, second discrete portions 125 of at least one fiber-reinforced tape strip 104, alternating with first discrete portions 124 along at least one fiber-reinforced tape strip 104. Controller 126 is programmed to control at least one of feed rate of at least one fiber-reinforced tape strip 104 from dispenser 102 or pulse frequency, pulse power, or pulse duration of at least one of first quantity of pulsed energy 122 or second quantity of pulsed energy 123. Controller 126 is also programmed to selectively cause steering mechanism 118 to place at least one fiber-reinforced tape strip 104 against substrate 116 at least along virtual curvilinear path 128, such that (i) at least one fiber-reinforced tape strip 104 is centered on virtual curvilinear path 128, and (ii) first discrete portions 124 of at least one fiber-reinforced tape strip 104 are transformed into discrete tape-regions 148, geometrically different from first discrete portions 124. The preceding subject matter of this paragraph characterizes example 1 of the present disclosure.

The delivery of first quantity of pulsed energy 122 and second quantity of pulsed energy to alternating discrete portions of fiber-reinforced tape strip 104 results in the creation of spaced-apart discrete tape-regions 148, corresponding to first discrete portions 124. Accordingly, when controller 126 causes steering mechanism 118 to place fiber-reinforced tape strip 104 along virtual curvilinear path 128, first discrete portions 124, which are spaced-apart from each other, are geometrically transformed into discrete tape-regions 148. Importantly, as discussed herein, first quantity of pulsed energy 122 may be controlled by controller 126 so that fiber-reinforced tape strip 104 that has been compacted does not peel away from substrate 116 even when virtual curvilinear path 128 has a tight radius. Accordingly, automated fiber-placement system 100 may be used to construct fiber-reinforced composite structures having more complex surface contours than previously possible. Moreover, automated fiber-placement system 100 may be used to manufacture composite parts with unidirectional reinforcement fibers 132 being oriented in desired and/or predetermined orientations throughout the composite part, such as to define desired properties of the composite part that are not possible with standard 0°, +45°, −45°, and 90° layup techniques.

In one or more examples, fiber-reinforced tape strip 104 is a typical prepreg tow, such as commonly used with AFP machines. Examples of suitable resin tape-matrix 130 include thermoset and thermoplastic resins, and examples of suitable unidirectional reinforcement fibers 132 include carbon fibers, boron fibers, and aramid fibers, although other resins and fibers also may be used. In FIGS. 3 and 4, fiber-reinforced tape strip 104 is schematically presented with illustration of only two unidirectional reinforcement fibers 132, one proximate to first longitudinal tape-edge 106 and one proximate to second longitudinal tape-edge 108; however, this is for illustrative purposes only with respect to the potential differences between individual ones of unidirectional reinforcement fibers 132, as discussed herein. In one or more examples, fiber-reinforced tape strip 104 actually comprises tens of thousands of unidirectional reinforcement fibers from one or more tows of fibers.

In one or more examples, dispenser 102 comprises a supply of fiber-reinforced tape strip 104 or supplies of a plurality of fiber-reinforced tape strips, such as to permit the dispensing, placement, and compaction of a parallel array (or course) of strips.

In one or more examples, compactor 112 comprises a compaction roller or a compaction drag surface, such as commonly incorporated into AFP machines.

In one or more examples, steering mechanism 118 is or comprises a robotic arm, with at least dispenser 102, compactor 112, and energy source 120 forming an end effector mounted on steering mechanism 118. In other examples, steering mechanism 118 is or comprises a print drive, such as having X-, Y-, and Z-axis drives, such as if an automated fiber-placement system according to the present disclosure is used solely to construct planar composite structures.

Virtual curvilinear path 128 corresponds to the longitudinal axis, or centerline, of fiber-reinforced tape strip 104. As used herein, "virtual" means having the attributes of an entity without possessing a physical form. For example, a virtual line is an intangible or imaginary line, rather than a physical one, such as corresponding to an edge of fiber-reinforce tape strip 104, and with respect to which, e.g., location and/or orientation of other physical and/or intangible entities may be defined.

Substrate 116 is any surface against which fiber-reinforced tape strip 104 is placed and compacted. Accordingly, when a first layer of fiber-reinforced tape strips are placed, substrate 116 may be a tool, such as a layup mandrel, but when subsequent layers of fiber-reinforced tape strips are placed, substrate 116 is a previously placed layer of fiber-reinforced tape strips.

In one or more examples, energy source 120 takes any suitable form, such that it delivers appropriate pulsed energy based on the material properties of fiber-reinforced tape strip 104 to result in a suitable temperature of the first and second discrete portions to permit for suitable adhesion to and compaction against substrate 116, as well as to result in a suitable temperature to provide for the transformation of first discrete portions 124 into discrete tape-regions 148. An example of energy source 120 includes a xenon flash lamp/laser, such as sold under the HUMM3™ trademark by Heraeus Noblelight of Germany.

Examples of first quantity of pulsed energy 122 and second quantity of pulsed energy 123 include 14 kilowatts of infrared light having a two-millisecond pulse duration and a frequency of 60 Hertz when a four-inch (102 millimeters) course of fiber-reinforced tape strips is being laid down at a rate of one meter per second. FIG. 11 is a photograph of an example portion of a four-inch (10.2 centimeters) course of eight half-inch (13 millimeters) fiber-reinforced tape strips, placed and compacted by automated fiber-placement system 100 along curvilinear path 128, having radius 134 of 16 inches (41 centimeters) utilizing the example parameters set forth in this paragraph. A uniform distribution of discrete tape-regions 148, and thus a uniform (and desirable) integrity of article of manufacture 200 that results, are achieved without the fiber-reinforced tape strips peeling away from substrate 116.

In one or more examples, controller 126 includes any suitable structure that is adapted, configured, designed, constructed, and/or programmed to automatically control the operation of at least a portion of an automated fiber-placement system of the present disclosure. In one or more examples, controller 126 includes one or more of, and/or is, an electronic controller, a dedicated controller, a special-purpose controller, a computer, a processor, a logic device, and/or a memory device. In one or more examples, controller 126 is programmed to perform one or more algorithms to automatically control the operation of an automated fiber-placement system according to the present disclosure. In some such examples, such algorithms are based upon and/or cause controller 126 to direct an automated fiber-placement system to perform methods 300 and 500 disclosed herein. In FIG. 2, communication between controller 126 and various component parts of automated fiber-placement system 100 is schematically represented by lightning bolts. In one or more examples, such communication is wired and/or wireless in nature.

Referring generally to FIG. 1 and particularly to, e.g., FIG. 6, the second temperature is lower than the first temperature. The preceding subject matter of this paragraph characterizes example 2 of the present disclosure, wherein example 2 also includes the subject matter according to example 1, above.

The second temperature therefore may be selected to ensure that second discrete portions 125 are heated to a temperature that provides for suitable adhesion to and compaction against substrate 116 and without damage or undesirable effects to resin tape-matrix 130 of second discrete portions 125. In addition, the first temperature therefore may be selected to ensure not only that first discrete portions 124 are heated to a temperature that provides for suitable adhesion to and compaction against substrate 116, but also that first discrete portions 124 are heated to a temperature that enables first discrete portions 124 to be transformed into discrete tape-regions 148. In particular, the first temperature is hot enough to permit unidirectional fibers 132 to remain parallel to substrate 116 even when buckling as a result of fiber-reinforced tape strip 104 being placed along virtual curvilinear path 128 (e.g., remaining in-plane when substrate 116 is planar, or remaining within the nominal thickness of fiber-reinforced tape strip 104 where substrate 16 is nonplanar), as opposed to buckling out-of-plane/away from substrate 116.

Referring generally to FIG. 1 and particularly to, e.g., FIG. 6, first discrete portions 124 and second discrete portions 125 are identical in size. The preceding subject matter of this paragraph characterizes example 3 of the present disclosure, wherein example 3 also includes the subject matter according to example 1 or 2, above.

Having first discrete portions 124 and second discrete portions 125 identical in size enables automated fiber-placement system 100 to have a constant speed without the need for complex control of energy source 120.

Referring generally to FIG. 1, and particularly to, e.g., FIG. 6, first discrete portions 124 are smaller than second discrete portions 125. The preceding subject matter of this paragraph characterizes example 4 of the present disclosure, wherein example 4 also includes the subject matter according to example 1 or 2, above.

By having first discrete portions 124 smaller than second discrete portions 125, any alteration to the material properties of fiber-reinforced tape strip 104 as a result of the transformation of first discrete portions 124 to discrete tape-regions 148 is minimized. That is, by having second discrete portions 125 larger than first discrete portions 124, and as a result of second discrete portions 125 not transforming into discrete tape-regions 148, desired material properties of fiber-reinforced tape strip 104 are maintained.

Referring generally to FIG. 1 and particularly to, e.g., FIGS. 3, 4, and 11, discrete tape-regions 148 are structurally different from first discrete portions 124. The preceding subject matter of this paragraph characterizes example 5 of the present disclosure, wherein example 5 also includes the subject matter according to any one of examples 1 to 4, above.

By being structurally transformed, it is meant not only that the geometry changes from first discrete portions 124 to discrete tape-regions 148, but also that unidirectional reinforcement fibers 132 within first discrete portions 124 are manipulated such that they remain parallel to substrate 116, yet do not maintain a uniform parallel relationship within each other within resin tape-matrix 130 across tape-strip width 110. This structural transformation enables fiber-reinforced tape strip 104 to be placed along virtual curvilinear path 128 without unidirectional fibers 132 imparting an undesirable internal stress on fiber-reinforced tape strip 104 that would otherwise cause fiber-reinforced tape strip 104 to peel away from substrate 116.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that virtual curvilinear path 128 comprises arc 156, having radius 134 that is measured from virtual point 136 on virtual line 138 that is perpendicular to virtual curvilinear path 128 and intersects first longitudinal tape-edge 106 and second longitudinal tape-edge 108. In addition, a ratio of tape-strip width 110 to radius 134 is equal to or greater than 0.003. Within each of discrete tape-regions 148, one of unidirectional reinforcement fibers 132 that is closest to first longitudinal tape-edge 106 is more buckled than another one of unidirectional reinforcement fibers 132 that is closest to second longitudinal tape-edge 108. Ones of unidirectional reinforcement fibers 132 that are buckled are parallel to substrate 116. The preceding subject matter of this paragraph characterizes example 6 of the present disclosure, wherein example 6 also includes the subject matter according to any one of examples 1 to 5, above.

A ratio of tape-strip width 110 to radius 134 being equal to or greater than 0.003 results in a radius of curvature that is tighter than possible utilizing traditional AFP machines without the prepreg tows peeling away from its substrate. By unidirectional reinforcement fibers 132 being more buckled closer to first longitudinal tape-edge 106 than second longitudinal tape-edge 108, first longitudinal tape-edge 106 may have a tighter curve than second longitudinal tape-edge 108, which is necessary for fiber-reinforced tape strip 104 to follow virtual curvilinear path 128 below a threshold curvature without peeling away from substrate 116. By buckling parallel to substrate 116, unidirectional reinforcement fibers 132 do not create internal stress that would otherwise cause fiber-reinforced tape strip 104 to peel away from substrate 116.

As used herein, when referring to unidirectional reinforcement fibers 132, "buckled" means that a corresponding one or more reinforcement fibers 132 have one or more curves, folds, or undulations in-place and/or parallel to substrate 116. In other words, a unidirectional reinforcement fiber that is buckled, is not straight.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and $\pi/64$. The preceding subject matter of this paragraph characterizes example 7 of the present disclosure, wherein example 7 also includes the subject matter according to example 6, above.

Having arc length 154 equal to or greater than a product of radius 134 and $\pi/64$ results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and $\pi/32$. The preceding subject matter of this paragraph characterizes example 8 of the present disclosure, wherein example 8 also includes the subject matter according to example 6, above.

Having arc length 154 equal to or greater than a product of radius 134 and $\pi/32$ results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and $\pi/16$. The preceding subject matter of this paragraph characterizes example 9 of the present disclosure, wherein example 9 also includes the subject matter according to example 6, above.

Having arc length 154 equal to or greater than a product of radius 134 and $\pi/16$ results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and $\pi/8$. The preceding subject matter of this paragraph characterizes example 10 of the present disclosure, wherein example 10 also includes the subject matter according to example 6, above.

Having arc length 154 equal to or greater than a product of radius 134 and $\pi/8$ results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and $\pi/4$. The preceding subject matter of this paragraph characterizes example 11 of the present disclosure, wherein example 11 also includes the subject matter according to example 6, above.

Having arc length 154 equal to or greater than a product of radius 134 and $\pi/4$ results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and $\pi/2$. The preceding subject matter of this paragraph characterizes example 12 of the present disclosure, wherein example 12 also includes the subject matter according to example 6, above.

Having arc length 154 equal to or greater than a product of radius 134 and $\pi/2$ results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and $\pi$. The preceding subject matter of this paragraph characterizes example 13 of the present disclosure, wherein example 13 also includes the subject matter according to example 6, above.

Having arc length 154 equal to or greater than a product of radius 134 and $\pi$ results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and $1.25\pi$. The preceding subject matter of this paragraph characterizes example 14 of the present disclosure, wherein example 14 also includes the subject matter according to example 6, above.

Having arc length 154 equal to or greater than a product of radius 134 and $1.25\pi$ results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and $1.5\pi$. The preceding subject matter of this paragraph characterizes example 15 of the present disclosure, wherein example 15 also includes the subject matter according to example 6, above.

Having arc length 154 equal to or greater than a product of radius 134 and $1.5\pi$ results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and $1.75\pi$. The preceding subject matter of this paragraph characterizes example 16 of the present disclosure, wherein example 16 also includes the subject matter according to example 6, above.

Having arc length 154 equal to or greater than a product of radius 134 and $1.75\pi$ results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and 211. The preceding subject matter of this paragraph characterizes example 17 of the present disclosure, wherein example 17 also includes the subject matter according to example 6, above.

Having arc length 154 equal to or greater than a product of radius 134 and 211 results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 3 and 4, the ratio of tape-strip width 110 to radius 134 is equal to or greater than 0.005. The preceding subject matter of this paragraph characterizes example 18 of the present disclosure, wherein example 18 also includes the subject matter according to any one of examples 6 to 17, above.

A ratio of tape-strip width 110 to radius 134 being equal to or greater than 0.005 results in a radius of curvature that is tighter than possible utilizing traditional AFP machines without the prepreg tows peeling away from its substrate.

Referring generally to FIG. 1 and particularly to, e.g., FIGS. 3 and 4, the ratio of tape-strip width 110 to radius 134 is equal to or greater than 0.01. The preceding subject matter of this paragraph characterizes example 19 of the present disclosure, wherein example 19 also includes the subject matter according to any one of examples 6 to 18, above.

A ratio of tape-strip width 110 to radius 134 being equal to or greater than 0.01 results in a radius of curvature that is tighter than possible utilizing traditional AFP machines without the prepreg tows peeling away from its substrate.

Referring generally to FIG. 1 and particularly to, e.g., FIGS. 3 and 4, the ratio of tape-strip width 110 to radius 134 is equal to or greater than 0.03. The preceding subject matter of this paragraph characterizes example 20 of the present disclosure, wherein example 20 also includes the subject matter according to any one of examples 6 to 19, above.

A ratio of tape-strip width 110 to radius 134 being equal to or greater than 0.03 results in a radius of curvature that is tighter than possible utilizing traditional AFP machines without the prepreg tows peeling away from its substrate.

Referring generally to FIG. 1 and particularly to, e.g., FIGS. 2-4 and 6, controller 126 is further programmed to cause energy source 120 to deliver first quantity of pulsed energy 122 to leading side 114 of compactor 112 so that a first array of locations within first discrete portions 124 of at least one fiber-reinforced tape strip 104 is heated to a higher temperature than a second array of locations within first discrete portions 124 of at least one fiber-reinforced tape strip 104. Locations in the first array of locations are closer to virtual point 136 than locations in the second array of locations. The preceding subject matter of this paragraph characterizes example 21 of the present disclosure, wherein example 21 also includes the subject matter according to any one of examples 6 to 20, above.

Because locations within first discrete portions 124 that are farther away from virtual point 136 experience a less tight curvature, they need not be heated to as high of a temperature as locations within first discrete portions 124 that are closer to virtual point 136. As a result, the structural integrity of the locations farther away may be maintained.

Referring generally to FIG. 1 and particularly to, e.g., FIGS. 2, 5, and 6, at least one fiber-reinforced tape strip 104 is a plurality of fiber-reinforced tape strips. Compactor 112 is configured to compact the plurality of fiber-reinforced tape strips against substrate 116 in a parallel array of continuous strips. Controller 126 is further programmed to cause energy source 120 to deliver first quantity of pulsed energy 122 to leading side 114 of compactor 112 so that first discrete portions 124 of a first subset of the plurality of fiber-reinforced tape strips are heated to a higher temperature than first discrete portions 124 of a second subset of the plurality of fiber-reinforced tape strips. Strips of the second subset of the plurality of fiber-reinforced tape strips are farther away from virtual point 136 than the strips of the first subset of the plurality of fiber-reinforced tape strips. The preceding subject matter of this paragraph characterizes example 22 of the present disclosure, wherein example 22 also includes the subject matter according to any one of examples 6 to 21, above.

It is common for AFP machines to be structured to place a course (a plurality) of prepreg tows. When automated fiber-placement system 100 is so configured, according to example 22, fiber-reinforced tape strips that are closer to virtual point 136 are heated to a higher temperature than fiber-reinforced tape strips that are farther away from virtual point 136 to facilitate the tighter curvature of those fiber-reinforced tape strips that are closer to virtual point 136 and to maintain the structural integrity of those fiber-reinforced tape strips that are farther away from virtual point 136.

Referring generally to FIG. 1 and particularly to, e.g., FIGS. 2 and 5, at least one fiber-reinforced tape strip 104 is a plurality of fiber-reinforced tape strips. Compactor 112 is configured to compact the plurality of fiber-reinforced tape strips against substrate 116 in a parallel array of continuous strips. The preceding subject matter of this paragraph characterizes example 23 of the present disclosure, wherein example 23 also includes the subject matter according to any one of examples 1 to 22, above.

By placing and compacting a plurality of fiber-reinforced tape strips simultaneously, automated fiber-placement system 100 is more efficient in covering a large surface area.

Referring generally to FIG. 1 and particularly to, e.g., FIGS. 2, 5, and 6, energy source 120 is a plurality of energy sources. Each one of the plurality of energy sources is configured to deliver at least one of first quantity of pulsed energy 122 to first discrete portions 124 or second quantity of pulsed energy 123 to second discrete portions 125 of individual ones of the plurality of fiber-reinforced tape strips. The preceding subject matter of this paragraph characterizes example 24 of the present disclosure, wherein example 24 also includes the subject matter according to example 23, above. Having a plurality of energy sources enables individual control of the delivery of pulsed energy to individual ones of the plurality of fiber-reinforced tape strips, including the control of individual temperatures of first discrete portions 124 to facilitate the transformation of first discrete portions 124 to discrete tape-regions 148.

Referring generally to FIG. 1 and particularly to, e.g., FIG. 2, automated fiber-placement system 100 further comprises sensor 140, which is configured to detect a property of each of the plurality of fiber-reinforced tape strips on trailing side 142 of compactor 112. Controller 126 is programmed to control at least one of feed rate of at least one fiber-reinforced tape strip 104 from dispenser 102 or pulse frequency, pulse power, or pulse duration of at least one of first quantity of pulsed energy 122 or second quantity of pulsed energy 123 responsive to inputs received from sensor 140. The preceding subject matter of this paragraph characterizes example 25 of the present disclosure, wherein example 25 also includes the subject matter according to example 23 or 24, above.

By sensing a property of the fiber-reinforced tape strips following compaction, controller 126 detects if first discrete portions 124 are being transformed into discrete tape-regions 148 in a desired and controlled manner, and also detects if the fiber-reinforced tape strips are being properly adhered and compacted to substrate 116. Moreover, the feedback loop with energy source 120 enables precise adjustment and control of the first and second quantities of pulsed energy.

In one or more examples, sensor 140 senses the temperature of each of the plurality of fiber-reinforced tape strips on trailing side 142 of compactor 112. Sensing of temperature provides for a simple feedback loop with energy source 120 because, in one or more examples of resin tape-matrix 130, proper adhesion and compaction of the fiber-reinforced tape strips against substrate 116 is directly based on temperature. In one or more examples, sensor 140 is or comprises an infrared sensor.

Referring generally to FIG. 1 and particularly to, e.g., FIGS. 3 and 4, tape-strip width 110 is between 5 millimeters (0.2 inches) and 15 millimeters (0.6 inches). The preceding subject matter of this paragraph characterizes example 26 of the present disclosure, wherein example 26 also includes the subject matter according to any one of examples 1 to 25, above.

Prepreg tows for AFP come in a variety of widths, with quarter-inch (6 millimeters) and half-inch (13 millimeters) prepreg tows being common. Automated fiber-placement system 100 may be configured for any appropriate size of fiber-reinforced tape strips.

Referring generally to FIG. 1 and particularly to, e.g., FIGS. 3 and 4, tape-strip width 110 is less than 15 millimeters (0.6 inches). The preceding subject matter of this paragraph characterizes example 27 of the present disclosure, wherein example 27 also includes the subject matter according to any one of examples 1 to 25, above.

As noted, automated fiber-placement system 100 may be configured for any appropriate size of fiber-reinforced tape strips.

Referring generally to FIG. 1 and particularly to, e.g., FIGS. 3 and 4, tape-strip width 110 is less than 8 millimeters (0.3 inches). The preceding subject matter of this paragraph characterizes example 28 of the present disclosure, wherein example 28 also includes the subject matter according to any one of examples 1 to 26, above.

As noted, automated fiber-placement system 100 may be configured for any appropriate size of fiber-reinforced tape strips.

Referring generally to FIG. 1 and particularly to, e.g., FIGS. 3 and 4, within each of discrete tape-regions 148, at least one of unidirectional reinforcement fibers 132 that are buckled comprises a plurality of folds. The preceding subject matter of this paragraph characterizes example 29 of the present disclosure, wherein example 29 also includes the subject matter according to any one of examples 1 to 28, above.

A plurality of folds in individuals ones of unidirectional reinforcement fibers 132 permits for tight curves of virtual curvilinear path 128.

Referring generally to FIG. 1 and particularly to, e.g., FIGS. 3,4, and 11, discrete tape-regions 148 are trapezoidal. The preceding subject matter of this paragraph characterizes example 30 of the present disclosure, wherein example 30 also includes the subject matter according to any one of examples 1 to 29, above.

By being trapezoidal, discrete tape-regions 148 permit placement of fiber-reinforced tape strip 104 along curvilinear path 128.

As used herein, "trapezoidal" does not mean having the shape of a perfect trapezoid with straight edges and sharp corners, but rather having the general shape of a trapezoid with one pair of generally parallel opposing edges of different lengths (i.e., a non-parallelogram trapezoid).

Referring generally to FIG. 1 and particularly to, e.g., FIGS. 2-4 and 11, controller 126 is programmed to cause steering mechanism 118 to steer placement of at least one fiber-reinforced tape strip 104 against substrate 116 along virtual curvilinear path 128, such that intermediate tape-regions 150 of at least one fiber-reinforced tape strip 104 are produced between discrete tape-regions 148. The preceding subject matter of this paragraph characterizes example 31 of the present disclosure, wherein example 31 also includes the subject matter according to any one of examples 1 to 30, above.

Intermediate tape-regions 150 space discrete tape-regions 148 apart from each other and maintain the structural integrity of fiber-reinforced tape strip 104 following being placed and compacted against substrate 116.

Referring generally to FIG. 1 and particularly to, e.g., FIG. 3, within each of intermediate tape-regions 150, all of unidirectional reinforcement fibers 132 are only straight. The preceding subject matter of this paragraph characterizes example 32 of the present disclosure, wherein example 32 also includes the subject matter according to example 31, above.

Because unidirectional reinforcement fibers 132 are not buckled within intermediate tape-regions 150, the structural integrity of intermediate tape-regions 150 is maintained, thereby maximizing the structural integrity of fiber-reinforced tape strip 104 following being placed and compacted against substrate 116.

Referring generally to FIG. 1 and particularly to, e.g., FIGS. 3 and 4, each of unidirectional reinforcement fibers 132 that are buckled within discrete tape-regions 148 are less buckled within intermediate tape-regions 150 than within discrete tape-regions 148. The preceding subject matter of this paragraph characterizes example 33 of the present disclosure, wherein example 33 also includes the subject matter according to example 31, above.

Because unidirectional reinforcement fibers 132 are less buckled within intermediate tape-regions 150, the structural integrity of intermediate tape-regions 150 is maximized, thereby maximizing the structural integrity of fiber-reinforced tape strips 104 following being placed and compacted against substrate 116.

Referring generally to FIG. 1 and particularly to, e.g., FIGS. 3, 4, and 11, intermediate tape-regions 150 are rectangular. The preceding subject matter of this paragraph characterizes example 34 of the present disclosure, wherein example 34 also includes the subject matter according to any one of examples 31 to 33, above.

By being rectangular, intermediate tape-regions 150 maintain their structural integrity without unidirectional reinforcement fibers 132 imparting undesirable internal stresses within fiber-reinforced tape strip 104 following being placed and compacted against substrate 116.

As used herein, "rectangular" does not mean having the shape of a perfect rectangle with two pairs of exactly parallel and straight opposing edges and sharp corners, but rather having the general shape of a rectangle with generally straight and parallel opposing edges.

Referring generally to FIG. 1 and particularly to, e.g., FIGS. 2 and 6, automated fiber-placement system 100 further comprises sensor 140, which is configured to detect a property of at least one fiber-reinforced tape strip 104 on trailing side 142 of compactor 112. Controller 126 is programmed to control at least one of feed rate of at least one fiber-reinforced tape strip 104 from dispenser 102 or pulse frequency, pulse power, or pulse duration of at least one of first quantity of pulsed energy 122 or second quantity of pulsed energy 123 responsive to inputs received from sensor 140. The preceding subject matter of this paragraph characterizes example 35 of the present disclosure, wherein example 35 also includes the subject matter according to any one of examples 1 to 34, above.

By sensing a property of fiber-reinforced tape strip 104 following compaction, controller 126 detects if first discrete portions 124 are being transformed into discrete tape-regions 148 in a desired and controlled manner, and also detects if fiber-reinforced tape strip 104 is being properly adhered and compacted to substrate 116. Moreover, the feedback loop with energy source 120 enables precise adjustment and control of the first and second quantities of pulsed energy.

Referring generally to FIG. 1 and particularly to, e.g., FIG. 2, sensor 140 is a temperature sensor. The preceding subject matter of this paragraph characterizes example 36 of the present disclosure, wherein example 36 also includes the subject matter according to example 35, above.

Sensing of temperature provides for a simple feedback loop with energy source 120 because, in one or more examples of resin tape-matrix 130, proper adhesion and compaction of fiber-reinforced tape strip 104 against substrate 116 is directly based on temperature.

In one or more examples, sensor 140 is or comprises an infrared sensor.

Referring generally to FIG. 1 and particularly to, e.g., FIGS. 2 and 6, at least one of first quantity of pulsed energy 122 or second quantity of pulsed energy 123 is configured to directly heat unidirectional reinforcement fibers 132 for indirectly heating resin tape-matrix 130 via conduction from unidirectional reinforcement fibers 132. The preceding subject matter of this paragraph characterizes example 37 of the present disclosure, wherein example 37 also includes the subject matter according to any one of examples 1 to 36, above.

By selecting a wavelength of pulsed energy that directly heats unidirectional reinforcement fibers 132 and that does not directly heat, or at least substantively less directly heats, resin tape-matrix 130, temperatures for resin tape-matrix 130 are targeted that do not adversely affect the material properties of resin tape-matrix 130 and therefore that do not adversely affect the structural integrity of fiber-reinforced tape strip 104 following placement and compaction against substrate 116.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 in virtual straight path 152. Controller 126 is programmed to cause energy source 120 to heat first discrete portions 124 that are along virtual curvilinear path 128 to a higher temperature than first discrete portions 124 that are along virtual straight path 152. The preceding subject matter of this paragraph characterizes example 38 of the present disclosure, wherein example 38 also includes the subject matter according to any one of examples 1 to 37, above.

By heating first discrete portions 124 to a lower temperature when along virtual straight path 152 than when along virtual curvilinear path 128, a temperature may be selected that provides for desirable adhesion and compaction against substrate 116 without adversely affecting the structural integrity thereof.

Referring generally to FIG. 1 and particularly to, e.g., FIGS. 3, 4, 12, and 13, virtual curvilinear path 128 is nonplanar. The preceding subject matter of this paragraph characterizes example 39 of the present disclosure, wherein example 39 also includes the subject matter according to any one of examples 1 to 38, above.

When automated fiber-placement system 100 is programmed to place fiber-reinforced tape strip 104 along curvilinear path 128 that is nonplanar, automated fiber-placement system 100 may be used to construct nonplanar articles of manufacture, including those having surfaces with complex contours.

With reference to FIGS. 3 and 4, when curvilinear path 128 is nonplanar, virtual point 136 is a first virtual point, and steering mechanism 118 is configured to manipulate dispenser 102 and compactor 112 in three-dimensional space relative to substrate 116. Moreover, controller 126 is programmed to selectively cause steering mechanism 118 to steer placement of fiber-reinforced tape strip 104 in three-dimensional space relative to substrate 116, such that virtual curvilinear path 128 further comprises second curvature radius 144, measured from second virtual point 146 that is spaced from virtual line 138.

Referring generally to FIG. 1 and particularly to, e.g., FIGS. 2-4, 12, and 13, substrate 116 comprises a complex contour. The preceding subject matter of this paragraph characterizes example 40 of the present disclosure, wherein example 40 also includes the subject matter according to any one of examples 1 to 39, above.

When substrate 116 comprises a complex contour, automated fiber-placement system 100 is capable of placing and compacting fiber-reinforced tape strip 104 against substrate 116, enabling the construction of articles of manufacture not previously possible with a traditional AFP machine.

As used herein, a surface having a "complex contour" is one within a given region of the surface, the intersection with any orientation of a plane is not linear.

FIGS. 12 and 13 schematically represent tool (layup mandrel) 250, corresponding to a portion of a fuselage of aircraft 228, having nose region 230, in which sub-region 252 of nose region 230 comprises complex contours, in which fiber-reinforced tape strips need to be placed and compacted along curvilinear paths having radii between 35 inches (0.9 meters) and 75 inches (1.9 meters). Automated fiber-placement systems according to the present disclosure make this possible, including for a four-inch (10.2 centimeters) course of eight half-inch (13 millimeters) fiber-reinforced tape strips.

Referring generally to FIG. 1 and particularly to, e.g., FIGS. 2-5, 7, and 11, automated fiber-placement system 400 comprises dispenser 102, compactor 112, steering mechanism 118, energy source 120, and controller 126. Dispenser 102 is configured to dispense at least one fiber-reinforced tape strip 104. At least one fiber-reinforced tape strip 104 comprises first longitudinal tape-edge 106 and second longitudinal tape-edge 108, parallel to first longitudinal tape-edge 106 and spaced from first longitudinal tape-edge 106 by tape-strip width 110. At least one fiber-reinforced tape strip 104 comprises resin tape-matrix 130 and unidirectional reinforcement fibers 132, imbedded in resin tape-matrix 130. Compactor 112 is configured to receive at least one fiber-reinforced tape strip 104 from leading side 114 of compactor 112 and to compact at least one fiber-reinforced tape strip 104 against substrate 116. Steering mechanism 118 is configured to manipulate dispenser 102 and compactor 112 in at least one of two- or three-dimensional space relative to substrate 116. Energy source 120 is configured to deliver first quantity of pulsed energy 122 and second quantity of pulsed energy 123 to leading side 114 of compactor 112 for respectively heating first portions 402 of at least one fiber-reinforced tape strip 104 and second portions 404 of at least one fiber-reinforced tape strip 104, alternating with first portions 402 along at least one fiber-reinforced tape strip 104. Each one of second portions 404 of at least one fiber-reinforced tape strip 104 at least partially overlaps two adjacent ones of first portions 402 of at least one fiber-reinforced tape strip 104 such that overlapping regions 406 of first portions 402 and second portions 404 have a higher temperature than non-overlapping regions 408 of first portions 402 and second portions 404. Controller 126 is programmed to control at least one of feed rate of at least one fiber-reinforced tape strip 104 from dispenser 102 or pulse frequency, pulse power, or pulse duration of at least one of first quantity of pulsed energy 122 or second quantity of pulsed energy 123. Controller 126 is also programmed to selectively cause steering mechanism 118 to place at least one fiber-reinforced tape strip 104 against substrate 116 at least along virtual curvilinear path 128, such that (i) at least one fiber-reinforced tape strip 104 is centered on virtual curvilinear path 128, and (ii) overlapping regions 406 of at least one fiber-reinforced tape strip 104 are transformed into discrete tape-regions 148, geometrically different from overlapping regions 406. The preceding subject matter of this paragraph characterizes example 41 of the present disclosure.

By creating overlapping regions 406 with first portions 402 and second portions 404, first quantity of pulsed energy 122 and second quantity of pulsed energy 123 are cumulative for overlapping regions 406, resulting in a higher temperature for overlapping regions 406 than for non-overlapping regions 408. Accordingly, when controller 126 causes steering mechanism 118 to place fiber-reinforced tape strip 104 along virtual curvilinear path 128, overlapping regions 406, which are spaced-apart from each other, are geometrically transformed into discrete tape-regions 148. Moreover, because the pulse duration of first quantity of pulsed energy 122 and second quantity of pulsed energy 123 may be controlled by controller 126, the spacing and width of overlapping regions 406 may be precisely controlled, such as to change depending on the radius of virtual curvilinear path 128. In fact, in one or more examples, overlapping regions 406 may be eliminated when steering mechanism 118 is controlled to place fiber-reinforced tape strip 104 along virtual straight path 152. Importantly, the first and second quantities of pulsed energy may be controlled by controller 126 so that fiber-reinforced tape strip 104 that has been compacted does not peel away from substrate 116 even when virtual curvilinear path 128 has a tight radius. Accordingly, automated fiber-placement system 400 may be used to construct fiber-reinforced composite structures having more complex surface contours than previously possible. Moreover, automated fiber-placement system 400 may be used to manufacture composite parts with unidirectional reinforcement fibers 132 being oriented in desired and/or predetermined orientations throughout the composite part, such as to define desired properties of the composite part that are not possible with standard 0°, +45°, −45°, and 90° layup techniques.

Referring generally to FIG. 1 and particularly to, e.g., FIG. 7, overlapping regions 406 and non-overlapping regions 408 are identical in size. The preceding subject matter of this paragraph characterizes example 42 of the present disclosure, wherein example 42 also includes the subject matter according to example 41, above.

Having overlapping regions 406 and non-overlapping regions 408 identical in size enables automated fiber-placement system 400 to have a constant speed without the need for complex control of energy source 120.

Referring generally to FIG. 1 and particularly to, e.g., FIG. 7, overlapping regions 406 are smaller than non-overlapping regions 408. The preceding subject matter of this paragraph characterizes example 43 of the present disclosure, wherein example 43 also includes the subject matter according to example 41, above.

By having overlapping regions 406 smaller than non-overlapping regions 408, any alteration to the material properties of fiber-reinforced tape strip 104 as a result of the transformation of overlapping regions 406 to discrete tape-regions 148 is minimized. That is, by having non-overlapping regions 408 larger than overlapping regions 406, and as a result of non-overlapping regions 408 not transforming into discrete tape-regions 148, desired material properties of fiber-reinforced tape strip 104 are maintained.

Referring generally to FIG. 1 and particularly to, e.g., FIGS. 3, 4, 7, and 11, discrete tape-regions 148 are structurally different from overlapping regions 406. The preceding subject matter of this paragraph characterizes example 44 of the present disclosure, wherein example 44 also includes the subject matter according to any one of examples 41 to 43, above.

By being structurally transformed, it is meant not only that the geometry changes from overlapping regions 406 to discrete tape-regions 148, but also that unidirectional reinforcement fibers 132 within overlapping regions 406 are manipulated such that they remain parallel to substrate 116, yet do not maintain a uniform parallel relationship within each other within resin tape-matrix 130 across tape-strip width 110. This structural transformation enables fiber-reinforced tape strip 104 to be placed along virtual curvilinear path 128 without unidirectional fibers 132 imparting an undesirable internal stress on fiber-reinforced tape strip 104 that would otherwise cause fiber-reinforced tape strip 104 to peel away from substrate 116.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that virtual curvilinear path 128 comprises arc 156, having radius 134 that is measured from virtual point 136 on virtual line 138 that is perpendicular to virtual curvilinear path 128 and intersects first longitudinal tape-edge 106 and second longitudinal tape-edge 108. In addition, a ratio of tape-strip width 110 to radius 134 is equal to or greater than 0.003. Within each of discrete tape-regions 148, one of unidirectional reinforcement fibers 132 that is closest to first longitudinal tape-edge 106 is more buckled than another one of unidirectional reinforcement fibers 132 that is closest to second longitudinal tape-edge 108. Ones of unidirectional reinforcement fibers 132 that are buckled are parallel to substrate 116. The preceding subject matter of this paragraph characterizes example 45 of the present disclosure, wherein example 45 also includes the subject matter according to any one of examples 41 to 44, above.

As discussed herein, a ratio of tape-strip width 110 to radius 134 being equal to or greater than 0.003 results in a radius of curvature that is tighter than possible utilizing traditional AFP machines without the prepreg tows peeling away from its substrate. By unidirectional reinforcement fibers 132 being more buckled closer to first longitudinal tape-edge 106 than second longitudinal tape-edge 108, first longitudinal tape-edge 106 may have a tighter curve than second longitudinal tape-edge 108, which is necessary for fiber-reinforced tape strip 104 to follow virtual curvilinear path 128 below a threshold curvature without peeling away from substrate 116. By buckling parallel to substrate 116, unidirectional reinforcement fibers 132 do not create internal stress that would otherwise cause fiber-reinforced tape strip 104 to peel away from substrate 116.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and $\pi/64$. The preceding subject matter of this paragraph characterizes example 46 of the present disclosure, wherein example 46 also includes the subject matter according to example 45, above.

As discussed herein, having arc length 154 equal to or greater than a product of radius 134 and $\pi/64$ results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and $\pi/32$. The preceding subject matter of this paragraph characterizes example 47 of the present disclosure, wherein example 47 also includes the subject matter according to example 45, above.

As discussed herein, having arc length 154 equal to or greater than a product of radius 134 and $\pi/32$ results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and $\pi/16$. The preceding subject matter of this paragraph characterizes example 48 of the present disclosure, wherein example 48 also includes the subject matter according to example 45, above.

As discussed herein, having arc length 154 equal to or greater than a product of radius 134 and $\pi/16$ results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and $\pi/8$. The preceding subject matter of this paragraph characterizes example 49 of the present disclosure, wherein example 49 also includes the subject matter according to example 45, above.

As discussed herein, having arc length 154 equal to or greater than a product of radius 134 and $\pi/8$ results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and $\pi/4$. The preceding subject matter of this paragraph characterizes example 50 of the present disclosure, wherein example 50 also includes the subject matter according to example 45, above.

As discussed herein, having arc length 154 equal to or greater than a product of radius 134 and $\pi/4$ results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and $\pi/2$. The preceding subject matter of this paragraph characterizes example 51 of the present disclosure, wherein example 51 also includes the subject matter according to example 45, above.

As discussed herein, having arc length 154 equal to or greater than a product of radius 134 and $\pi/2$ results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and $\pi$. The preceding subject matter of this paragraph characterizes example 52 of the present disclosure, wherein example 52 also includes the subject matter according to example 45, above.

As discussed herein, having arc length 154 equal to or greater than a product of radius 134 and $\pi$ results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and 1.25π. The preceding subject matter of this paragraph characterizes example 53 of the present disclosure, wherein example 53 also includes the subject matter according to example 45, above.

As discussed herein, having arc length 154 equal to or greater than a product of radius 134 and 1.25π results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and 1.5π. The preceding subject matter of this paragraph characterizes example 54 of the present disclosure, wherein example 54 also includes the subject matter according to example 45, above.

As discussed herein, having arc length 154 equal to or greater than a product of radius 134 and 1.5π results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and 1.75π. The preceding subject matter of this paragraph characterizes example 55 of the present disclosure, wherein example 55 also includes the subject matter according to example 45, above.

As discussed herein, having arc length 154 equal to or greater than a product of radius 134 and 1.75π results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 2-4, controller 126 is further programmed to selectively cause steering mechanism 118 to steer placement of at least one fiber-reinforced tape strip 104 against substrate 116 at least along virtual curvilinear path 128 such that arc 156 has arc length 154 that is equal to or greater than a product of radius 134 and 2π. The preceding subject matter of this paragraph characterizes example 56 of the present disclosure, wherein example 56 also includes the subject matter according to example 45, above.

As discussed herein, having arc length 154 equal to or greater than a product of radius 134 and 2π results in virtual curvilinear path 128 being able to maintain a curvature that is tighter for a longer length than would be possible when utilizing traditional AFP machines without the prepreg tows peeling away from the substrate.

Referring generally to FIG. 1 and particularly to, e.g., FIGS. 3 and 4, the ratio of tape-strip width 110 to radius 134 is equal to or greater than 0.005. The preceding subject matter of this paragraph characterizes example 57 of the present disclosure, wherein example 57 also includes the subject matter according to any one of examples 45 to 56, above.

As discussed herein, a ratio of tape-strip width 110 to radius 134 being equal to or greater than 0.005 results in a radius of curvature that is tighter than possible utilizing traditional AFP machines without the prepreg tows peeling away from its substrate.

Referring generally to FIG. 1 and particularly to, e.g., FIGS. 3 and 4, the ratio of tape-strip width 110 to radius 134 is equal to or greater than 0.01. The preceding subject matter of this paragraph characterizes example 58 of the present disclosure, wherein example 58 also includes the subject matter according to any one of examples 45 to 56, above.

As discussed herein, a ratio of tape-strip width 110 to radius 134 being equal to or greater than 0.01 results in a radius of curvature that is tighter than possible utilizing traditional AFP machines without the prepreg tows peeling away from its substrate.

Referring generally to FIG. 1 and particularly to, e.g., FIGS. 3 and 4, the ratio of tape-strip width 110 to radius 134 is equal to or greater than 0.03. The preceding subject matter of this paragraph characterizes example 59 of the present disclosure, wherein example 59 also includes the subject matter according to any one of examples 45 to 56, above.

As discussed herein, a ratio of tape-strip width 110 to radius 134 being equal to or greater than 0.03 results in a radius of curvature that is tighter than possible utilizing traditional AFP machines without the prepreg tows peeling away from its substrate.

Referring generally to FIG. 1 and particularly to, e.g., FIGS. 2-4 and 7, controller 126 is programmed to cause energy source 120 to deliver first quantity of pulsed energy 122 and second quantity of pulsed energy 123 to leading side 114 of compactor 112 so that a first array of locations within overlapping regions 406 of first portions 402 and second portions 404 of at least one fiber-reinforced tape strip 104 is heated to a higher temperature than a second array of locations within overlapping regions 406 of first portions 402 and second portions 404 of at least one fiber-reinforced tape strip 104. Locations in the first array of locations are closer to virtual point 136 than locations in the second array of locations. The preceding subject matter of this paragraph characterizes example 60 of the present disclosure, wherein example 60 also includes the subject matter according to any one of examples 45 to 59, above.

Because locations within overlapping regions 406 that are farther away from virtual point 136 experience a less tight curvature, they need not be heated to as high of a temperature as locations within overlapping regions 406 that are closer to virtual point 136. As a result, the structural integrity of the locations farther away may be maintained.

Referring generally to FIG. 1 and particularly to, e.g., FIGS. 2, 5, and 7, at least one fiber-reinforced tape strip 104 is a plurality of fiber-reinforced tape strips. Compactor 112 is configured to compact the plurality of fiber-reinforced tape strips against substrate 116 in a parallel array of continuous strips. Controller 126 is programmed to cause energy source 120 to deliver first quantity of pulsed energy 122 and second quantity of pulsed energy 123 to leading side 114 of compactor 112 so that overlapping regions 406 of a first subset of the plurality of fiber-reinforced tape strips are heated to a higher temperature than overlapping regions 406 of a second subset of the plurality of fiber-reinforced tape strips. Strips of the second subset of the plurality of fiber-reinforced tape strips are farther away from virtual point 136 than strips of the first subset of the plurality of fiber-reinforced tape strips. The preceding subject matter of this paragraph characterizes example 61 of the present disclosure, wherein example 61 also includes the subject matter according to any one of examples 45 to 60, above.

As discussed herein, it is common for AFP machines to be structured to place a course (a plurality) of prepreg tows. When automated fiber-placement system 400 is so configured, according to example 61, fiber-reinforced tape strips that are closer to virtual point 136 are heated to a higher temperature than fiber-reinforced tape strips that are farther away from virtual point 136 to facilitate the tighter curvature of those that are closer to virtual point 136 and to maintain the structural integrity of those that are farther away from virtual point 136.

Referring generally to FIG. 1 and particularly to, e.g., FIGS. 2 and 5, at least one fiber-reinforced tape strip 104 is a plurality of fiber-reinforced tape strips. Compactor 112 is configured to compact the plurality of fiber-reinforced tape strips against substrate 116 in a parallel array of continuous strips. The preceding subject matter of this paragraph characterizes example 62 of the present disclosure, wherein example 62 also includes the subject matter according to any one of examples 41 to 60, above.

By placing and compacting a plurality of fiber-reinforced tape strips simultaneously, automated fiber-placement system 400 is more efficient in covering a large surface area.

Referring generally to FIG. 1 and particularly to, e.g., FIGS. 2, 5, and 7, energy source 120 is a plurality of energy sources. Each one of the plurality of energy sources is configured to deliver at least one of first quantity of pulsed energy 122 to first portions 402 or second quantity of pulsed energy 123 to second portions 404 of individual ones of the plurality of fiber-reinforced tape strips. The preceding subject matter of this paragraph characterizes example 63 of the present disclosure, wherein example 63 also includes the subject matter according to example 62, above.

Having a plurality of energy sources enables individual control of the delivery of pulsed energy to individual ones of the plurality of fiber-reinforced tape strips, including the control of individual temperatures of overlapping regions 406 to facilitate the transformation of overlapping regions 406 to discrete tape-regions 148.

Referring generally to FIG. 1 and particularly to, e.g., FIG. 2, automated fiber-placement system 400 further comprises sensor 140, which is configured to detect a property of each of the plurality of fiber-reinforced tape strips on trailing side 142 of compactor 112. Controller 126 is programmed to control at least one of feed rate of at least one fiber-reinforced tape strip 104 from dispenser 102 or pulse frequency, pulse power, or pulse duration of at least one of first quantity of pulsed energy 122 or second quantity of pulsed energy 123 responsive to inputs received from sensor 140. The preceding subject matter of this paragraph characterizes example 64 of the present disclosure, wherein example 64 also includes the subject matter according to example 62 or 63, above.

By sensing a property of the fiber-reinforced tape strips following compaction, controller 126 detects if overlapping regions 406 are being transformed into discrete tape-regions 148 in a desired and controlled manner, and also detects if the fiber-reinforced tape strips are being properly adhered and compacted to substrate 116. Moreover, the feedback loop with energy source 120 enables precise adjustment and control of the first and/or second quantities of pulsed energy.

Referring generally to FIG. 1 and particularly to, e.g., FIGS. 3 and 4, tape-strip width 110 is between 5 millimeters (0.2 inches) and 15 millimeters (0.6 inches). The preceding subject matter of this paragraph characterizes example 65 of the present disclosure, wherein example 65 also includes the subject matter according to any one of examples 41 to 64, above.

As discussed herein, Prepreg tows for AFP come in a variety of widths, with quarter-inch (6 millimeters) and half-inch (13 millimeters) prepreg tows being common. Automated fiber-placement system 400 may be configured for any appropriate size of fiber-reinforced tape strips.

Referring generally to FIG. 1 and particularly to, e.g., FIGS. 3 and 4, tape-strip width 110 is less than 15 millimeters (0.6 inches). The preceding subject matter of this paragraph characterizes example 66 of the present disclosure, wherein example 66 also includes the subject matter according to any one of examples 41 to 65, above.

As noted, automated fiber-placement system 400 may be configured for any appropriate size of fiber-reinforced tape strips.

Referring generally to FIG. 1 and particularly to, e.g., FIGS. 3 and 4, tape-strip width 110 is less than 8 millimeters (0.3 inches). The preceding subject matter of this paragraph characterizes example 67 of the present disclosure, wherein example 67 also includes the subject matter according to any one of examples 41 to 65, above.

As noted, automated fiber-placement system 400 may be configured for any appropriate size of fiber-reinforced tape strips.

Referring generally to FIG. 1 and particularly to, e.g., FIGS. 3 and 4, within each of discrete tape-regions 148, at least one of unidirectional reinforcement fibers 132 that are buckled comprises a plurality of folds. The preceding subject matter of this paragraph characterizes example 68 of the present disclosure, wherein example 68 also includes the subject matter according to any one of examples 41 to 67, above.

As discussed herein, a plurality of folds in individuals ones of unidirectional reinforcement fibers 132 permits for tight curves of curvilinear path 128.

Referring generally to FIG. 1 and particularly to, e.g., FIGS. 3, 4, and 11, discrete tape-regions 148 are trapezoidal. The preceding subject matter of this paragraph characterizes example 69 of the present disclosure, wherein example 69 also includes the subject matter according to any one of examples 41 to 68, above.

As discussed herein, by being trapezoidal, discrete tape-regions 148 permit placement of fiber-reinforced tape strip 104 along curvilinear path 128.

Referring generally to FIG. 1 and particularly to, e.g., FIGS. 2-4 and 11, controller 126 is programmed to cause steering mechanism 118 to steer placement of at least one fiber-reinforced tape strip 104 against substrate 116 along virtual curvilinear path 128, such that intermediate tape-regions 150 of at least one fiber-reinforced tape strip 104 are produced between discrete tape-regions 148. The preceding subject matter of this paragraph characterizes example 70 of the present disclosure, wherein example 70 also includes the subject matter according to any one of examples 41 to 69, above.

Intermediate tape-regions 150, which correspond to non-overlapping regions 408, space discrete tape-regions 148 apart from each other and maintain the structural integrity of fiber-reinforced tape strip 104 following being placed and compacted against substrate 116.

Referring generally to FIG. 1 and particularly to, e.g., FIG. 3, within each of intermediate tape-regions 150, all of unidirectional reinforcement fibers 132 are only straight. The preceding subject matter of this paragraph characterizes example 71 of the present disclosure, wherein example 71 also includes the subject matter according to example 70, above.

As discussed herein, because unidirectional reinforcement fibers 132 are not buckled within intermediate tape-regions 150, the structural integrity of intermediate tape-regions 150 is maintained, thereby maximizing the structural integrity of fiber-reinforced tape strips 104 following being placed and compacted against substrate 116.

Referring generally to FIG. 1 and particularly to, e.g., FIGS. 3 and 4, each of unidirectional reinforcement fibers 132 that is buckled within discrete tape-regions 148 is less buckled within intermediate tape-regions 150 than within discrete tape-regions 148. The preceding subject matter of this paragraph characterizes example 72 of the present disclosure, wherein example 72 also includes the subject matter according to example 70, above.

As discussed herein, because unidirectional reinforcement fibers 132 are less buckled within intermediate tape-regions 150, the structural integrity of intermediate tape-regions 150 is maximized, thereby maximizing the structural integrity of fiber-reinforced tape strips 104 following being placed and compacted against substrate 116.

Referring generally to FIG. 1 and particularly to, e.g., FIGS. 3, 4, and 11, intermediate tape-regions 150 are rectangular. The preceding subject matter of this paragraph characterizes example 73 of the present disclosure, wherein example 73 also includes the subject matter according to any one of examples 70 to 72, above.

As discussed herein, by being rectangular, intermediate tape-regions 150 maintain their structural integrity without unidirectional reinforcement fibers 132 imparting undesirable internal stresses within fiber-reinforced tape strip 104 following being placed and compacted against substrate 116.

Referring generally to FIG. 1 and particularly to, e.g., FIGS. 2 and 7, automated fiber-placement system 400 further comprises sensor 140, which is configured to detect a property of at least one fiber-reinforced tape strip 104 on trailing side 142 of compactor 112. Controller 126 is programmed to control at least one of feed rate of at least one fiber-reinforced tape strip 104 from dispenser 102 or pulse frequency, pulse power, or pulse duration of at least one of first quantity of pulsed energy 122 or second quantity of pulsed energy 123 responsive to inputs received from sensor 140. The preceding subject matter of this paragraph characterizes example 74 of the present disclosure, wherein example 74 also includes the subject matter according to any one of examples 41 to 73, above.

By sensing a property of fiber-reinforced tape strip 104 following compaction, controller 126 detects if overlapping regions 406 are being transformed into discrete tape-regions 148 in a desired and controlled manner, and also detects if fiber-reinforced tape strip 104 is being properly adhered and compacted to substrate 116. Moreover, the feedback loop with energy source 120 enables precise adjustment and control of the first and second quantities of pulsed energy.

Referring generally to FIG. 1 and particularly to, e.g., FIG. 2, sensor 140 is a temperature sensor. The preceding subject matter of this paragraph characterizes example 75 of the present disclosure, wherein example 75 also includes the subject matter according to example 74, above.

As discussed, sensing of temperature provides for a simple feedback loop with energy source 120 because, in one or more examples of resin tape-matrix 130, proper adhesion and compaction of fiber-reinforced tape strip 104 against substrate 116 is directly based on temperature.

Referring generally to FIG. 1 and particularly to, e.g., FIGS. 2 and 7, at least one of first quantity of pulsed energy 122 or second quantity of pulsed energy 123 is configured to directly heat unidirectional reinforcement fibers 132 for indirectly heating resin tape-matrix 130 via conduction from unidirectional reinforcement fibers 132. The preceding subject matter of this paragraph characterizes example 76 of the present disclosure, wherein example 76 also includes the subject matter according to any one of examples 41 to 75, above.

As discussed herein, by selecting a wavelength of pulsed energy that directly heats unidirectional reinforcement fibers 132 and that does not directly heat, or at least substantively less directly heats, resin tape-matrix 130, temperatures for resin tape-matrix 130 are targeted that do not adversely affect the material properties of resin tape-matrix 130 and therefore that do not adversely affect the structural integrity of fiber-reinforced tape strip 104 following placement and compaction against substrate 116.

Referring generally to FIG. 1 and particularly to, e.g., FIGS. 2-4 and 7, controller 126 is further programmed to selectively cause steering mechanism 118 to steer placement of at least one fiber-reinforced tape strip 104 against substrate 116 in virtual straight path 152. Controller 126 is programmed to cause energy source 120 to heat overlapping regions 406 that are along virtual curvilinear path 128 to a higher temperature than overlapping regions 406 that are along virtual straight path 152. The preceding subject matter of this paragraph characterizes example 77 of the present disclosure, wherein example 77 also includes the subject matter according to any one of examples 41 to 76, above.

By heating overlapping regions 406 to a lower temperature when along virtual straight path 152 than when along virtual curvilinear path 128, a temperature may be selected that provides for desirable adhesion and compaction against substrate 116 without adversely affecting the structural integrity thereof.

Referring generally to FIG. 1 and particularly to, e.g., FIGS. 3, 4, 12, and 13, virtual curvilinear path 128 is nonplanar. The preceding subject matter of this paragraph characterizes example 78 of the present disclosure, wherein example 78 also includes the subject matter according to any one of examples 41 to 77, above.

When automated fiber-placement system 400 is programmed to place fiber-reinforced tape strip 104 along curvilinear path 128 that is nonplanar, automated fiber-placement system 400 may be used to construct nonplanar articles of manufacture, including those having surfaces with a complex contour.

Referring generally to FIG. 1 and particularly to, e.g., FIGS. 2-4, 12, and 13, substrate 116 comprises a complex contour. The preceding subject matter of this paragraph characterizes example 79 of the present disclosure, wherein example 79 also includes the subject matter according to any one of examples 41 to 78, above.

When substrate 116 comprises a complex contour, automated fiber-placement system 400 is capable of placing and compacting fiber-reinforced tape strip 104 against substrate 116, enabling the construction of articles of manufacture not previously possible with an AFP process.

Referring generally to FIG. 8 and particularly to, e.g., FIGS. 9 and 10, article of manufacture 200 comprises strip 202, which comprises first longitudinal strip-edge 204 and second longitudinal strip-edge 206, parallel to first longitudinal strip-edge 204 and spaced from first longitudinal strip-edge 204 by strip-width 208. Strip 202 extends along and is centered on virtual curvilinear path 128, comprising arc 156, having arc length 154 and radius 134. Radius 134 is measured from virtual point 136 on virtual line 138 that is perpendicular to virtual curvilinear path 128 and intersects first longitudinal strip-edge 204 and second longitudinal strip-edge 206. A ratio of strip-width 208 to radius 134 is greater than or equal to 0.003. Arc length 154 is equal to or greater than a product of radius 134 and π/64. Strip 202 comprises resin strip-matrix 218 and unidirectional reinforcement fibers 132, imbedded in resin strip-matrix 218 and extending along virtual curvilinear path 128. First longitudinal strip-edge 204 is closer to virtual point 136 than second longitudinal strip-edge 206. Strip 202 further comprises discrete strip-regions 222, spaced along virtual curvilinear path 128. Within each of discrete strip-regions 222, one of unidirectional reinforcement fibers 132 that is closest to first longitudinal strip-edge 204 is more buckled than another one of unidirectional reinforcement fibers 132 that is closest to second longitudinal strip-edge 206. Ones of unidirectional reinforcement fibers 132 that are buckled are parallel to a smallest one of virtual surfaces, joining first longitudinal strip-edge 204 and second longitudinal strip-edge 206. The preceding subject matter of this paragraph characterizes example 80 of the present disclosure.

Article of manufacture 200, which may be constructed by an automated fiber-placement system according to the present disclosure or according to an automated fiber-placement method according to the present disclosure, was not previously capable of being manufactured with an AFP machine. Specifically, a ratio of strip-width 208 to radius 134 being equal to or greater than 0.003 is tighter than possible utilizing traditional AFP machines without the prepreg tows peeling away from its substrate. By unidirectional reinforcement fibers 132 being more buckled closer to first longitudinal strip-edge 204 than second longitudinal strip-edge 206, first longitudinal strip-edge 204 may have a tighter curve than second longitudinal strip-edge 206, which is necessary for a fiber-reinforced tape strip (e.g., prepreg tow), that ultimately becomes strip 202, to follow virtual curvilinear path 128 below a threshold curvature without peeling away from the substrate against which it is placed and compacted. By being buckled parallel to a smallest one of virtual surfaces, joining first longitudinal strip-edge 204 and second longitudinal strip-edge 206, unidirectional reinforcement fibers 132 do not create internal stresses that would otherwise cause the fiber-reinforced tape strip that became strip 202 to peel away from the substrate against which it was placed and compacted.

Referring generally to FIG. 8 and particularly to, e.g., FIGS. 9 and 10, the ratio of strip-width 208 to radius 134 is greater than or equal to 0.005. The preceding subject matter of this paragraph characterizes example 81 of the present disclosure, wherein example 81 also includes the subject matter according to example 80, above.

Having a ratio of strip-width 208 to radius 134 being equal to or greater than 0.005, radius 134 of virtual curvilinear path 128 is be tighter than possible utilizing traditional AFP machines without the prepreg tows peeling away from its substrate.

Referring generally to FIG. 8 and particularly to, e.g., FIGS. 9 and 10, the ratio of strip-width 208 to radius 134 is greater than or equal to 0.01. The preceding subject matter of this paragraph characterizes example 82 of the present disclosure, wherein example 82 also includes the subject matter according to example 80 or 81, above.

Having a ratio of strip-width 208 to radius 134 being equal to or greater than 0.01, radius 134 of virtual curvilinear path 128 is be tighter than possible utilizing traditional AFP machines without the prepreg tows peeling away from its substrate.

Referring generally to FIG. 8 and particularly to, e.g., FIGS. 9 and 10, the ratio of strip-width 208 to radius 134 is greater than or equal to 0.03. The preceding subject matter of this paragraph characterizes example 83 of the present disclosure, wherein example 83 also includes the subject matter according to any one of examples 80 to 82, above.

Having a ratio of strip-width 208 to radius 134 being equal to or greater than 0.03, radius 134 of virtual curvilinear path 128 is be tighter than possible utilizing traditional AFP machines without the prepreg tows peeling away from its substrate.

Referring generally to FIG. 8 and particularly to, e.g., FIGS. 9 and 10, arc length 154 is equal to or greater than a product of radius 134 and π/64. The preceding subject matter of this paragraph characterizes example 84 of the present disclosure, wherein example 84 also includes the subject matter according to any one of examples 80 to 83, above.

Having arc length 154 equal to or greater than a product of radius 134 and π/64 results in virtual curvilinear path 128 having a tighter curvature for a longer length than possible utilizing traditional AFP machines without the prepreg tows peeling away from its substrate.

Referring generally to FIG. 8 and particularly to, e.g., FIGS. 9 and 10, arc length 154 is equal to or greater than a product of radius 134 and π/32. The preceding subject matter of this paragraph characterizes example 85 of the present disclosure, wherein example 85 also includes the subject matter according to any one of examples 80 to 83, above.

Having arc length 154 equal to or greater than a product of radius 134 and π/32 results in virtual curvilinear path 128 having a tighter curvature for a longer length than possible utilizing traditional AFP machines without the prepreg tows peeling away from its substrate.

Referring generally to FIG. 8 and particularly to, e.g., FIGS. 9 and 10, arc length 154 is equal to or greater than a product of radius 134 and π/16. The preceding subject matter of this paragraph characterizes example 86 of the present disclosure, wherein example 86 also includes the subject matter according to any one of examples 80 to 83, above.

Having arc length 154 equal to or greater than a product of radius 134 and π/16 results in virtual curvilinear path 128 having a tighter curvature for a longer length than possible utilizing traditional AFP machines without the prepreg tows peeling away from its substrate.

Referring generally to FIG. 8 and particularly to, e.g., FIGS. 9 and 10, arc length 154 is equal to or greater than a product of radius 134 and π/8. The preceding subject matter of this paragraph characterizes example 87 of the present disclosure, wherein example 87 also includes the subject matter according to any one of examples 80 to 83, above.

Having arc length 154 equal to or greater than a product of radius 134 and π/8 results in virtual curvilinear path 128 having a tighter curvature for a longer length than possible utilizing traditional AFP machines without the prepreg tows peeling away from its substrate.

Referring generally to FIG. 8 and particularly to, e.g., FIGS. 9 and 10, arc length 154 is equal to or greater than a product of radius 134 and π/4. The preceding subject matter of this paragraph characterizes example 88 of the present disclosure, wherein example 88 also includes the subject matter according to any one of examples 80 to 83, above.

Having arc length 154 equal to or greater than a product of radius 134 and π/4 results in virtual curvilinear path 128 having a tighter curvature for a longer length than possible utilizing traditional AFP machines without the prepreg tows peeling away from its substrate.

Referring generally to FIG. 8 and particularly to, e.g., FIGS. 9 and 10, arc length 154 is equal to or greater than a product of radius 134 and π/2. The preceding subject matter of this paragraph characterizes example 89 of the present disclosure, wherein example 89 also includes the subject matter according to any one of examples 80 to 83, above.

Having arc length 154 equal to or greater than a product of radius 134 and π/2 results in virtual curvilinear path 128 having a tighter curvature for a longer length than possible utilizing traditional AFP machines without the prepreg tows peeling away from its substrate.

Referring generally to FIG. 8 and particularly to, e.g., FIGS. 9 and 10, arc length 154 is equal to or greater than a product of radius 134 and π. The preceding subject matter of this paragraph characterizes example 90 of the present disclosure, wherein example 90 also includes the subject matter according to any one of examples 80 to 83, above.

Having arc length 154 equal to or greater than a product of radius 134 and π results in virtual curvilinear path 128 having a tighter curvature for a longer length than possible utilizing traditional AFP machines without the prepreg tows peeling away from its substrate.

Referring generally to FIG. 8 and particularly to, e.g., FIGS. 9 and 10, arc length 154 is equal to or greater than a product of radius 134 and 1.25π. The preceding subject matter of this paragraph characterizes example 91 of the present disclosure, wherein example 91 also includes the subject matter according to any one of examples 80 to 83, above.

Having arc length 154 equal to or greater than a product of radius 134 and 1.25π results in virtual curvilinear path 128 having a tighter curvature for a longer length than possible utilizing traditional AFP machines without the prepreg tows peeling away from its substrate.

Referring generally to FIG. 8 and particularly to, e.g., FIGS. 9 and 10, arc length 154 is equal to or greater than a product of radius 134 and 1.5π. The preceding subject matter of this paragraph characterizes example 92 of the present disclosure, wherein example 92 also includes the subject matter according to any one of examples 80 to 83, above.

Having arc length 154 equal to or greater than a product of radius 134 and 1.5π results in virtual curvilinear path 128 having a tighter curvature for a longer length than possible utilizing traditional AFP machines without the prepreg tows peeling away from its substrate.

Referring generally to FIG. 8 and particularly to, e.g., FIGS. 9 and 10, arc length 154 is equal to or greater than a product of radius 134 and 1.75π. The preceding subject matter of this paragraph characterizes example 93 of the present disclosure, wherein example 93 also includes the subject matter according to any one of examples 80 to 83, above.

Having arc length 154 equal to or greater than a product of radius 134 and 1.75π results in virtual curvilinear path 128 having a tighter curvature for a longer length than possible utilizing traditional AFP machines without the prepreg tows peeling away from its substrate.

Referring generally to FIG. 8 and particularly to, e.g., FIGS. 9 and 10, arc length 154 is equal to or greater than a product of radius 134 and 2π. The preceding subject matter of this paragraph characterizes example 94 of the present disclosure, wherein example 94 also includes the subject matter according to any one of examples 80 to 83, above.

Having arc length 154 equal to or greater than a product of radius 134 and 2π results in virtual curvilinear path 128 having a tighter curvature for a longer length than possible utilizing traditional AFP machines without the prepreg tows peeling away from its substrate.

Referring generally to FIG. 8 and particularly to, e.g., FIGS. 9 and 10, strip-width 208 is between 5 millimeters (0.2 inches) and 15 millimeters (0.6 inches). The preceding subject matter of this paragraph characterizes example 95 of the present disclosure, wherein example 95 also includes the subject matter according to any one of examples 80 to 94, above.

Prepreg tows for AFP come in a variety of widths, with quarter-inch (6 millimeters) and half-inch (13 millimeters) prepreg tows being common. Strips 202 of article of manufacture 200 may be formed from any appropriate size of prepreg tows.

Referring generally to FIG. 8 and particularly to, e.g., FIGS. 9 and 10, strip-width 208 is less than 15 millimeters (0.6 inches). The preceding subject matter of this paragraph characterizes example 96 of the present disclosure, wherein example 96 also includes the subject matter according to any one of examples 80 to 94, above.

As noted, strips 202 of article of manufacture 200 may be formed from any appropriate size of prepreg tows.

Referring generally to FIG. 8 and particularly to, e.g., FIGS. 9 and 10, strip-width 208 is less than 8 millimeters (0.3 inches). The preceding subject matter of this paragraph characterizes example 97 of the present disclosure, wherein example 97 also includes the subject matter according to any one of examples 80 to 95, above.

As noted, strips 202 of article of manufacture 200 may be formed from any appropriate size of prepreg tows.

Referring generally to FIG. 8 and particularly to, e.g., FIGS. 9 and 10, within each of discrete strip-regions 222, at least one of unidirectional reinforcement fibers 132 that are buckled comprises a plurality of folds. The preceding subject matter of this paragraph characterizes example 98 of the present disclosure, wherein example 98 also includes the subject matter according to any one of examples 80 to 97, above.

A plurality of folds in individuals ones of unidirectional reinforcement fibers 132 is a result of a prepreg tow having been placed and compacted by an automated fiber-placement system according to the present disclosure along a tight curve of virtual curvilinear path 128.

Referring generally to FIG. 8 and particularly to, e.g., FIGS. 9 and 10, discrete strip-regions 222 are trapezoidal. The preceding subject matter of this paragraph characterizes example 99 of the present disclosure, wherein example 99 also includes the subject matter according to any one of examples 80 to 98, above.

The trapezoidal shape of discrete strip-regions 222 is a result of a prepreg tow having been placed and compacted by an automated fiber-placement system according to the present disclosure along a tight curve of virtual curvilinear path 128.

Referring generally to FIG. 8 and particularly to, e.g., FIGS. 9 and 10, strip 202 further comprises intermediate strip-regions 224. Any two adjacent ones of intermediate strip-regions 224 are separated from each other by one of discrete strip-regions 222. The preceding subject matter of this paragraph characterizes example 100 of the present disclosure, wherein example 100 also includes the subject matter according to any one of examples 80 to 99, above.

Intermediate strip-regions 224 space discrete strip-regions 222 apart from each other and maintain the structural integrity of strip 202.

Referring generally to FIG. 8 and particularly to, e.g., FIG. 9, within each of intermediate strip-regions 224, all of unidirectional reinforcement fibers 132 are only straight. The preceding subject matter of this paragraph characterizes example 101 of the present disclosure, wherein example 101 also includes the subject matter according to example 100, above.

Because unidirectional reinforcement fibers 132 are not buckled within intermediate strip-regions 224, the structural integrity of intermediate strip-regions 224 is maintained, thereby maximizing the structural integrity of strip 202.

Referring generally to FIG. 8 and particularly to, e.g., FIGS. 9 and 10, each of unidirectional reinforcement fibers 132 that are buckled within discrete strip-regions 222 are less buckled within intermediate strip-regions 224 than within discrete strip-regions 222. The preceding subject matter of this paragraph characterizes example 102 of the present disclosure, wherein example 102 also includes the subject matter according to example 100, above.

Because unidirectional reinforcement fibers 132 are less buckled within intermediate strip-regions 224, the structural integrity of intermediate strip-regions 224 is maximized, thereby maximizing the structural integrity of strip 202.

Referring generally to FIG. 8 and particularly to, e.g., FIGS. 9 and 10, intermediate strip-regions 224 are rectangular. The preceding subject matter of this paragraph characterizes example 103 of the present disclosure, wherein example 103 also includes the subject matter according to any one of examples 100 to 102, above.

By being rectangular, intermediate tape-regions 150 maintain their structural integrity without unidirectional reinforcement fibers 132 imparting undesirable internal stresses within strip 202.

Referring generally to FIG. 8 and particularly to, e.g., FIGS. 12 and 13, strip 202 is nonplanar. The preceding subject matter of this paragraph characterizes example 104 of the present disclosure, wherein example 104 also includes the subject matter according to any one of examples 80 to 103, above.

By being nonplanar, strip 202 may be of an article of manufacture that previously could not be manufactured with a traditional AFP machine.

Referring generally to FIG. 8 and particularly to, e.g., FIGS. 12 and 13, article of manufacture 200 is aircraft 228. The preceding subject matter of this paragraph characterizes example 105 of the present disclosure, wherein example 105 also includes the subject matter according to any one of examples 80 to 104, above.

Aircraft 228 therefore may be at least partially constructed utilizing automated fiber-placement systems according to the present disclosure or according to automated fiber-placement methods according to the present disclosure.

Referring generally to FIG. 8 and particularly to, e.g., FIGS. 12 and 13, aircraft 228 comprises nose region 230, and nose region 230 comprises strip 202. The preceding subject matter of this paragraph characterizes example 106 of the present disclosure, wherein example 106 also includes the subject matter according to example 105, above.

Nose regions of aircraft often having complex contours, which previously could not be constructed utilizing traditional AFP machines and processes.

As discussed herein, FIGS. 12 and 13 schematically represent tool (layup mandrel) 250, corresponding to a portion of a fuselage of aircraft 228, having nose region 230, in which sub-region 252 of nose region 230 comprises complex contours.

Referring generally to FIG. 14 and particularly to, e.g., FIGS. 2-6 and 11, automated fiber-placement method 300 comprises (block 302) delivering first quantity of pulsed energy 122 to first discrete portions 124 of at least one fiber-reinforced tape strip 104. Automated fiber-placement method 300 also comprises (block 303) delivering second quantity of pulsed energy 123 to second discrete portions 125 of at least one fiber-reinforced tape strip 104, alternating with first discrete portions 124. Any two adjacent ones of first discrete portions 124 are separated from each other by one of second discrete portions 125. First quantity of pulsed energy 122 heats first discrete portions 124 of at least one fiber-reinforced tape strip 104 to a first temperature. Second quantity of pulsed energy 123 heats second discrete portions 125 of at least one fiber-reinforced tape strip 104 to a second temperature. At least one fiber-reinforced tape 104 comprises first longitudinal tape-edge 106 and second longitudinal tape-edge 108, parallel to first longitudinal tape-edge 106 and spaced from first longitudinal tape-edge 106 by tape-strip width 110. At least one fiber-reinforced tape strip 104 comprises resin tape-matrix 130 and unidirectional reinforcement fibers 132, imbedded in resin tape-matrix 130. Automated fiber-placement method 300 additionally comprises (block 304) laying down at least one fiber-reinforced tape strip 104 against substrate 116 along virtual curvilinear path 128, such that (i) at least one fiber-reinforced tape strip 104 is centered on virtual curvilinear path 128, and (ii) first discrete portions 124 of at least one fiber-reinforced tape strip 104 are transformed into discrete tape-regions 148, geometrically different from first discrete portions 124. The preceding subject matter of this paragraph characterizes example 107 of the present disclosure.

The delivery of first quantity of pulsed energy 122 and second quantity of pulsed energy to alternating discrete portions of fiber-reinforced tape strip 104 results in the creation of spaced-apart discrete tape-regions 148, corresponding to first discrete portions 124. Accordingly, when fiber-reinforced tape strip 104 is laid-down against substrate 116 along virtual curvilinear path 128, first discrete portions 124, which are spaced-apart from each other, are geometrically transformed into discrete tape-regions 148. Importantly, first quantity of pulsed energy 122 may be controlled so that fiber-reinforced tape strip 104 that was placed does not peel away from substrate 116 even when virtual curvilinear path 128 has a tight radius. Accordingly, automated fiber-placement method 300 may be implemented to construct fiber-reinforced composite structures having more complex surface contours than previously possible. Moreover, automated fiber-placement method 300 may be implemented to manufacture composite parts with unidirectional reinforcement fibers 132 being oriented in desired and/or predetermined orientations throughout the composite part, such as to define desired properties of the composite part that are not possible with standard 0°, +45°, −45°, and 90° layup techniques.

Referring generally to FIG. 14 and particularly to, e.g., FIG. 6, according to automated fiber-placement method 300, the second temperature is lower than the first temperature. The preceding subject matter of this paragraph characterizes example 108 of the present disclosure, wherein example 108 also includes the subject matter according to example 107, above.

As discussed herein, the second temperature therefore may be selected to ensure that second discrete portions 125 are heated to a temperature that provides for suitable adhesion to and compaction against substrate 116 and without damage or undesirable effects to resin tape-matrix 130 of second discrete portions 125. In addition, the first temperature therefore may be selected to ensure not only that first discrete portions 124 are heated to a temperature that provides for suitable adhesion to and compaction against substrate 116, but also that first discrete portions 124 are heated to a temperature that enables first discrete portions 124 to be transformed into discrete tape-regions 148. In particular, the first temperature is hot enough to permit unidirectional reinforcement fibers 132 to remain parallel to substrate 116 even when buckling as a result of fiber-reinforced tape strip 104 being placed along virtual curvilinear path 128 (e.g., remaining in-plane when substrate 116 is planar, or remaining within the nominal thickness of fiber-reinforced tape strip 104 where substrate 16 is nonplanar), as opposed to buckling out-of-plane/away from substrate 116.

Referring generally to FIG. 14 and particularly to, e.g., FIG. 6, according to automated fiber-placement method 300, first discrete portions 124 and second discrete portions 125 are identical in size. The preceding subject matter of this paragraph characterizes example 109 of the present disclosure, wherein example 109 also includes the subject matter according to example 107 or 108, above.

Having first discrete portions 124 and second discrete portions 125 identical in size enables fiber-reinforced tape strip 104 to be paid down at a constant speed without the need for complex control of the first and second quantities of pulsed energy.

Referring generally to FIG. 14 and particularly to, e.g., FIG. 6, according to automated fiber-placement method 300, first discrete portions 124 are smaller than second discrete portions 125. The preceding subject matter of this paragraph characterizes example 110 of the present disclosure, wherein example 110 also includes the subject matter according to example 107 or 108, above.

As discussed herein, by having first discrete portions 124 smaller than second discrete portions 125, any alteration to the material properties of fiber-reinforced tape strip 104 as a result of the transformation of first discrete portions 124 to discrete tape-regions 148 is minimized. That is, by having second discrete portions 125 larger than first discrete portions 124, and as a result of second discrete portions 125 not transforming into discrete tape-regions 148, desired material properties of fiber-reinforced tape strip 104 are maintained.

Referring generally to FIG. 14 and particularly to, e.g., FIGS. 3, 4, and 11, according to automated fiber-placement method 300, discrete tape-regions 148 are structurally different from first discrete portions 124. The preceding subject matter of this paragraph characterizes example 111 of the present disclosure, wherein example 111 also includes the subject matter according to any one of examples 107 to 110, above.

As discussed herein, by being structurally transformed, it is meant not only that the geometry changes from first discrete portions 124 to discrete tape-regions 148, but also that unidirectional reinforcement fibers 132 within first discrete portions 124 are manipulated such that they remain parallel to substrate 116, yet do not maintain a uniform parallel relationship within each other within resin tape-matrix 130 across tape-strip width 110. This structural transformation enables fiber-reinforced tape strip 104 to be placed along virtual curvilinear path 128 without unidirectional reinforcement fibers 132 imparting an undesirable internal stress on fiber-reinforced tape strip 104 that would otherwise cause fiber-reinforced tape strip 104 to peel away from substrate 116.

Referring generally to FIG. 14 and particularly to, e.g., FIGS. 3 and 4, according to automated fiber-placement method 300, virtual curvilinear path 128 comprises arc 156, having radius 134 that is measured from virtual point 136 on virtual line 138 that is perpendicular to virtual curvilinear path 128 and intersects first longitudinal tape-edge 106 and second longitudinal tape-edge 108. A ratio of tape-strip width 110 to radius 134 is equal to or greater than 0.003. Within each of discrete tape-regions 148, one of unidirectional reinforcement fibers 132 that is closest to first longitudinal tape-edge 106 is more buckled than another one of unidirectional reinforcement fibers 132 that is closest to second longitudinal tape-edge 108. Ones of unidirectional reinforcement fibers 132 that are buckled are parallel to substrate 116. The preceding subject matter of this paragraph characterizes example 112 of the present disclosure, wherein example 112 also includes the subject matter according to any one of examples 107 to 111, above.

As discussed herein, a ratio of tape-strip width 110 to radius 134 being equal to or greater than 0.003 results in a radius of curvature that is tighter than possible utilizing traditional AFP machines and processes without the prepreg tows peeling away from its substrate. By unidirectional reinforcement fibers 132 being more buckled closer to first longitudinal tape-edge 106 than second longitudinal tape-edge 108, first longitudinal tape-edge 106 may have a tighter curve than second longitudinal tape-edge 108, which is necessary for fiber-reinforced tape strip 104 to follow virtual curvilinear path 128 below a threshold curvature without peeling away from substrate 116. By buckling parallel to substrate 116, unidirectional reinforcement fibers 132 do not create internal stress that would otherwise cause fiber-reinforced tape strip 104 to peel away from substrate 116.

Referring generally to FIG. 14 and particularly to, e.g., FIGS. 3 and 4, according to automated fiber-placement method 300, arc 156 has arc length 154 that is equal to or greater than a product of radius 134 and π/64. The preceding subject matter of this paragraph characterizes example 113 of the present disclosure, wherein example 113 also includes the subject matter according to example 112, above.

As discussed herein, having arc length 154 equal to or greater than a product of radius 134 and π/64 results in virtual curvilinear path 128 being able to maintain a curvature that is tighter for a longer length than would be possible when utilizing traditional AFP machines and processes without the prepreg tows peeling away from the substrate.

Referring generally to FIG. 14 and particularly to, e.g., FIGS. 3 and 4, according to automated fiber-placement method 300, arc 156 has arc length 154 that is equal to or greater than a product of radius 134 and π/32. The preceding subject matter of this paragraph characterizes example 114 of the present disclosure, wherein example 114 also includes the subject matter according to example 112, above.

As discussed herein, having arc length 154 equal to or greater than a product of radius 134 and π/32 results in virtual curvilinear path 128 being able to maintain a curvature that is tighter for a longer length than would be possible when utilizing traditional AFP machines and processes without the prepreg tows peeling away from the substrate.

Referring generally to FIG. 14 and particularly to, e.g., FIGS. 3 and 4, according to automated fiber-placement method 300, arc 156 has arc length 154 that is equal to or greater than a product of radius 134 and π/16. The preceding subject matter of this paragraph characterizes example 115 of the present disclosure, wherein example 115 also includes the subject matter according to example 112, above.

As discussed herein, having arc length 154 equal to or greater than a product of radius 134 and π/16 results in virtual curvilinear path 128 being able to maintain a curvature that is tighter for a longer length than would be possible when utilizing traditional AFP machines and processes without the prepreg tows peeling away from the substrate.

Referring generally to FIG. 14 and particularly to, e.g., FIGS. 3 and 4, according to automated fiber-placement method 300, arc 156 has arc length 154 that is equal to or greater than a product of radius 134 and π/8. The preceding subject matter of this paragraph characterizes example 116 of the present disclosure, wherein example 116 also includes the subject matter according to example 112, above.

As discussed herein, having arc length 154 equal to or greater than a product of radius 134 and π/8 results in virtual curvilinear path 128 being able to maintain a curvature that is tighter for a longer length than would be possible when utilizing traditional AFP machines and processes without the prepreg tows peeling away from the substrate.

Referring generally to FIG. 14 and particularly to, e.g., FIGS. 3 and 4, according to automated fiber-placement method 300, arc 156 has arc length 154 that is equal to or greater than a product of radius 134 and π/4. The preceding subject matter of this paragraph characterizes example 117 of the present disclosure, wherein example 117 also includes the subject matter according to example 112, above.

As discussed herein, having arc length 154 equal to or greater than a product of radius 134 and π/4 results in virtual curvilinear path 128 being able to maintain a curvature that is tighter for a longer length than would be possible when utilizing traditional AFP machines and processes without the prepreg tows peeling away from the substrate.

Referring generally to FIG. 14 and particularly to, e.g., FIGS. 3 and 4, according to automated fiber-placement method 300, arc 156 has arc length 154 that is equal to or greater than a product of radius 134 and π/2. The preceding subject matter of this paragraph characterizes example 118 of the present disclosure, wherein example 118 also includes the subject matter according to example 112, above.

As discussed herein, having arc length 154 equal to or greater than a product of radius 134 and π/2 results in virtual curvilinear path 128 being able to maintain a curvature that is tighter for a longer length than would be possible when utilizing traditional AFP machines and processes without the prepreg tows peeling away from the substrate.

Referring generally to FIG. 14 and particularly to, e.g., FIGS. 3 and 4, according to automated fiber-placement method 300, arc 156 has arc length 154 that is equal to or greater than a product of radius 134 and π. The preceding subject matter of this paragraph characterizes example 119 of the present disclosure, wherein example 119 also includes the subject matter according to example 112, above.

As discussed herein, having arc length 154 equal to or greater than a product of radius 134 and π results in virtual curvilinear path 128 being able to maintain a curvature that is tighter for a longer length than would be possible when utilizing traditional AFP machines and processes without the prepreg tows peeling away from the substrate.

Referring generally to FIG. 14 and particularly to, e.g., FIGS. 3 and 4, according to automated fiber-placement method 300, arc 156 has arc length 154 that is equal to or greater than a product of radius 134 and 1.25π. The preceding subject matter of this paragraph characterizes example 120 of the present disclosure, wherein example 120 also includes the subject matter according to example 112, above.

As discussed herein, having arc length 154 equal to or greater than a product of radius 134 and 1.25π results in virtual curvilinear path 128 being able to maintain a curvature that is tighter for a longer length than would be possible when utilizing traditional AFP machines and processes without the prepreg tows peeling away from the substrate.

Referring generally to FIG. 14 and particularly to, e.g., FIGS. 3 and 4, according to automated fiber-placement method 300, arc 156 has arc length 154 that is equal to or greater than a product of radius 134 and 1.5π. The preceding subject matter of this paragraph characterizes example 121 of the present disclosure, wherein example 121 also includes the subject matter according to example 112, above.

As discussed herein, having arc length 154 equal to or greater than a product of radius 134 and 1.5π results in virtual curvilinear path 128 being able to maintain a curvature that is tighter for a longer length than would be possible when utilizing traditional AFP machines and processes without the prepreg tows peeling away from the substrate.

Referring generally to FIG. 14 and particularly to, e.g., FIGS. 3 and 4, according to automated fiber-placement method 300, arc 156 has arc length 154 that is equal to or greater than a product of radius 134 and 1.75π. The preceding subject matter of this paragraph characterizes example 122 of the present disclosure, wherein example 122 also includes the subject matter according to example 112, above.

As discussed herein, having arc length 154 equal to or greater than a product of radius 134 and 1.75π results in virtual curvilinear path 128 being able to maintain a curvature that is tighter for a longer length than would be possible when utilizing traditional AFP machines and processes without the prepreg tows peeling away from the substrate.

Referring generally to FIG. 14 and particularly to, e.g., FIGS. 3 and 4, according to automated fiber-placement method 300, arc 156 has arc length 154 that is equal to or greater than a product of radius 134 and 211. The preceding subject matter of this paragraph characterizes example 123 of the present disclosure, wherein example 123 also includes the subject matter according to example 112, above.

As discussed herein, having arc length 154 equal to or greater than a product of radius 134 and 211 results in virtual curvilinear path 128 being able to maintain a curvature that is tighter for a longer length than would be possible when utilizing traditional AFP machines and processes without the prepreg tows peeling away from the substrate.

Referring generally to FIG. 14 and particularly to, e.g., FIGS. 3 and 4, according to automated fiber-placement method 300, the ratio of tape-strip width 110 to radius 134 is greater than or equal to 0.005. The preceding subject matter of this paragraph characterizes example 124 of the present disclosure, wherein example 124 also includes the subject matter according to any one of examples 112 to 123, above.

As discussed herein, a ratio of tape-strip width 110 to radius 134 being equal to or greater than 0.005 results in a radius of curvature that is tighter than possible utilizing traditional AFP machines without the prepreg tows peeling away from its substrate.

Referring generally to FIG. 14 and particularly to, e.g., FIGS. 3 and 4, according to automated fiber-placement method 300, the ratio of tape-strip width 110 to radius 134 is greater than or equal to 0.01. The preceding subject matter of this paragraph characterizes example 125 of the present disclosure, wherein example 125 also includes the subject matter according to any one of examples 112 to 124, above.

As discussed herein, a ratio of tape-strip width 110 to radius 134 being equal to or greater than 0.01 results in a radius of curvature that is tighter than possible utilizing traditional AFP machines without the prepreg tows peeling away from its substrate.

Referring generally to FIG. 14 and particularly to, e.g., FIGS. 3 and 4, according to automated fiber-placement method 300, the ratio of tape-strip width 110 to radius 134 is greater than or equal to 0.03. The preceding subject matter of this paragraph characterizes example 126 of the present disclosure, wherein example 126 also includes the subject matter according to any one of examples 112 to 125, above.

As discussed herein, a ratio of tape-strip width 110 to radius 134 being equal to or greater than 0.03 results in a radius of curvature that is tighter than possible utilizing traditional AFP machines without the prepreg tows peeling away from its substrate.

Referring generally to FIG. 14 and particularly to, e.g., FIGS. 2-4 and 6, according to automated fiber-placement method 300, the step of (block 302) delivering first quantity of pulsed energy 122 to first discrete portions 124 of at least one fiber-reinforced tape strip 104 comprises heating a first array of locations within first discrete portions 124 of at least one fiber-reinforced tape strip 104 to a higher temperature than a second array of locations within first discrete portions 124 of at least one fiber-reinforced tape strip 104. Locations in the first array of locations are closer to virtual point 136 than locations in the second array of locations. The preceding subject matter of this paragraph characterizes example 127 of the present disclosure, wherein example 127 also includes the subject matter according to any one of examples 112 to 126, above.

As disused herein, because locations within first discrete portions 124 that are farther away from virtual point 136 experience a less tight curvature, they need not be heated to as high of a temperature as locations within first discrete portions 124 that are closer to virtual point 136. As a result, the structural integrity of the locations farther away may be maintained.

Referring generally to FIG. 14 and particularly to, e.g., FIGS. 2, 5, and 6, according to automated fiber-placement method 300, at least one fiber-reinforced tape strip 104 is a plurality of fiber-reinforced tape strips. The step of (block 304) laying down at least one fiber-reinforced tape strip 104 against substrate 116 along virtual curvilinear path 128 comprises laying down the plurality of fiber-reinforced tape strips in a parallel array of continuous strips. The step of (block 302) delivering first quantity of pulsed energy 122 to first discrete portions 124 of at least one fiber-reinforced tape strip 104 comprises heating first discrete portions 124 of a first subset of the plurality of fiber-reinforced tape strips to a higher temperature than first discrete portions 124 of a second subset of the plurality of fiber-reinforced tape strips. Strips of the second subset of the plurality of fiber-reinforced tape strips are farther away from virtual point 136 than strips of the first subset of the plurality of fiber-reinforced tape strips. The preceding subject matter of this paragraph characterizes example 128 of the present disclosure, wherein example 128 also includes the subject matter according to any one of examples 112 to 127, above.

As discussed herein, it is common for AFP machines to be structured to place a course (a plurality) of prepreg tows. When automated fiber-placement method 300 is so implemented, according to example 128, fiber-reinforced tape strips that are closer to virtual point 136 are heated to a higher temperature than fiber-reinforced tape strips that are farther away from virtual point 136 to facilitate the tighter curvature of those that are closer to virtual point 136 and to maintain the structural integrity of those that are farther away from virtual point 136.

Referring generally to FIG. 14 and particularly to, e.g., FIGS. 2, 5, and 6, according to automated fiber-placement method 300, at least one fiber-reinforced tape strip 104 is a plurality of fiber-reinforced tape strips. The step of (block 304) laying down at least one fiber-reinforced tape strip 104 against substrate 116 along virtual curvilinear path 128 comprises laying down the plurality of fiber-reinforced tape strips in a parallel array of continuous strips. The preceding subject matter of this paragraph characterizes example 129 of the present disclosure, wherein example 129 also includes the subject matter according to any one of examples 107 to 127, above.

By placing a plurality of fiber-reinforced tape strips simultaneously, automated fiber-placement method 300 is more efficient in covering a large surface area.

Referring generally to FIG. 14 and particularly to, e.g., FIGS. 2-4 and 6, method 300 further comprises steps of (block 312) detecting a property of first discrete portions 124 of each of the plurality of fiber-reinforced tape strips after delivery of first quantity of pulsed energy 122, and (block 314) controlling at least one of first quantity of pulsed energy 122 or a rate of laying down at least one fiber-reinforced tape strip 104 against substrate 116 along virtual curvilinear path 128 responsive to the property of first discrete portions 124 of each of the plurality of fiber-reinforced tape strips. The preceding subject matter of this paragraph characterizes example 130 of the present disclosure, wherein example 130 also includes the subject matter according to example 128 or 129, above.

By detecting a property of first discrete portions 124 after delivery of first quantity of pulsed energy 122, it can be determined if first discrete portions 124 are being transformed into discrete tape-regions 148 in a desired and controlled manner, and also if the fiber-reinforced tape strips are being properly adhered and compacted to substrate 116. Moreover, the feedback loop with control of first quantity of pulsed energy 122 enables precise adjustment and control of first quantity of pulsed energy 122.

Referring generally to FIG. 14 and particularly to, e.g., FIGS. 3 and 4, according to automated fiber-placement method 300, tape-strip width 110 is between 5 millimeters (0.2 inches) and 15 millimeters (0.6 inches). The preceding subject matter of this paragraph characterizes example 131 of the present disclosure, wherein example 131 also includes the subject matter according to any one of examples 107 to 130, above.

As discussed, prepreg tows for AFP come in a variety of widths, with quarter-inch (6 millimeters) and half-inch (13 millimeters) prepreg tows being common. Automated fiber-placement method 300 may be implemented with any appropriate size of fiber-reinforced tape strips.

Referring generally to FIG. 14 and particularly to, e.g., FIGS. 3 and 4, according to automated fiber-placement method 300, tape-strip width 110 is less than 15 millimeters (0.6 inches). The preceding subject matter of this paragraph characterizes example 132 of the present disclosure, wherein example 132 also includes the subject matter according to any one of examples 107 to 130, above.

As noted, automated fiber-placement method 300 may be implemented with any appropriate size of fiber-reinforced tape strips.

Referring generally to FIG. 14 and particularly to, e.g., FIGS. 3 and 4, according to automated fiber-placement method 300, tape-strip width 110 is less than 8 millimeters (0.3 inches). The preceding subject matter of this paragraph characterizes example 133 of the present disclosure, wherein example 133 also includes the subject matter according to any one of examples 107 to 131, above.

As noted, automated fiber-placement method 300 may be implemented with any appropriate size of fiber-reinforced tape strips.

Referring generally to FIG. 14 and particularly to, e.g., FIGS. 2-4, according to automated fiber-placement method 300, the step of (block 304) laying down at least one fiber-reinforced tape strip 104 against substrate 116 along virtual curvilinear path 128 comprises (block 306) compacting at least one fiber-reinforced tape strip 104 against substrate 116. The preceding subject matter of this paragraph characterizes example 134 of the present disclosure, wherein example 134 also includes the subject matter according to any one of examples 107 to 133, above.

Compaction of fiber-reinforced tape strip 104 against substrate 116 ensures proper adhesion against a prior layer of fiber-reinforced tape strip 104.

Referring generally to FIG. 14 and particularly to, e.g., FIGS. 3 and 4, according to automated fiber-placement method 300, within each of discrete tape-regions 148, at least one of unidirectional reinforcement fibers 132 that are buckled comprises a plurality of folds. The preceding subject matter of this paragraph characterizes example 135 of the present disclosure, wherein example 135 also includes the subject matter according to any one of examples 107 to 134, above.

As discussed herein, a plurality of folds in individuals ones of unidirectional reinforcement fibers 132 permits for tight curves of virtual curvilinear path 128.

Referring generally to FIG. 14 and particularly to, e.g., FIGS. 3 and 4, according to automated fiber-placement method 300, discrete tape-regions 148 are trapezoidal. The preceding subject matter of this paragraph characterizes example 136 of the present disclosure, wherein example 136 also includes the subject matter according to any one of examples 107 to 135, above.

As discussed herein, by being trapezoidal, discrete tape-regions 148 permit placement of fiber-reinforced tape strip 104 along virtual curvilinear path 128.

Referring generally to FIG. 14 and particularly to, e.g., FIGS. 2-4, according to automated fiber-placement method 300, the step of (block 304) laying down at least one fiber-reinforced tape strip 104 against substrate 116 along virtual curvilinear path 128 results in second discrete portions 125 becoming intermediate tape-regions 150, separated from each other by discrete tape-regions 148. The preceding subject matter of this paragraph characterizes example 137 of the present disclosure, wherein example 137 also includes the subject matter according to any one of examples 107 to 136, above.

As discussed herein, intermediate tape-regions 150 space discrete tape-regions 148 apart from each other and maintain the structural integrity of fiber-reinforced tape strip 104 following being placed and compacted against substrate 116.

Referring generally to FIG. 14 and particularly to, e.g., FIG. 3, according to automated fiber-placement method 300, within each of intermediate tape-regions 150, all of unidirectional reinforcement fibers 132 are only straight. The preceding subject matter of this paragraph characterizes example 138 of the present disclosure, wherein example 138 also includes the subject matter according to example 137, above.

As discussed herein, because unidirectional reinforcement fibers 132 are not buckled within intermediate tape-regions 150, the structural integrity of intermediate tape-regions 150 is maintained, thereby maximizing the structural integrity of fiber-reinforced tape strip 104 following being placed and compacted against substrate 116.

Referring generally to FIG. 14 and particularly to, e.g., FIGS. 3, 4, and 11, according to automated fiber-placement method 300, each of unidirectional reinforcement fibers 132 that are buckled within discrete tape-regions 148 are less buckled within intermediate tape-regions 150 than within discrete tape-regions 148. The preceding subject matter of this paragraph characterizes example 139 of the present disclosure, wherein example 139 also includes the subject matter according to example 137, above.

As discussed herein, because unidirectional reinforcement fibers 132 are less buckled within intermediate tape-regions 150, the structural integrity of intermediate tape-regions 150 is maximized, thereby maximizing the structural integrity of fiber-reinforced tape strips 104 following being placed and compacted against substrate 116.

Referring generally to FIG. 14 and particularly to, e.g., FIGS. 3, 4, and 11, according to automated fiber-placement method 300, intermediate tape-regions 150 are rectangular. The preceding subject matter of this paragraph characterizes example 140 of the present disclosure, wherein example 140 also includes the subject matter according to any one of examples 137 to 139, above.

As discussed herein, by being rectangular, intermediate tape-regions 150 maintain their structural integrity without unidirectional reinforcement fibers 132 imparting undesirable internal stresses within fiber-reinforced tape strip 104 following being placed and compacted against substrate 116.

Referring generally to FIG. 14 and particularly to, e.g., FIGS. 2 and 6, automated fiber-placement method 300 further comprises steps of (block 308) detecting a property of at least one fiber-reinforced tape strip 104 after delivery of first quantity of pulsed energy 122 and delivery of second quantity of pulsed energy 123, and (block 310) controlling at least one of first quantity of pulsed energy 122, second quantity of pulsed energy 123, or a rate of laying down at least one fiber-reinforced tape strip 104 against substrate 116 along virtual curvilinear path 128 responsive to the property of at least one fiber-reinforced tape strip 104. The preceding subject matter of this paragraph characterizes example 141 of the present disclosure, wherein example 141 also includes the subject matter according to any one of examples 107 to 140, above.

By detecting a property of fiber-reinforced tape strip 104 after delivery of first quantity of pulsed energy 122, it can be determined if first discrete portions 124 are being transformed into discrete tape-regions 148 in a desired and controlled manner, and also if fiber-reinforced tape strip 104 is being properly adhered and compacted to substrate 116. Moreover, the feedback loop with control of the first and/or second quantities of energy enables precise adjustment and control of the first and/or second quantities of pulsed energy.

Referring generally to FIG. 14, according to automated fiber-placement method 300, the property is temperature. The preceding subject matter of this paragraph characterizes example 142 of the present disclosure, wherein example 142 also includes the subject matter according to example 141, above.

Detecting temperature provides for a simple feedback loop for the control of the first and/or second quantities of pulsed energy because, in one or more examples of resin tape-matrix 130, proper adhesion and compaction of fiber-reinforced tape strip 104 against substrate 116 is directly based on temperature.

Referring generally to FIG. 14 and particularly to, e.g., FIG. 6, according to automated fiber-placement method 300, at least one of the step of (block 302) delivering first quantity of pulsed energy 122 to first discrete portions 124 of at least one fiber-reinforced tape strip 104 or the step of (block 303) delivering second quantity of pulsed energy 123 to second discrete portions 125 of at least one fiber-reinforced tape strip 104 comprises directly heating unidirectional reinforcement fibers 132 and indirectly heating resin tape-matrix 130 via conduction from unidirectional reinforcement fibers 132. The preceding subject matter of this paragraph characterizes example 143 of the present disclosure, wherein example 143 also includes the subject matter according to any one of examples 107 to 142, above.

As discussed herein, by selecting a wavelength of pulsed energy that directly heats unidirectional reinforcement fibers 132 and that does not directly heat, or at least substantively less directly heats, resin tape-matrix 130, temperatures for resin tape-matrix 130 are targeted that do not adversely affect the material properties of resin tape-matrix 130 and therefore that do not adversely affect the structural integrity of fiber-reinforced tape strip 104 following placement and compaction against substrate 116.

Referring generally to FIG. 14 and particularly to, e.g., FIGS. 2-4 and 6, automated fiber-placement method 300 further comprises a step of (block 316) laying down at least one fiber-reinforced tape strip 104 against substrate 116 along virtual straight path 152. The step of (block 302) delivering first quantity of pulsed energy 122 to first discrete portions 124 of at least one fiber-reinforced tape strip 104 comprises heating first discrete portions 124 that are along virtual curvilinear path 128 to a higher temperature than first discrete portions 124 that are along virtual straight path 152. The preceding subject matter of this paragraph characterizes example 144 of the present disclosure, wherein example 144 also includes the subject matter according to any one of examples 107 to 143, above.

As discussed herein, by heating first discrete portions 124 to a lower temperature when along virtual straight path 152 than when along virtual curvilinear path 128, a temperature may be selected that provides for desirable adhesion and compaction against substrate 116 without adversely affecting the structural integrity thereof.

Referring generally to FIG. 14 and particularly to, e.g., FIGS. 3, 4, 12, and 13, according to automated fiber-placement method 300, virtual curvilinear path 128 is nonplanar. The preceding subject matter of this paragraph characterizes example 145 of the present disclosure, wherein example 145 also includes the subject matter according to any one of examples 107 to 144, above.

When automated fiber-placement method 300 is implemented to place fiber-reinforced tape strip 104 along virtual curvilinear path 128 that is nonplanar, automated fiber-placement method 300 may be implemented to construct nonplanar articles of manufacture, including those having surfaces with complex contours.

Referring generally to FIG. 14 and particularly to, e.g., FIGS. 3, 4, 12, and 13, according to automated fiber-placement method 300, substrate 116 comprises a complex contour. The preceding subject matter of this paragraph characterizes example 146 of the present disclosure, wherein example 146 also includes the subject matter according to any one of examples 107 to 145, above.

When substrate 116 comprises a complex contour, automated fiber-placement method 300 is capable of placing and compacting fiber-reinforced tape strip 104 against substrate 116, enabling the construction of articles of manufacture not previously possible with traditional AFP processes.

Referring generally to FIG. 14 and particularly to, e.g., FIGS. 2-4 and 11, according to automated fiber-placement method 300, following the step of (block 304) laying down at least one fiber-reinforced tape strip 104 against substrate 116 along virtual curvilinear path 128, at least one fiber-reinforced tape strip 104 does not peel away from substrate 116. The preceding subject matter of this paragraph characterizes example 147 of the present disclosure, wherein example 147 also includes the subject matter according to any one of examples 107 to 146, above.

Because fiber-reinforced tape strip 104 does not peel away from substrate 116, the desired structural integrity of fiber-reinforced tape strip 104 is maintained, and a resulting composite part may be cured to create an article of manufacture with desirable properties.

Referring generally to FIG. 14 and particularly to, e.g., FIGS. 2-4 and 11-13, automated fiber-placement method 300 further comprises, following the step of (block 304) laying down at least one fiber-reinforced tape strip 104 against substrate 116 along virtual curvilinear path 128, a step of (block 318) curing at least one fiber-reinforced tape strip 104 to form article of manufacture 200. The preceding subject matter of this paragraph characterizes example 148 of the present disclosure, wherein example 148 also includes the subject matter according to any one of examples 107 to 147, above.

Curing Hardens Resin Tape-Matrix 130.

Referring generally to FIG. 14 and particularly to, e.g., FIGS. 12 and 13, according to automated fiber-placement method 300, article of manufacture 200 is aircraft 228. The preceding subject matter of this paragraph characterizes example 149 of the present disclosure, wherein example 149 also includes the subject matter according to example 148, above.

Aircraft 228 therefore may be at least partially constructed utilizing automated fiber-placement method 300.

Referring generally to FIG. 14 and particularly to, e.g., FIGS. 12 and 13, according to automated fiber-placement method 300, aircraft 228 comprises nose region 230, and nose region 230 comprises at least one fiber-reinforced tape strip 104. The preceding subject matter of this paragraph characterizes example 150 of the present disclosure, wherein example 150 also includes the subject matter according to example 149, above.

As discussed herein, nose regions of aircraft often having complex contours, which previously could not be constructed utilizing traditional AFP machines and processes.

Referring generally to FIG. 15 and particularly to, e.g., FIGS. 2-5, 7, and 11, automated fiber-placement method 500 is disclosed. Automated fiber-placement method 500 comprises (block 502) delivering first quantity of pulsed energy 122 to first portions 402 of at least one fiber-reinforced tape strip 104. Automated fiber-placement method 500 also comprises (block 504) delivering second quantity of pulsed energy 123 to second portions 404 of at least one fiber-reinforced tape strip 104, alternating with first portions 402. Each one of second portions 404 of at least one fiber-reinforced tape strip 104 at least partially overlaps two adjacent ones of first portions 402 of at least one fiber-reinforced tape strip 104 such that overlapping regions 406 of first portions 402 and second portions 404 have a higher temperature than non-overlapping regions 408 of first portions 402 and second portions 404. At least one fiber-reinforced tape 104 comprises first longitudinal tape-edge 106 and second longitudinal tape-edge 108, parallel to first longitudinal tape-edge 106 and spaced from first longitudinal tape-edge 106 by tape-strip width 110. At least one fiber-reinforced tape strip 104 comprises resin tape-matrix 130 and unidirectional reinforcement fibers 132, imbedded in resin tape-matrix 130. Automated fiber-placement method 500 additionally comprises (block 506) laying down at least one fiber-reinforced tape strip 104 against substrate 116 along virtual curvilinear path 128, such that (i) at least one fiber-reinforced tape strip 104 is centered on virtual curvilinear path 128, and (ii) overlapping regions 406 of at least one fiber-reinforced tape strip 104 are transformed into discrete tape-regions 148, geometrically different from overlapping regions 406. The preceding subject matter of this paragraph characterizes example 151 of the present disclosure.

By creating overlapping regions 406 with first portions 402 and second portions 404, first quantity of pulsed energy 122 and second quantity of pulsed energy 123 are cumulative for overlapping regions 406, resulting in a higher temperature for overlapping regions 406 than for non-overlapping regions 408. Accordingly, when fiber-reinforced tape strip 104 is laid-down along virtual curvilinear path 128, overlapping regions 406, which are spaced-apart from each other, are geometrically transformed into discrete tape-regions 148. Importantly, the first and second quantities of pulsed energy may be controlled so that fiber-reinforced tape strip 104 that was placed does not peel away from substrate 116 even when virtual curvilinear path 128 has a tight radius. Accordingly, automated fiber-placement method 500 may be implemented to construct fiber-reinforced composite structures having more complex surface contours than previously possible. Moreover, automated fiber-placement method 500 may be implemented to manufacture composite parts with unidirectional reinforcement fibers 132 being oriented in desired and/or predetermined orientations throughout the composite part, such as to define desired properties of the composite part that are not possible with standard 0°, +45°, −45°, and 90° layup techniques.

Referring generally to FIG. 15 and particularly to, e.g., FIG. 7, according to automated fiber-placement method 500, overlapping regions 406 and non-overlapping regions 408 are identical in size. The preceding subject matter of this paragraph characterizes example 152 of the present disclosure, wherein example 152 also includes the subject matter according to example 151, above.

As discussed herein, having overlapping regions 406 and non-overlapping regions 408 identical in size enables fiber-reinforced tape strip 104 to be paid down at a constant speed without the need for complex control of the first and second quantities of pulsed energy.

Referring generally to FIG. 15 and particularly to, e.g., FIG. 7, according to automated fiber-placement method 500, overlapping regions 406 are smaller than non-overlapping regions 408. The preceding subject matter of this paragraph characterizes example 153 of the present disclosure, wherein example 153 also includes the subject matter according to example 151 or 152, above.

As discussed herein, by having overlapping regions 406 smaller than non-overlapping regions 408, any alteration to the material properties of fiber-reinforced tape strip 104 as a result of the transformation of overlapping regions 406 to discrete tape-regions 148 is minimized. That is, by having non-overlapping regions 408 larger than overlapping regions 406, and as a result of non-overlapping regions 408 not transforming into discrete tape-regions 148, desired material properties of fiber-reinforced tape strip 104 are maintained.

Referring generally to FIG. 15 and particularly to, e.g., FIGS. 3, 4, and 11, according to automated fiber-placement method 500, discrete tape-regions 148 are structurally different from overlapping regions 406. The preceding subject matter of this paragraph characterizes example 154 of the present disclosure, wherein example 154 also includes the subject matter according to any one of examples 151 to 153, above.

As discussed herein, by being structurally transformed, it is meant not only that the geometry changes from overlapping regions 406 to discrete tape-regions 148, but also that unidirectional reinforcement fibers 132 within overlapping regions 406 are manipulated such that they remain parallel to substrate 116, yet do not maintain a uniform parallel relationship within each other within resin tape-matrix 130 across tape-strip width 110. This structural transformation enables fiber-reinforced tape strip 104 to be placed along virtual curvilinear path 128 without unidirectional reinforcement fibers 132 imparting an undesirable internal stress on fiber-reinforced tape strip 104 that would otherwise cause fiber-reinforced tape strip 104 to peel away from substrate 116.

Referring generally to FIG. 15 and particularly to, e.g., FIGS. 3 and 4, according to automated fiber-placement method 500, virtual curvilinear path 128 comprises arc 156, having radius 134 that is measured from virtual point 136 on virtual line 138 that is perpendicular to virtual curvilinear path 128 and intersects first longitudinal tape-edge 106 and second longitudinal tape-edge 108. A ratio of tape-strip width 110 to radius 134 is equal to or greater than 0.003. Within each of discrete tape-regions 148, one of unidirectional reinforcement fibers 132 that is closest to first longitudinal tape-edge 106 is more buckled than another one of unidirectional reinforcement fibers 132 that is closest to second longitudinal tape-edge 108. Ones of unidirectional reinforcement fibers 132 that are buckled are parallel to substrate 116. The preceding subject matter of this paragraph characterizes example 155 of the present disclosure, wherein example 155 also includes the subject matter according to any one of examples 151 to 154, above.

As discussed herein, a ratio of tape-strip width 110 to radius 134 being equal to or greater than 0.003 results in a radius of curvature that is tighter than possible utilizing traditional AFP machines and processes without the prepreg tows peeling away from its substrate. By unidirectional reinforcement fibers 132 being more buckled closer to first longitudinal tape-edge 106 than second longitudinal tape-edge 108, first longitudinal tape-edge 106 may have a tighter curve than second longitudinal tape-edge 108, which is necessary for fiber-reinforced tape strip 104 to follow virtual curvilinear path 128 below a threshold curvature without peeling away from substrate 116. By buckling parallel to substrate 116, unidirectional reinforcement fibers 132 do not create internal stress that would otherwise cause fiber-reinforced tape strip 104 to peel away from substrate 116.

Referring generally to FIG. 15 and particularly to, e.g., FIGS. 3 and 4, according to automated fiber-placement method 500, arc 156 has arc length 154 that is equal to or greater than a product of radius 134 and $\pi/64$. The preceding subject matter of this paragraph characterizes example 156 of the present disclosure, wherein example 156 also includes the subject matter according to example 155, above.

As discussed herein, having arc length 154 equal to or greater than a product of radius 134 and $\pi/64$ results in virtual curvilinear path 128 being able to maintain a curvature that is tighter for a longer length than would be possible when utilizing traditional AFP machines and processes without the prepreg tows peeling away from the substrate.

Referring generally to FIG. 15 and particularly to, e.g., FIGS. 3 and 4, according to automated fiber-placement method 500, arc 156 has arc length 154 that is equal to or greater than a product of radius 134 and $\pi/32$. The preceding subject matter of this paragraph characterizes example 157 of the present disclosure, wherein example 157 also includes the subject matter according to example 155, above.

As discussed herein, having arc length 154 equal to or greater than a product of radius 134 and $\pi/32$ results in virtual curvilinear path 128 being able to maintain a curvature that is tighter for a longer length than would be possible when utilizing traditional AFP machines and processes without the prepreg tows peeling away from the substrate.

Referring generally to FIG. 15 and particularly to, e.g., FIGS. 3 and 4, according to automated fiber-placement method 500, arc 156 has arc length 154 that is equal to or greater than a product of radius 134 and $\pi/16$. The preceding subject matter of this paragraph characterizes example 158 of the present disclosure, wherein example 158 also includes the subject matter according to example 155, above.

As discussed herein, having arc length 154 equal to or greater than a product of radius 134 and $\pi/16$ results in virtual curvilinear path 128 being able to maintain a curvature that is tighter for a longer length than would be possible when utilizing traditional AFP machines and processes without the prepreg tows peeling away from the substrate.

Referring generally to FIG. 15 and particularly to, e.g., FIGS. 3 and 4, according to automated fiber-placement method 500, arc 156 has arc length 154 that is equal to or greater than a product of radius 134 and $\pi/8$. The preceding subject matter of this paragraph characterizes example 159 of the present disclosure, wherein example 159 also includes the subject matter according to example 155, above.

As discussed herein, having arc length 154 equal to or greater than a product of radius 134 and $\pi/8$ results in virtual curvilinear path 128 being able to maintain a curvature that is tighter for a longer length than would be possible when utilizing traditional AFP machines and processes without the prepreg tows peeling away from the substrate.

Referring generally to FIG. 15 and particularly to, e.g., FIGS. 3 and 4, according to automated fiber-placement method 500, arc 156 has arc length 154 that is equal to or greater than a product of radius 134 and $\pi/4$. The preceding subject matter of this paragraph characterizes example 160 of the present disclosure, wherein example 160 also includes the subject matter according to example 155, above.

As discussed herein, having arc length 154 equal to or greater than a product of radius 134 and $\pi/4$ results in virtual curvilinear path 128 being able to maintain a curvature that is tighter for a longer length than would be possible when utilizing traditional AFP machines and processes without the prepreg tows peeling away from the substrate.

Referring generally to FIG. 15 and particularly to, e.g., FIGS. 3 and 4, according to automated fiber-placement method 500, arc 156 has arc length 154 that is equal to or greater than a product of radius 134 and $\pi/2$. The preceding subject matter of this paragraph characterizes example 161 of the present disclosure, wherein example 161 also includes the subject matter according to example 155, above.

As discussed herein, having arc length 154 equal to or greater than a product of radius 134 and $\pi/2$ results in virtual curvilinear path 128 being able to maintain a curvature that is tighter for a longer length than would be possible when utilizing traditional AFP machines and processes without the prepreg tows peeling away from the substrate.

Referring generally to FIG. 15 and particularly to, e.g., FIGS. 3 and 4, according to automated fiber-placement method 500, arc 156 has arc length 154 that is equal to or greater than a product of radius 134 and $\pi$. The preceding subject matter of this paragraph characterizes example 162 of the present disclosure, wherein example 162 also includes the subject matter according to example 155, above.

As discussed herein, having arc length 154 equal to or greater than a product of radius 134 and $\pi$ results in virtual curvilinear path 128 being able to maintain a curvature that is tighter for a longer length than would be possible when utilizing traditional AFP machines and processes without the prepreg tows peeling away from the substrate.

Referring generally to FIG. 15 and particularly to, e.g., FIGS. 3 and 4, according to automated fiber-placement method 500, arc 156 has arc length 154 that is equal to or greater than a product of radius 134 and $1.25\pi$. The preceding subject matter of this paragraph characterizes example 163 of the present disclosure, wherein example 163 also includes the subject matter according to example 155, above.

As discussed herein, having arc length 154 equal to or greater than a product of radius 134 and $1.25\pi$ results in virtual curvilinear path 128 being able to maintain a curvature that is tighter for a longer length than would be possible when utilizing traditional AFP machines and processes without the prepreg tows peeling away from the substrate.

Referring generally to FIG. 15 and particularly to, e.g., FIGS. 3 and 4, according to automated fiber-placement method 500, arc 156 has arc length 154 that is equal to or greater than a product of radius 134 and $1.5\pi$. The preceding subject matter of this paragraph characterizes example 164 of the present disclosure, wherein example 164 also includes the subject matter according to example 155, above.

As discussed herein, having arc length 154 equal to or greater than a product of radius 134 and $1.5\pi$ results in virtual curvilinear path 128 being able to maintain a curvature that is tighter for a longer length than would be possible when utilizing traditional AFP machines and processes without the prepreg tows peeling away from the substrate.

Referring generally to FIG. 15 and particularly to, e.g., FIGS. 3 and 4, according to automated fiber-placement method 500, arc 156 has arc length 154 that is equal to or greater than a product of radius 134 and $1.75\pi$. The preceding subject matter of this paragraph characterizes example 165 of the present disclosure, wherein example 165 also includes the subject matter according to example 155, above.

As discussed herein, having arc length 154 equal to or greater than a product of radius 134 and $1.75\pi$ results in virtual curvilinear path 128 being able to maintain a curvature that is tighter for a longer length than would be possible when utilizing traditional AFP machines and processes without the prepreg tows peeling away from the substrate.

Referring generally to FIG. 15 and particularly to, e.g., FIGS. 3 and 4, according to automated fiber-placement method 500, arc 156 has arc length 154 that is equal to or greater than a product of radius 134 and 2π. The preceding subject matter of this paragraph characterizes example 166 of the present disclosure, wherein example 166 also includes the subject matter according to example 155, above.

As discussed herein, having arc length 154 equal to or greater than a product of radius 134 and 2π results in virtual curvilinear path 128 being able to maintain a curvature that is tighter for a longer length than would be possible when utilizing traditional AFP machines and processes without the prepreg tows peeling away from the substrate.

Referring generally to FIG. 15 and particularly to, e.g., FIGS. 3 and 4, according to automated fiber-placement method 500, the ratio of tape-strip width 110 to radius 134 is greater than or equal to 0.005. The preceding subject matter of this paragraph characterizes example 167 of the present disclosure, wherein example 167 also includes the subject matter according to any one of examples 155 to 166, above.

As discussed herein, a ratio of tape-strip width 110 to radius 134 being equal to or greater than 0.005 results in a radius of curvature that is tighter than possible utilizing traditional AFP machines without the prepreg tows peeling away from its substrate.

Referring generally to FIG. 15 and particularly to, e.g., FIGS. 3 and 4, according to automated fiber-placement method 500, the ratio of tape-strip width 110 to radius 134 is greater than or equal to 0.01. The preceding subject matter of this paragraph characterizes example 168 of the present disclosure, wherein example 168 also includes the subject matter according to any one of examples 155 to 167, above.

As discussed herein, a ratio of tape-strip width 110 to radius 134 being equal to or greater than 0.01 results in a radius of curvature that is tighter than possible utilizing traditional AFP machines without the prepreg tows peeling away from its substrate.

Referring generally to FIG. 15 and particularly to, e.g., FIGS. 3 and 4, according to automated fiber-placement method 500, the ratio of tape-strip width 110 to radius 134 is greater than or equal to 0.03. The preceding subject matter of this paragraph characterizes example 169 of the present disclosure, wherein example 169 also includes the subject matter according to any one of examples 155 to 168, above.

As discussed herein, a ratio of tape-strip width 110 to radius 134 being equal to or greater than 0.03 results in a radius of curvature that is tighter than possible utilizing traditional AFP machines without the prepreg tows peeling away from its substrate.

Referring generally to FIG. 15 and particularly to, e.g., FIGS. 2-4 and 7, according to automated fiber-placement method 500, the steps of delivering first quantity of pulsed energy 122 to first portions 402 of at least one fiber-reinforced tape strip 104 and delivering 504 second quantity of pulsed energy 123 to second portions 404 of at least one fiber-reinforced tape strip 104 comprise heating a first array of locations within overlapping regions 406 of first portions 402 and second portions 404 of at least one fiber-reinforced tape strip 104 to a higher temperature than a second array of locations within overlapping regions 406 of first portions 402 and second portions 404 of at least one fiber-reinforced tape strip 104. Locations in the first array of locations are closer to virtual point 136 than locations in second array of locations. The preceding subject matter of this paragraph characterizes example 170 of the present disclosure, wherein example 170 also includes the subject matter according to any one of examples 155 to 169, above.

As discussed herein, because locations within overlapping regions 406 that are farther away from virtual point 136 experience a less tight curvature, they need not be heated to as high of a temperature as locations within overlapping regions 406 that are closer to virtual point 136. As a result, the structural integrity of the locations farther away may be maintained.

Referring generally to FIG. 15 and particularly to, e.g., FIGS. 2, 5, and 7, according to automated fiber-placement method 500, at least one fiber-reinforced tape strip 104 is a plurality of fiber-reinforced tape strips. The step of (block 506) laying down at least one fiber-reinforced tape strip 104 against substrate 116 along virtual curvilinear path 128 comprises laying down the plurality of fiber-reinforced tape strips in a parallel array of continuous strips. The steps of delivering first quantity of pulsed energy 122 to first portions 402 of at least one fiber-reinforced tape strip 104 and delivering second quantity of pulsed energy 123 to second portions 404 of at least one fiber-reinforced tape strip 104 comprise heating overlapping regions 406 of a first subset of the plurality of fiber-reinforced tape strips to a higher temperature than overlapping regions 406 of a second subset of the plurality of fiber-reinforced tape strips. Strips of the second subset of the plurality of fiber-reinforced tape strips are farther away from virtual point 136 than strips of the first subset of the plurality of fiber-reinforced tape strips. The preceding subject matter of this paragraph characterizes example 171 of the present disclosure, wherein example 171 also includes the subject matter according to any one of examples 155 to 170, above.

As discussed herein, it is common for AFP machines to be structured to place a course (a plurality) of prepreg tows. When automated fiber-placement method 500 is so implemented, according to example 171, fiber-reinforced tape strips that are closer to virtual point 136 are heated to a higher temperature than fiber-reinforced tape strips that are farther away from virtual point 136 to facilitate the tighter curvature of those that are closer to virtual point 136 and to maintain the structural integrity of those that are farther away from virtual point 136.

Referring generally to FIG. 15 and particularly to, e.g., FIGS. 2, 5, and 7, according to automated fiber-placement method 500, at least one fiber-reinforced tape strip 104 is a plurality of fiber-reinforced tape strips. The step of (block 506) laying down at least one fiber-reinforced tape strip 104 against substrate 116 along virtual curvilinear path 128 comprises laying down the plurality of fiber-reinforced tape strips in a parallel array of continuous strips. The preceding subject matter of this paragraph characterizes example 172 of the present disclosure, wherein example 172 also includes the subject matter according to any one of examples 151 to 170, above.

By placing and compacting a plurality of fiber-reinforced tape strips simultaneously, automated fiber-placement method 500 is more efficient in covering a large surface area.

Referring generally to FIG. 15 and particularly to, e.g., FIGS. 2-4 and 7, automated fiber-placement method 500 further comprises steps of (block 508) detecting a property of the plurality of fiber-reinforced tape strips after delivery of first quantity of pulsed energy 122 and delivery of second quantity of pulsed energy 123, and (block 510) controlling at least one of first quantity of pulsed energy 122, second quantity of pulsed energy 122, or a rate of laying down at least one fiber-reinforced tape strip 104 against substrate 116 along virtual curvilinear path 128 responsive to the property of the plurality of fiber-reinforced tape strips. The preceding subject matter of this paragraph characterizes example 173 of the present disclosure, wherein example 173 also includes the subject matter according to example 171 or 172, above.

By detecting a property of the fiber-reinforced tape strips following compaction, it can be determined if overlapping regions 406 are being transformed into discrete tape-regions 148 in a desired and controlled manner, and also if the fiber-reinforced tape strips are being properly adhered and compacted to substrate 116. Moreover, the feedback loop with control of first and/or second quantities of pulsed energy enables precise adjustment and control of the first and/or second quantities of pulsed energy.

Referring generally to FIG. 15 and particularly to, e.g., FIGS. 3 and 4, according to automated fiber-placement method 500, tape-strip width 110 is between 5 millimeters (0.2 inches) and 15 millimeters (0.6 inches). The preceding subject matter of this paragraph characterizes example 174 of the present disclosure, wherein example 174 also includes the subject matter according to any one of examples 151 to 173, above.

As discussed herein, prepreg tows for AFP come in a variety of widths, with quarter-inch (6 millimeters) and half-inch (13 millimeters) prepreg tows being common. Automated fiber-placement method 500 may be implemented with any appropriate size of fiber-reinforced tape strips.

Referring generally to FIG. 15 and particularly to, e.g., FIGS. 3 and 4, according to automated fiber-placement method 500, tape-strip width 110 is less than 15 millimeters (0.6 inches). The preceding subject matter of this paragraph characterizes example 175 of the present disclosure, wherein example 175 also includes the subject matter according to any one of examples 151 to 173, above.

As noted, automated fiber-placement method 500 may be implemented with any appropriate size of fiber-reinforced tape strips.

Referring generally to FIG. 15 and particularly to, e.g., FIGS. 3 and 4, according to automated fiber-placement method 500, tape-strip width 110 is less than 8 millimeters (0.3 inches). The preceding subject matter of this paragraph characterizes example 176 of the present disclosure, wherein example 176 also includes the subject matter according to any one of examples 151 to 174, above.

As noted, automated fiber-placement method 500 may be implemented with any appropriate size of fiber-reinforced tape strips.

Referring generally to FIG. 15 and particularly to, e.g., FIGS. 2-4, according to automated fiber-placement method 500, the step of (block 506) laying down at least one fiber-reinforced tape strip 104 against substrate 116 along virtual curvilinear path 128 comprises (block 512) compacting at least one fiber-reinforced tape strip 104 against substrate 116. The preceding subject matter of this paragraph characterizes example 177 of the present disclosure, wherein example 177 also includes the subject matter according to any one of examples 151 to 176, above.

As discussed herein, compaction of fiber-reinforced tape strip 104 against substrate 116 ensures proper adhesion against a prior layer of fiber-reinforced tape strip 104.

Referring generally to FIG. 15 and particularly to, e.g., FIGS. 3 and 4, according to automated fiber-placement method 500, within each of discrete tape-regions 148, at least one of unidirectional reinforcement fibers 132 that are buckled comprises a plurality of folds. The preceding subject matter of this paragraph characterizes example 178 of the present disclosure, wherein example 178 also includes the subject matter according to any one of examples 151 to 177, above.

As discussed herein, a plurality of folds in individuals ones of unidirectional reinforcement fibers 132 permits for tight curves of virtual curvilinear path 128.

Referring generally to FIG. 15 and particularly to, e.g., FIGS. 3 and 4, according to automated fiber-placement method 500, discrete tape-regions 148 are trapezoidal. The preceding subject matter of this paragraph characterizes example 179 of the present disclosure, wherein example 179 also includes the subject matter according to any one of examples 151 to 178, above.

As discussed herein, by being trapezoidal, discrete tape-regions 148 permit placement of fiber-reinforced tape strip 104 along virtual curvilinear path 128.

Referring generally to FIG. 15 and particularly to, e.g., FIGS. 2-4, according to automated fiber-placement method 500, the step of (block 506) laying down at least one fiber-reinforced tape strip 104 against substrate 116 along virtual curvilinear path 128 results in non-overlapping regions 408 becoming intermediate tape-regions 150, separated from each other by discrete tape-regions 148. The preceding subject matter of this paragraph characterizes example 180 of the present disclosure, wherein example 180 also includes the subject matter according to any one of examples 151 to 179, above.

As discussed herein, intermediate tape-regions 150, which correspond to non-overlapping regions 408, space discrete tape-regions 148 apart from each other and maintain the structural integrity of fiber-reinforced tape strip 104 following being placed and compacted against substrate 116.

Referring generally to FIG. 15 and particularly to, e.g., FIG. 3, according to automated fiber-placement method 500, within each of intermediate tape-regions 150, all of unidirectional reinforcement fibers 132 are only straight. The preceding subject matter of this paragraph characterizes example 181 of the present disclosure, wherein example 181 also includes the subject matter according to example 180, above.

As discussed herein, because unidirectional reinforcement fibers 132 are not buckled within intermediate tape-regions 150, the structural integrity of intermediate tape-regions 150 is maintained, thereby maximizing the structural integrity of fiber-reinforced tape strip 104 following being placed and compacted against substrate 116.

Referring generally to FIG. 15 and particularly to, e.g., FIGS. 3, 4, and 11, according to automated fiber-placement method 500, each of unidirectional reinforcement fibers 132 that are buckled within discrete tape-regions 148 are less buckled within intermediate tape-regions 150 than within discrete tape-regions 148. The preceding subject matter of this paragraph characterizes example 182 of the present disclosure, wherein example 182 also includes the subject matter according to example 180, above.

As discussed herein, because unidirectional reinforcement fibers 132 are less buckled within intermediate tape-regions 150, the structural integrity of intermediate tape-regions 150 is maximized, thereby maximizing the structural integrity of fiber-reinforced tape strip 104 following being placed and compacted against substrate 116.

Referring generally to FIG. 15 and particularly to, e.g., FIGS. 3, 4, and 11, according to automated fiber-placement method 500, intermediate tape-regions 150 are rectangular. The preceding subject matter of this paragraph characterizes example 183 of the present disclosure, wherein example 183 also includes the subject matter according to any one of examples 180 to 182, above.

As discussed herein, by being rectangular, intermediate tape-regions 150 maintain their structural integrity without unidirectional reinforcement fibers 132 imparting undesirable internal stresses within fiber-reinforced tape strip 104 following being placed and compacted against substrate 116.

Referring generally to FIG. 15 and particularly to, e.g., FIGS. 2 and 7, automated fiber-placement method 500 further comprises steps of (block 514) detecting 514 a property of at least one fiber-reinforced tape strip 104 after delivery of first quantity of pulsed energy 122 and delivery of second quantity of pulsed energy 123, and (block 516) controlling at least one of first quantity of pulsed energy 122, second quantity of pulsed energy 123, or a rate of laying down at least one fiber-reinforced tape strip 104 against substrate 116 along virtual curvilinear path 128 responsive to the property of at least one fiber-reinforced tape strip 104. The preceding subject matter of this paragraph characterizes example 184 of the present disclosure, wherein example 184 also includes the subject matter according to any one of examples 151 to 183, above.

By detecting a property of fiber-reinforced tape strip 104 after delivery of the first and second quantities of pulsed energy, it can be determined if overlapping regions 406 are being transformed into discrete tape-regions 148 in a desired and controlled manner, and also if fiber-reinforced tape strip 104 is being properly adhered and compacted to substrate 116. Moreover, the feedback loop with control of the first and/or second quantities of energy enables precise adjustment and control of the first and/or second quantities of pulsed energy.

Referring generally to FIG. 15, according to automated fiber-placement method 500, the property is temperature. The preceding subject matter of this paragraph characterizes example 185 of the present disclosure, wherein example 185 also includes the subject matter according to example 184, above.

As discussed herein, detecting temperature provides for a simple feedback loop for the control of the first and/or second quantities of pulsed energy because, in one or more examples of resin tape-matrix 130, proper adhesion and compaction of fiber-reinforced tape strip 104 against substrate 116 is directly based on temperature.

Referring generally to FIG. 15 and particularly to, e.g., FIG. 7, according to automated fiber-placement method 500, at least one of the step of (502) delivering first quantity of pulsed energy 122 to first portions 402 of at least one fiber-reinforced tape strip 104 or the step of (block 504) delivering second quantity of pulsed energy 123 to second portions 404 of at least one fiber-reinforced tape strip 104 comprises directly heating unidirectional reinforcement fibers 132 and indirectly heating resin tape-matrix 130 via conduction from unidirectional reinforcement fibers 132. The preceding subject matter of this paragraph characterizes example 186 of the present disclosure, wherein example 186 also includes the subject matter according to any one of examples 151 to 185, above.

As discussed herein, by selecting a wavelength of pulsed energy that directly heats unidirectional reinforcement fibers 132 and that does not directly heat, or at least substantively less directly heats, resin tape-matrix 130, temperatures for resin tape-matrix 130 are targeted that do not adversely affect the material properties of resin tape-matrix 130 and therefore that do not adversely affect the structural integrity of fiber-reinforced tape strip 104 following placement and compaction against substrate 116.

Referring generally to FIG. 15 and particularly to, e.g., FIGS. 2-4 and 7, automated fiber-placement method 500 further comprises a step of (block 518) laying down at least one fiber-reinforced tape strip 104 against substrate 116 along virtual straight path 152. The steps of delivering first quantity of pulsed energy 122 to first portions 402 of at least one fiber-reinforced tape strip 104 and delivering second quantity of pulsed energy 123 to second portions 404 of at least one fiber-reinforced tape strip 104 comprises heating overlapping regions 406 that are along virtual curvilinear path 128 to a higher temperature than overlapping regions 406 that are along virtual straight path 152. The preceding subject matter of this paragraph characterizes example 187 of the present disclosure, wherein example 187 also includes the subject matter according to any one of examples 151 to 186, above.

As discussed herein, by heating overlapping regions 406 to a lower temperature when along virtual straight path 152 than when along virtual curvilinear path 128, a temperature may be selected that provides for desirable adhesion and compaction against substrate 116 without adversely affecting the structural integrity thereof.

Referring generally to FIG. 15 and particularly to, e.g., FIGS. 3, 4, 12, and 13, according to automated fiber-placement method 500, virtual curvilinear path 128 is nonplanar. The preceding subject matter of this paragraph characterizes example 188 of the present disclosure, wherein example 188 also includes the subject matter according to any one of examples 151 to 187, above.

When automated fiber-placement method 500 is implemented to place fiber-reinforced tape strip 104 along virtual curvilinear path 128 that is nonplanar, automated fiber-placement method 500 may be implemented to construct nonplanar articles of manufacture, including those having surfaces with complex contours.

Referring generally to FIG. 15 and particularly to, e.g., FIGS. 3, 4, 12, and 13, according to automated fiber-placement method 500, substrate 116 comprises a complex contour. The preceding subject matter of this paragraph characterizes example 189 of the present disclosure, wherein example 189 also includes the subject matter according to any one of examples 151 to 188, above.

When substrate 116 comprises a complex contour, automated fiber-placement method 500 is capable of placing and compacting fiber-reinforced tape strip 104 against substrate 116, enabling the construction of articles of manufacture not previously possible with traditional AFP processes.

Referring generally to FIG. 15 and particularly to, e.g., FIGS. 2-4 and 11, according to automated fiber-placement method 500, following the step of (block 506) laying down at least one fiber-reinforced tape strip 104 against substrate 116 along virtual curvilinear path 128, at least one fiber-reinforced tape strip 104 does not peel away from substrate 116. The preceding subject matter of this paragraph characterizes example 190 of the present disclosure, wherein example 190 also includes the subject matter according to any one of examples 151 to 189, above.

As discussed herein, because fiber-reinforced tape strip 104 does not peel away from substrate 116, the desired structural integrity of fiber-reinforced tape strip 104 is maintained, and a resulting composite part is cured to create an article of manufacture with desirable properties.

Referring generally to FIG. 15 and particularly to, e.g., FIGS. 2-4 and 11-13, automated fiber-placement method 500 further comprises, following the step of (block 506) laying down at least one fiber-reinforced tape strip 104 against substrate 116 along virtual curvilinear path 128, a step of (block 520) curing at least one fiber-reinforced tape strip 104 to form article of manufacture 200. The preceding subject matter of this paragraph characterizes example 191 of the present disclosure, wherein example 191 also includes the subject matter according to any one of examples 151 to 190, above.

As discussed herein, curing hardens resin tape-matrix 130.

Referring generally to FIG. 15 and particularly to, e.g., FIGS. 12 and 13, according to automated fiber-placement method 500, article of manufacture 200 is aircraft 228. The preceding subject matter of this paragraph characterizes example 192 of the present disclosure, wherein example 192 also includes the subject matter according to example 191, above.

In one or more examples, at least a portion of aircraft 228 is constructed utilizing automated fiber-placement method 500.

Referring generally to FIG. 15 and particularly to, e.g., FIGS. 12 and 13, according to automated fiber-placement method 500, aircraft 228 comprises nose region 230, which comprises at least one fiber-reinforced tape strip 104. The preceding subject matter of this paragraph characterizes example 193 of the present disclosure, wherein example 193 also includes the subject matter according to example 192, above.

As discussed herein, nose regions of aircraft often having complex contours, which previously could not be constructed utilizing traditional AFP machines and processes.

Examples of the present disclosure may be described in the context of aircraft manufacturing and service method 1100 as shown in FIG. 16 and aircraft 1102 as shown in FIG. 17. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 17, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

The invention claimed is:

1. An automated fiber-placement method, comprising steps of:
    delivering a first quantity of pulsed energy to first portions of at least one fiber-reinforced tape strip;
    delivering a second quantity of pulsed energy to second portions of at least the one fiber-reinforced tape strip, alternating with the first portions, and wherein:
        each one of the second portions of at least the one fiber-reinforced tape strip at least partially overlaps two adjacent ones of the first portions of at least the one fiber-reinforced tape strip such that overlapping regions of the first portions and the second portions have a higher temperature than non-overlapping regions of the first portions and the second portions;
        at least the one fiber-reinforced tape comprises a first longitudinal tape-edge and a second longitudinal tape-edge, parallel to the first longitudinal tape-edge and spaced from the first longitudinal tape-edge by a tape-strip width; and
        at least the one fiber-reinforced tape strip comprises a resin tape-matrix and unidirectional reinforcement fibers, imbedded in the resin tape-matrix; and
    laying down at least the one fiber-reinforced tape strip against a substrate along a virtual curvilinear path, such that:
        at least the one fiber-reinforced tape strip is centered on the virtual curvilinear path; and
        the overlapping regions of at least the one fiber-reinforced tape strip are transformed into discrete tape-regions, geometrically different from the overlapping regions.

2. The automated fiber-placement method according to claim 1, wherein the overlapping regions are smaller than the non-overlapping regions.

3. The automated fiber-placement method according to claim 1, wherein:
the virtual curvilinear path comprises an arc, having a radius that is measured from a virtual point on a virtual line that is perpendicular to the virtual curvilinear path and intersects the first longitudinal tape-edge and the second longitudinal tape-edge;
a ratio of the tape-strip width to the radius is equal to or greater than 0.003;
within each of the discrete tape-regions, one of the unidirectional reinforcement fibers that is closest to the first longitudinal tape-edge is more buckled than another one of the unidirectional reinforcement fibers that is closest to the second longitudinal tape-edge; and
ones of the unidirectional reinforcement fibers that are buckled are parallel to the substrate.

4. The automated fiber-placement method according to claim 3, wherein the arc has an arc length that is equal to or greater than a product of the radius and $\pi/64$.

5. The automated fiber-placement method according to claim 3, wherein:
the steps of delivering the first quantity of pulsed energy to the first portions of at least the one fiber-reinforced tape strip and delivering the second quantity of pulsed energy to the second portions of at least the one fiber-reinforced tape strip comprise heating a first array of locations within the overlapping regions of the first portions and the second portions of at least the one fiber-reinforced tape strip to a higher temperature than a second array of locations within the overlapping regions of the first portions and the second portions of at least the one fiber-reinforced tape strip; and
locations in the first array of locations are closer to the virtual point than locations in the second array of locations.

6. The automated fiber-placement method according to claim 3, wherein:
at least the one fiber-reinforced tape strip is a plurality of fiber-reinforced tape strips;
the step of laying down at least the one fiber-reinforced tape strip against the substrate along the virtual curvilinear path comprises laying down the plurality of fiber-reinforced tape strips in a parallel array of continuous strips;
the steps of delivering the first quantity of pulsed energy to the first portions of at least the one fiber-reinforced tape strip and delivering the second quantity of pulsed energy to the second portions of at least the one fiber-reinforced tape strip comprise heating the overlapping regions of a first subset of the plurality of fiber-reinforced tape strips to a higher temperature than the overlapping regions of a second subset of the plurality of fiber-reinforced tape strips; and
strips of the second subset of the plurality of fiber-reinforced tape strips are farther away from the virtual point than strips of the first subset of the plurality of fiber-reinforced tape strips.

7. The automated fiber-placement method according to claim 6, further comprising steps of:
detecting a property of the plurality of fiber-reinforced tape strips after delivery of the first quantity of pulsed energy and delivery of the second quantity of pulsed energy; and
controlling at least one of the first quantity of pulsed energy, the second quantity of pulsed energy, or a rate of laying down at least the one fiber-reinforced tape strip against the substrate along the virtual curvilinear path responsive to the property of the plurality of fiber-reinforced tape strips.

8. The automated fiber-placement method according to claim 1, wherein the tape-strip width is between 5 millimeters (0.2 inches) and 15 millimeters (0.6 inches).

9. The automated fiber-placement method according to claim 1, wherein, within each of the discrete tape-regions, at least one of the unidirectional reinforcement fibers that are buckled comprises a plurality of folds.

10. The automated fiber-placement method according to claim 1, wherein the discrete tape-regions are trapezoidal.

11. The automated fiber-placement method according to claim 1, wherein the step of laying down at least the one fiber-reinforced tape strip against the substrate along the virtual curvilinear path results in the non-overlapping regions becoming intermediate tape-regions, separated from each other by the discrete tape-regions.

12. The automated fiber-placement method according to claim 11, wherein within each of the intermediate tape-regions, all of the unidirectional reinforcement fibers are only straight.

13. The automated fiber-placement method according to claim 1, wherein each of the unidirectional reinforcement fibers that are buckled within the discrete tape-regions are less buckled within the intermediate tape-regions than within the discrete tape-regions.

14. The automated fiber-placement method according to claim 11, wherein the intermediate tape-regions are rectangular.

15. The automated fiber-placement method according to claim 1, further comprising steps of:
detecting a property of at least the one fiber-reinforced tape strip after delivery of the first quantity of pulsed energy and delivery of the second quantity of pulsed energy; and
controlling at least one of the first quantity of pulsed energy, the second quantity of pulsed energy, or a rate of laying down at least the one fiber-reinforced tape strip against the substrate along the virtual curvilinear path responsive to the property of at least the one fiber-reinforced tape strip.

16. The automated fiber-placement method according to claim 15, wherein the property is temperature.

17. The automated fiber-placement method according to claim 1, wherein the virtual curvilinear path is nonplanar.

18. The automated fiber-placement method according to claim 1, wherein the overlapping regions and the non-overlapping regions are identical in size.

19. The automated fiber-placement method according to claim 1, wherein the discrete tape-regions are structurally different from the overlapping regions.

20. The automated fiber-placement method according to claim 3, wherein the arc has an arc length that is equal to or greater than a product of the radius and $\pi/32$.

21. The automated fiber-placement method according to claim 3, wherein the arc has an arc length that is equal to or greater than a product of the radius and $1.25\pi$.

22. The automated fiber-placement method according to claim 3, wherein the ratio of the tape-strip width to the radius is greater than or equal to 0.005.

23. The automated fiber-placement method according to claim 1, wherein:
at least the one fiber-reinforced tape strip is a plurality of fiber-reinforced tape strips; and
the step of laying down at least the one fiber-reinforced tape strip against the substrate along the virtual curvilinear path comprises laying down the plurality of fiber-reinforced tape strips in a parallel array of continuous strips.

24. The automated fiber-placement method according to claim 1, wherein the tape-strip width is less than 15 millimeters (0.6 inches).

25. The automated fiber-placement method according to claim 1, wherein the step of laying down at least the one fiber-reinforced tape strip against the substrate along the virtual curvilinear path comprises compacting at least the one fiber-reinforced tape strip against the substrate.

26. The automated fiber-placement method according to claim 1, wherein at least one of the step of delivering the first quantity of pulsed energy to the first portions of at least the one fiber-reinforced tape strip or the step of delivering the second quantity of pulsed energy to the second portions of at least the one fiber-reinforced tape strip comprises directly heating the unidirectional reinforcement fibers and indirectly heating the resin tape-matrix via conduction from the unidirectional reinforcement fibers.

27. The automated fiber-placement method according to claim 1, further comprising a step of laying down at least the one fiber-reinforced tape strip against the substrate along a virtual straight path; and
wherein the steps of delivering the first quantity of pulsed energy to the first portions of at least the one fiber-reinforced tape strip and delivering the second quantity of pulsed energy to the second portions of at least the one fiber-reinforced tape strip comprises heating the overlapping regions that are along the virtual curvilinear path to a higher temperature than the overlapping regions that are along the virtual straight path.

28. The automated fiber-placement method according to claim 1, wherein the substrate comprises a complex contour.

29. The automated fiber-placement method according to claim 1, wherein following the step of laying down at least the one fiber-reinforced tape strip against the substrate along the virtual curvilinear path, at least the one fiber-reinforced tape strip does not peel away from the substrate.

30. The automated fiber-placement method according to claim 1, further comprising, following the step of laying down at least the one fiber-reinforced tape strip against the substrate along the virtual curvilinear path, a step of curing at least the one fiber-reinforced tape strip to form an article of manufacture.

31. The automated fiber-placement method according to claim 30, wherein the article of manufacture is an aircraft.

32. The automated fiber-placement method according to claim 31, wherein:
the aircraft comprises a nose region; and
the nose region comprises at least the one fiber-reinforced tape strip.

33. An automated fiber-placement system, comprising:
a dispenser, configured to dispense at least one fiber-reinforced tape strip, and wherein:
at least the one fiber-reinforced tape strip comprises a first longitudinal tape-edge and a second longitudinal tape-edge, parallel to the first longitudinal tape-edge and spaced from the first longitudinal tape-edge by a tape-strip width; and
at least the one fiber-reinforced tape strip comprises a resin tape-matrix and unidirectional reinforcement fibers, imbedded in the resin tape-matrix;
a compactor, configured to receive at least the one fiber-reinforced tape strip from a leading side of the compactor and to compact at least the one fiber-reinforced tape strip against a substrate;
a steering mechanism, configured to manipulate the dispenser and the compactor in at least one of two- or three-dimensional space relative to the substrate;
an energy source, configured to deliver a first quantity of pulsed energy and a second quantity of pulsed energy to the leading side of the compactor for respectively heating first portions of at least the one fiber-reinforced tape strip and second portions of at least the one fiber-reinforced tape strip, alternating with the first portions along at least the one fiber-reinforced tape strip, and wherein each one of the second portions of at least the one fiber-reinforced tape strip at least partially overlaps two adjacent ones of the first portions of at least the one fiber-reinforced tape strip such that overlapping regions of the first portions and the second portions have a higher temperature than non-overlapping regions of the first portions and the second portions; and
a controller, programmed to control at least one of feed rate of the at least the one fiber-reinforced tape strip from the dispenser or pulse frequency, pulse power, or pulse duration of at least one of the first quantity of pulsed energy or the second quantity of pulsed energy and also programmed to selectively cause the steering mechanism to place at least the one fiber-reinforced tape strip against the substrate at least along a virtual curvilinear path, such that:
at least the one fiber-reinforced tape strip is centered on the virtual curvilinear path; and
the overlapping regions of at least the one fiber-reinforced tape strip are transformed into discrete tape-regions, geometrically different from the overlapping regions.

34. The automated fiber-placement system according to claim 33, wherein the controller is further programmed to selectively cause the steering mechanism to steer placement of at least the one fiber-reinforced tape strip against the substrate at least along the virtual curvilinear path such that:
the virtual curvilinear path comprises an arc, having a radius that is measured from a virtual point on a virtual line that is perpendicular to the virtual curvilinear path and intersects the first longitudinal tape-edge and the second longitudinal tape-edge;
a ratio of the tape-strip width to the radius is equal to or greater than 0.003;
within each of the discrete tape-regions, one of the unidirectional reinforcement fibers that is closest to the first longitudinal tape-edge is more buckled than another one of the unidirectional reinforcement fibers that is closest to the second longitudinal tape-edge; and
ones of the unidirectional reinforcement fibers that are buckled are parallel to the substrate.

35. The automated fiber-placement system according to claim 34, wherein the controller is further programmed to selectively cause the steering mechanism to steer placement of at least the one fiber-reinforced tape strip against the substrate at least along the virtual curvilinear path such that the arc has an arc length that is equal to or greater than a product of the radius and $\pi/64$.

36. The automated fiber-placement system according to claim 33, wherein the overlapping regions and the non-overlapping regions are identical in size.

37. The automated fiber-placement system according to claim 33, wherein the overlapping regions are smaller than the non-overlapping regions.

38. The automated fiber-placement system according to claim 33, wherein the discrete tape-regions are structurally different from the overlapping regions.

39. The automated fiber-placement system according to claim 34, wherein the controller is further programmed to selectively cause the steering mechanism to steer placement of at least the one fiber-reinforced tape strip against the substrate at least along the virtual curvilinear path such that the arc has an arc length that is equal to or greater than a product of the radius and $\pi/32$.

40. The automated fiber-placement system according to claim 34, wherein the controller is further programmed to selectively cause the steering mechanism to steer placement of at least the one fiber-reinforced tape strip against the substrate at least along the virtual curvilinear path such that the arc has an arc length that is equal to or greater than a product of the radius and $1.25\pi$.

41. The automated fiber-placement system according to claim 34, wherein the ratio of the tape-strip width to the radius is equal to or greater than 0.005.

42. The automated fiber-placement system according to claim 34, wherein:
   the controller is programmed to cause the energy source to deliver the first quantity of pulsed energy and the second quantity of pulsed energy to the leading side of the compactor so that a first array of locations within the overlapping regions of the first portions and the second portions of at least the one fiber-reinforced tape strip is heated to a higher temperature than a second array of locations within the overlapping regions of the first portions and the second portions of at least the one fiber-reinforced tape strip; and
   locations in the first array of locations are closer to the virtual point than locations in the second array of locations.

43. The automated fiber-placement system according to claim 34, wherein:
   at least the one fiber-reinforced tape strip is a plurality of fiber-reinforced tape strips;
   the compactor is configured to compact the plurality of fiber-reinforced tape strips against the substrate in a parallel array of continuous strips;
   the controller is programmed to cause the energy source to deliver the first quantity of pulsed energy and the second quantity of pulsed energy to the leading side of the compactor so that the overlapping regions of a first subset of the plurality of fiber-reinforced tape strips are heated to a higher temperature than the overlapping regions of a second subset of the plurality of fiber-reinforced tape strips; and
   strips of the second subset of the plurality of fiber-reinforced tape strips are farther away from the virtual point than strips of the first subset of the plurality of fiber-reinforced tape strips.

44. The automated fiber-placement system according to claim 33, wherein:
   at least the one fiber-reinforced tape strip is a plurality of fiber-reinforced tape strips; and
   the compactor is configured to compact the plurality of fiber-reinforced tape strips against the substrate in a parallel array of continuous strips.

45. The automated fiber-placement system according to claim 44, wherein:
   the energy source is a plurality of energy sources; and
   each one of the plurality of energy sources is configured to deliver at least one of the first quantity of pulsed energy to the first portions or the second quantity of pulsed energy to the second portions of individual ones of the plurality of fiber-reinforced tape strips.

46. The automated fiber-placement system according to claim 44, further comprising a sensor, and wherein:
   the sensor is configured to detect a property of each of the plurality of fiber-reinforced tape strips on a trailing side of the compactor; and
   the controller is programmed to control at least one of feed rate of the at least the one fiber-reinforced tape strip from the dispenser or pulse frequency, pulse power, or pulse duration of at least one of the first quantity of pulsed energy or the second quantity of pulsed energy responsive to inputs received from the sensor.

47. The automated fiber-placement system according to claim 33, wherein the tape-strip width is between 5 millimeters (0.2 inches) and 15 millimeters (0.6 inches).

48. The automated fiber-placement system according to claim 33, wherein, within each of the discrete tape-regions, at least one of the unidirectional reinforcement fibers that are buckled comprises a plurality of folds.

49. The automated fiber-placement system according to claim 33, wherein the discrete tape-regions are trapezoidal.

50. The automated fiber-placement system according to claim 33, wherein the controller is programmed to cause the steering mechanism to steer placement of at least the one fiber-reinforced tape strip against the substrate along the virtual curvilinear path, such that intermediate tape-regions of at least the one fiber-reinforced tape strip are produced between the discrete tape-regions.

51. The automated fiber-placement system according to claim 50, wherein within each of the intermediate tape-regions, all of the unidirectional reinforcement fibers are only straight.

52. The automated fiber-placement system according to claim 50, wherein each of the unidirectional reinforcement fibers that is buckled within the discrete tape-regions is less buckled within the intermediate tape-regions than within the discrete tape-regions.

53. The automated fiber-placement system according to claim 50, wherein the intermediate tape-regions are rectangular.

54. The automated fiber-placement system according to claim 33, further comprising a sensor, and wherein:
   the sensor is configured to detect a property of at least the one fiber-reinforced tape strip on a trailing side of the compactor; and
   the controller is programmed to control at least one of feed rate of the at least the one fiber-reinforced tape strip from the dispenser or pulse frequency, pulse power, or pulse duration of at least one of the first quantity of pulsed energy or the second quantity of pulsed energy responsive to inputs received from the sensor.

55. The automated fiber-placement system according to claim 54, wherein the sensor is a temperature sensor.

56. The automated fiber-placement system according to claim 33, wherein at least one of the first quantity of pulsed energy or the second quantity of pulsed energy is configured to directly heat the unidirectional reinforcement fibers for indirectly heating the resin tape-matrix via conduction from the unidirectional reinforcement fibers.

57. The automated fiber-placement system according to claim 33, wherein:
   the controller is further programmed to selectively cause the steering mechanism to steer placement of at least the one fiber-reinforced tape strip against the substrate in a virtual straight path; and the controller is programmed to cause the energy source to heat the overlapping regions that are along the virtual curvilinear path to a higher temperature than the overlapping regions that are along the virtual straight path.

58. The automated fiber-placement system according to claim 33, wherein the virtual curvilinear path is nonplanar.

59. The automated fiber-placement system according to claim 33, wherein the substrate comprises a complex contour.

\* \* \* \* \*